US010411964B2

(12) United States Patent
Zhang

(10) Patent No.: US 10,411,964 B2
(45) Date of Patent: Sep. 10, 2019

(54) METHOD AND APPARATUS FOR NETWORK SLICING

(71) Applicant: Hang Zhang, Nepean (CA)

(72) Inventor: Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/698,040

(22) Filed: Sep. 7, 2017

(65) Prior Publication Data

US 2018/0077023 A1    Mar. 15, 2018

Related U.S. Application Data

(60) Provisional application No. 62/385,333, filed on Sep. 9, 2016, provisional application No. 62/408,475, filed (Continued)

(51) Int. Cl.
*H04L 12/24* (2006.01)
*H04W 16/04* (2009.01)
(Continued)

(52) U.S. Cl.
CPC ........ *H04L 41/0896* (2013.01); *H04L 41/044* (2013.01); *H04L 41/0803* (2013.01); (Continued)

(58) Field of Classification Search
CPC ............. H04L 41/0896; H04L 41/0803; H04L 41/12; H04L 63/0272; H04L 41/0806; (Continued)

(56) References Cited

U.S. PATENT DOCUMENTS

| 10,243,860 B2* | 3/2019 | Szilagyi ............. H04L 47/20 |
| 2012/0278378 A1* | 11/2012 | Lehane .............. H04L 41/5054 |
| | | 709/201 |

(Continued)

FOREIGN PATENT DOCUMENTS

| CN | 103236945 A | 8/2013 |
| CN | 103650437 A | 3/2014 |

(Continued)

OTHER PUBLICATIONS

International Search Report dated Nov. 30, 2017 for corresponding International Application No. PCT/CN2017/101246 filed Sep. 11, 2017.

(Continued)

*Primary Examiner* — Mehmood B. Khan

(57) ABSTRACT

Aspects of the disclosure provide architectures, methods and systems that will allow reconfigurability of the network to suit the needs of various parties. Accordingly, some embodiments provide a controllable open operation environment. In such an environment, there can be a decoupling of various network aspects which would be conventionally be under the span of control of a service provider, allowing for each aspect to be provided by a different entity. For example, infrastructure can be provided separately from the provider of network services to subscribers and/or from the provider of slices and/or from the provider of NOS services. For example an infrastructure provider can provide infrastructure used by a slice provider to provide network slices to virtual network providers which provide services to end customers. Generally speaking, SONAC-Com is responsible for the composition of slices and manages resources at the slice level. SONAC-Op is responsible for the operation of slices. For example, SONAC-Com develops slices using the general infrastructure resource pools, while SONAC-Op (Continued)

manages the delivery of slice traffic packets over deployed slices.

22 Claims, 53 Drawing Sheets

Related U.S. Application Data on Oct. 14, 2016, provisional application No. 62/417,889, filed on Nov. 4, 2016.

(51) Int. Cl.
*H04L 29/06* (2006.01)
*H04L 12/26* (2006.01)
*H04W 84/04* (2009.01)

(52) U.S. Cl.
CPC .......... *H04L 41/0806* (2013.01); *H04L 41/12* (2013.01); *H04L 41/50* (2013.01); *H04L 41/5003* (2013.01); *H04L 43/0876* (2013.01); *H04L 63/0272* (2013.01); *H04W 16/04* (2013.01); *H04L 41/22* (2013.01); *H04W 84/042* (2013.01)

(58) Field of Classification Search
CPC ..... H04L 43/0876; H04L 41/50; H04L 41/22; H04L 41/5003; H04W 16/04
See application file for complete search history.

(56) References Cited

U.S. PATENT DOCUMENTS

| | | | |
|---|---|---|---|
| 2014/0133456 A1* | 5/2014 | Donepudi | H04W 88/10 370/331 |
| 2014/0258511 A1 | 9/2014 | Sima et al. | |
| 2014/0269295 A1 | 9/2014 | Anumala | |
| 2014/0359348 A1 | 12/2014 | Volvovski et al. | |
| 2015/0043382 A1 | 2/2015 | Arora et al. | |
| 2016/0072680 A1* | 3/2016 | Hoffmann | H04L 41/145 370/254 |
| 2016/0212016 A1 | 7/2016 | Vrzic et al. | |
| 2017/0245176 A1 | 8/2017 | Murphy | |
| 2017/0311290 A1* | 10/2017 | Adjakple | H04W 76/18 |
| 2017/0367036 A1* | 12/2017 | Chen | H04W 76/10 |
| 2018/0041904 A1* | 2/2018 | Shimojou | H04W 88/18 |
| 2018/0041905 A1* | 2/2018 | Ashrafi | H04W 16/10 |
| 2018/0176825 A1* | 6/2018 | Ercan | H04W 88/18 |
| 2018/0317133 A1 | 11/2018 | Sciancalepore et al. | |

FOREIGN PATENT DOCUMENTS

| | | |
|---|---|---|
| CN | 103905523 A | 7/2014 |
| CN | 105812217 A | 7/2016 |
| WO | 2016086214 A1 | 6/2016 |
| WO | WO-2017121247 A1 * | 7/2017 ......... H04L 12/4633 |

OTHER PUBLICATIONS

International Search Report dated Nov. 3, 2017 for corresponding International Application No. PCT/CN2017/101043 filed Sep. 8, 2017.
CMCC 3 GPP TSG-RAN WG2 Meeting #92, R3-131268 "Definition of RAN Network slicing and Network Functions", Nanjing, China, May 23-27, 2016.
Hyungsookim KT Korea (Rep of): "Updated Draft Recommendation-:Network Management Framework for IMT-2020;1MT-1-241 ", ITU-T Draft; Study Period 2013-2016; Focus Group IMT-2020; Series IMT-1-241, International Telecommunication Union, Geneva;CH, vol. imt-2020 Sep. 2, 2016 (Sep. 2, 2016), pp. 1-24.
ZTE,"NextGen Core Architecture solution for sharing Network Function across multiple Network Slices",(revision of S2-16xxxx)SA WG2 Meeting#114 S2-161679, Apr. 11-15, 2016, total 7 pages.
Huawei: "Adding management use case for modifying a network slice instance with common and slice specific CN network functions and shared AN", S5-165359, Sep. 2, 2016, total 3 pages. XP051172133.
ONF: "TR-526 Applying SDN Architecture to 5G Slicing", Jun. 12, 2016, total 19 pages. XP051110516.

* cited by examiner

| Format ID | Slice topology and resource | Slice resource description | SONAC-Com responsibility -Creation of slices (purpose-specific slices or customer service slices) from infrastructure network | SONAC-Com responsibility -Creation of customer service slice from pre-deployed purpose-specific slice |
|---|---|---|---|---|
| A | ☐ VN node (NF) of a slice<br>△ Edge NN (e.g., access node)<br>⋯ Device/server of a slice | • NFs definition/selection<br>• NFs deployment in DC/MEC<br>• Interconnections among NFs<br>• Capacity/performance requirement of logical tunnels/DCs/MECs<br>• Mapping logical tunnels to infrastructure network (mapping rule)<br>  -logical: IP-like, source routing, MPLS<br>  -dedicated physical resource<br>• End-to-end/tunnel/link protocols | • Define the slice resource described for format A slice<br>• Deploy (embed) the slice into infrastructure network<br>• Define/activate/configure<br>  -SONAC-Op<br>  -NOS | • Customer slice admission control<br>• Optional resource assignment (format A) for the requesting slice without violating the capacity definitions of the purpose-specific slice |
| B | ☐ VN node (NF) of a slice<br>△ Edge NN (e.g., access node)<br>⋯ Device/server of a slice | • NFs definition/selection<br>• NFs deployment in DM/MEC<br>• Interconnections among NFs<br>• Default mapping rule and default protocols are used (assuming pre-defined default mapping rule and default protocols for slices) | • Define the slice resource described for format B slice<br>  -NFs definition/selection<br>  -NFs deployment in DC/MEC<br>  -Interconnections among NFs<br>• Deploy (embed) the slice into infrastructure network<br>• Define/activate/configure<br>  -SONAC-Op<br>  -NOS | • Customer slice admission control<br>• Optional resource assignment (format A) for the Requesting slice without violating the capacity definitions of the purpose-specific slice |
| C | ☐ VN node (NF) of a slice<br>△ Edge NN (e.g., access node)<br>⋯ Device/server of a slice | • NFs definition/selection<br>• NFs deployment in DC/MEC | • Define the slice resource described for format B slice<br>  -NFs definition/selection<br>  -NFs deployment in DC/MEC<br>• Same as for other formats | • Customer slice admission control<br>• Optional resource assignment (format A, B) for the requesting slice without violating the capacity definitions of the purpose-specific slice |

Figure 42

| Format ID | Slice topology and resource | SONAC-Com responsibility | SONAC-Op responsibility | Note |
|---|---|---|---|---|
| A | 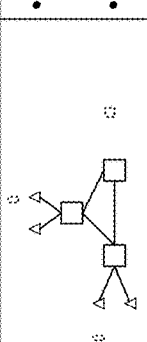 □ VN node (NF) of a slice △ Edge NN (e.g., access node) ⋯ Device/server of a slice | • Define the slice resource described for format A slice • Deploy (embed) the slice into infrastructure network • Define/activate/ configure -SONAC-Op -NOS | • Customer/device network and slice registration • Device traffic session admission control • Routing data packet over slice • Interact with CM mobility • Device data packet path selection on a logical tunnel if needed • Link (e.g. access link) resource multiplexing control without violating slice performance requirement • Device data packet protocol determination without violating the per slice protocol selection principle • Only access link connection control | • More intelligent SONAC-Com • Simple SONAC-Op • Easy slice QoS control • Allow customized mapping rule and protocol • No need for end-to-end PDU session establishment for devices (save signaling during the operation phase) |
| B | 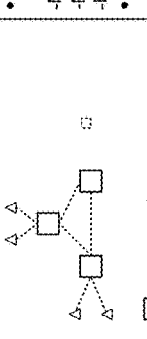 □ VN node (NF) of a slice △ Edge NN (e.g., access node) ⋯ Device/server of a slice | • Define the slice resource described for format B slice -NFs definition/selection -NFs deployment in DC/MEC -Interconnections among NFs • Deploy (embed) the slice into infrastructure network • Define/activate/configure -SONAC-Op -NOS | • Customer/device network and slice registration • Device traffic session admission control • Routing data packet over slice • Interact with CM for mobility • Device data packet path selection on a logical tunnel if needed • Device data packet protocol determination without violating the per slice protocol selection principle • Access link connection control | • Less intelligent SONAC-Com • More intelligent SONAC-Op • Less customization of slice • More complicated slice QoS control • No need for end-to-end PDU session establishment for devices |
| C | 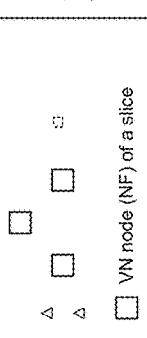 □ VN node (NF) of a slice △ Edge NN (e.g., access node) ⋯ Device/server of a slice | • Define the slice resource described for format B slice -NFs definition/selection -NFs deployment in DC/MEC • Same as for other formats | • Customer/device network and slice registration • Device traffic session admission control • Per device end-to-end session establishment • Interaction with CM for mobility – end-to-end session re-establishment • Device data packet path selection on a logical tunnel if needed • Device data packet protocol determination without violating the per slice protocol selection principle • Access link connection control | • Less intelligent SONAC-Com • More intelligent SONAC-Op • Need per device end-to-end (incur real-time signaling during slice operation |

Figure 43

METHOD AND APPARATUS FOR NETWORK SLICING

CROSS-REFERENCE TO RELATED APPLICATIONS

This application claims the benefit of priority to U.S. Provisional Patent Applications U.S. Patent Application Ser. No. 62/385,333 entitled "Method and Apparatus for Network Slicing" filed Sep. 9, 2016, and U.S. Patent Application Ser. No. 62/408,475 entitled "Method and Apparatus for Network Slicing" filed Oct. 14, 2016, and U.S. Patent Application Ser. No. 62/417,889 entitled "Method and Apparatus for Network Slicing" filed Nov. 4, 2016 the contents of which are hereby incorporated by reference in their entirety.

FIELD OF THE INVENTION

The present invention pertains to the field of communications networks and to networks which utilize network slicing.

BACKGROUND

Communication networks enabled by technologies such as Network Function Virtualization (NFV) and Software Defined Networking (SDN) may be flexibly organized to serve various customer demands. In building advanced networks, such as those to support future developments in wireless networks (including next generation, or so-called Fifth Generation (5G) wireless networks), network slicing provides the ability to create isolated virtual networks over which different traffic flows can travel as isolated traffic in another network slice. However, managing variable and competing demands on a potentially large network scale is a complex proposition requiring an effective architecture and management thereof.

Wireless networks include a number of infrastructure elements. Such infrastructure elements include access points or base stations, which are used for communicating with mobile devices. A mobile device should be understood as a device that connects to a mobile network, and includes user equipment (UE) and other wireless devices.

This background information is provided to reveal information believed by the applicant to be of possible relevance to the present invention. No admission is necessarily intended, nor should be construed, that any of the preceding information constitutes prior art against the present invention.

SUMMARY

Aspects of the disclosure provide architectures, methods and systems that will allow reconfigurability of the network to suit the needs of various parties. Accordingly, some embodiments provide a controllable open operation environment. In such an environment, there can be a decoupling of various network roles which would conventionally be under the administrative control of a service provider, allowing for each role to be provided by a different entity. For example, infrastructure can be provided separately from the provider of network services to subscribers and optionally from the provider of slices and optionally from the provider of Network Operation Support (NOS) Services. For example an infrastructure provider can provide infrastructure used by a service provider (which if, providing slices may be referred to as a slice provider) to provide network slices to virtual network providers which provide services to end customers.

Further aspects of the disclosure provide architectures, methods and systems that allow for the establishment of function libraries, which can be used with infrastructure to deploy executable network management entities. One such network management entity is provisioned based a set of requirements and parameters. Such a network management entity will be referred to as a composition function. Such a composition function can receive requests and create at least one of other functions and slices. For example such a composition function can create a slice operation function (or slice) and NOS functions or slices. In addition to creating such slices/functions, in some embodiments the composition function can modify the slices. In some embodiments the creation and modification of slices can be occur automatically in response to a request or in response to a set conditions. Modification of a slice may include changing the resources allocated to the slice, changing the parameters of the resources allocated to the slice, or otherwise modifying a property of the slice. This specification refers to example management entities which are called Service Oriented Network Auto Creation (SONAC) management entities, which can be thought of as network controllers. Functional libraries can be selected based on received inputs to execute SONAC functions resulting in the development and deployment of NOS slices. The SONAC functions are also used to create and operate network slices. In some embodiments, SONAC can include SONAC Composition (SONAC-Com) functions and SONAC operation (SONAC-Op) functions. Generally speaking, SONAC-Com is a composition function responsible for the composition of slices and management of resources at the slice level. SONAC-Op is an operating function responsible for the operation of slices. For example, SONAC-Com develops slices using the general infrastructure resource pools, while SONAC-Op manages the delivery of slice traffic packets over deployed slices. In some embodiments, once suitably provisioned, SONAC-Com can automatically develop the SONAC-Op, NOS slices and Customer user plane slices with little or no human intervention. In some embodiments, SONAC-Com can automatically adapt slices in response to triggering event or message.

In accordance with a first aspect of the present invention, there is provided a method of creating a network slice. The method comprises receiving a request providing requirements for the slice; transmitting a configuration message to a network controller to establish at least one operating function for managing the operation of the slice; transmitting a configuration message to a network controller to establish a plurality of Network Operation Support (NOS) functions for operating the slice; and transmitting a configuration message to a network controller to establish the user plane functions of the slice.

In an embodiment of the first aspect, the method further comprises transmitting a request to, an infrastructure manager network controller for an identification of resources capable of providing resources to satisfy the requirements.

In another embodiment, the request is for an end-to-end slice which spans more than one domain, and transmitting a request to an infrastructure manager network controller further comprises transmitting a request to an infrastructure manager network controller in each domain; and receiving a reply from an infrastructure manager network controller in each domain. Optionally, the reply from the infrastructure manager network controller in each domain includes an indication of the resources available.

In another embodiment, transmitting configuration messages to a network controller to establish at least one operating function for managing the operation of the slice comprises transmitting an identification of preconfigured library functions selected to establish the at least one operating function. Optionally, transmitting configuration messages to a network controller to establish at least one operating function for managing the operation of the slice comprises at least one of establishing an operating function slice and configuring an operation function in a previously established operating function slice.

In another embodiment, transmitting configuration messages to a network controller to establish at least one NOS function comprises at least one of: transmitting an identification of preconfigured library functions selected to establish the at least one NOS function; transmitting an identification of preconfigured library functions selected to establish a plurality of NOS functions; configuring at least one NOS function in a previously established NOS slice; and transmitting an identification of preconfigured library functions selected to establish a plurality of NOS slices. Optionally, the plurality of NOS slices are selected from the group comprising: Connectivity Management (CM), Infrastructure Management (InfM), Customer Service Management (CSM), Content & Forwarding Management (CFM) and data analytics management (DAM) functions.

In another embodiment, the method may further comprise transmitting a domain request to a plurality of domain network controllers to establish slice components in each domain to provide an end-to-end slice. Optionally, slice components comprises the NOS services, operating functions and user plane functions. Optionally, transmitting a domain request to a plurality of domain network controllers comprises transmitting the domain requirements for each domain to each domain network controller.

In another embodiment, the method is performed by a domain network controller, and wherein the request is received from a global network controller. In a further embodiment, the method can further comprise transmitting instructions for establishing a Software Defined Topology (SDT) Controller, a Software Defined Resource Allocation (SDRA) controller, and a Software Defined Protocol (SDP) controller.

In a second aspect, there is provided a network controller for carrying out the method of the first aspect and the corresponding embodiments.

BRIEF DESCRIPTION OF THE FIGURES

Further features and advantages of the present invention will become apparent from the following detailed description, taken in combination with the appended drawings, in which:

FIG. 38A illustrates configuring SONAC-Com for MyNET platform initialization.

FIG. 41A illustrates an example of Single infrastructure provider and multiple end-to-end slice providers.

FIG. 42 is a table illustrating example slice formats, along with SONAC-Com and slice resource assignments, according to an embodiment.

FIG. 43 is a table illustrating example slice formats, along with SONAC-OP and slice resource assignments, according to an embodiment.

DETAILED DESCRIPTION

Figure 1:
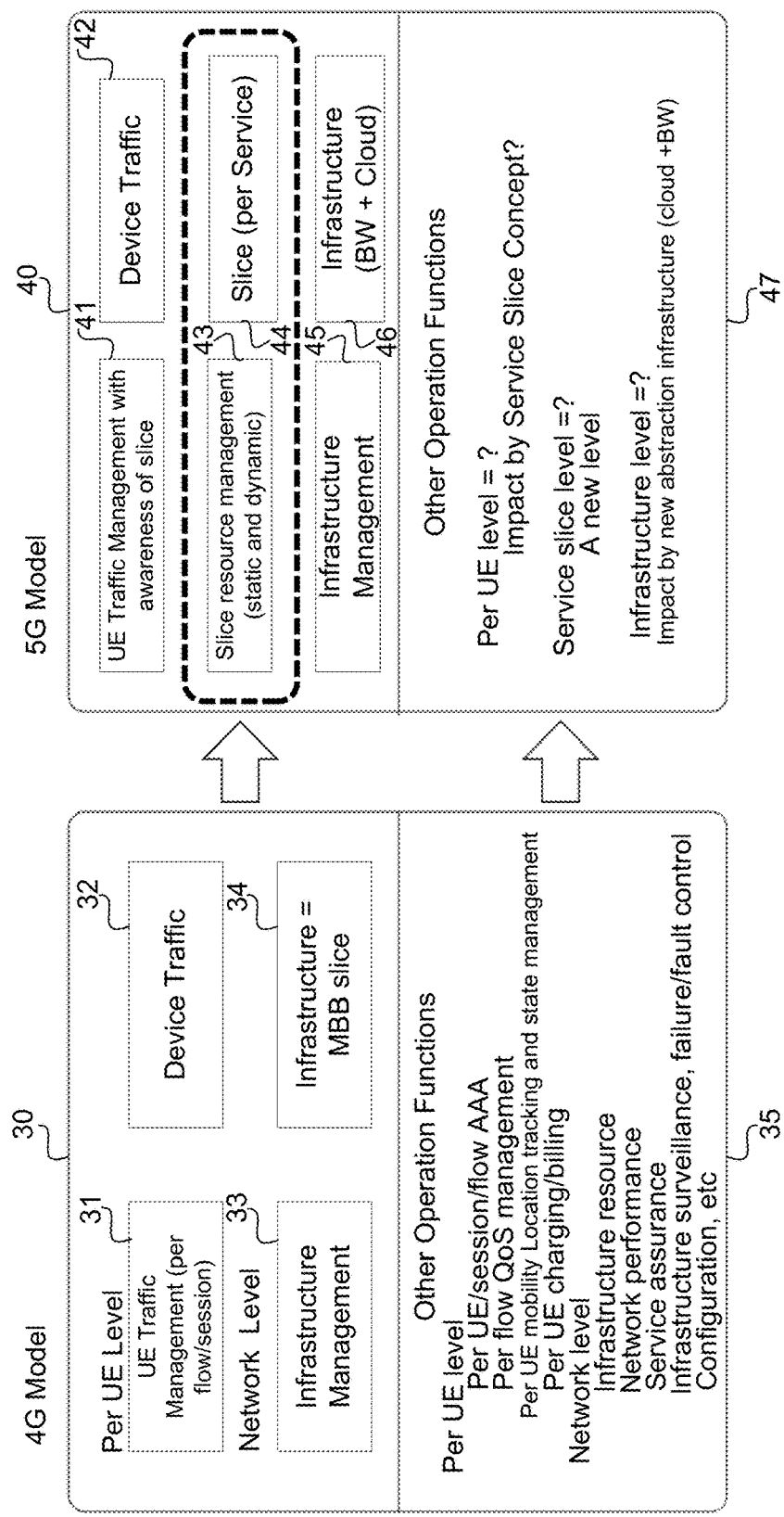
FIG. 1 contrasts a 4G Wireless Network Architecture with a 5G Wireless Network Architecture according to an embodiment.

Next generation of wireless communications network (WCN) architectures are envisioned to provide a plurality of services to a plurality of types of customers using technologies such as Network Function Virtualization (NFV) and network slicing. Further there may be different types of entities involved with providing communication services, including Virtual Network Operators (VNOs) who provide virtual network services, possibly using network infrastructure which is not owned or controlled by the VNOs.

Network slicing is a network management technique in which resources, such as compute, storage and connectivity resources, in a communications network are divided to create a set of isolated virtual networks. When combined with other techniques such as Network Function Virtualization (NFV), Virtual Network Functions (VNFs) can be instantiated upon generic computing resources to provide specific network functions. This allows different slices of the compute and connectivity resources to be isolated from the other slices. The connectivity between these computing resources can be allocated so that traffic and processing demands associated with each slice are isolated from another. Isolation of the resource usage and traffic within a slice allows for different services to be isolated on different slices. Through the use of NFV, the capability and location of the network functions can be adjusted to suit the specific needs of each operator within their allocated slice. A first network slice may be configured to suit the needs of a Machine Type Communication (MTC) service that generates a large number of short transmissions, where MTC devices do not need ultra-reliable connections because reliability can be designed at the application layer. This network slice would differ in its configuration and resource demands from a network slice that is designed to serve the needs of User Equipment connecting for the purposes of an enhanced-Mobile-Broadband (eMBB) connection. By providing slices with different network parameters and characteristics, services can be put into slices designed to meet the needs of their traffic flows. This allows an operator to ensure that the specific needs of a service are met without requiring the overprovisioning of resources to each connection that would be required if a single slice was used for all services. Slices are created to serve the needs of different services and may be built upon the resources allocated to the network operator within a slice that is isolated from the network operator and also from other network operators on a set of resources associated with a service provider. Network slicing techniques, as well as Network Function Virtualization techniques, will be employed by future generations of mobile networks, including so-called fifth generation (5G) communications networks. It should also be understood that a service provider or network operator can obtain resources from different providers, each of which can be in a different domain, and can assemble these obtained resources into network slices to create a seamless network.

As used herein, "MyNET" refers generally to architectures, methods and systems that allow (re)configurability of the network to suit the needs of various parties. "MyNET" may also be used to refer to architectures, methods and systems that allow for the automated deployment and execution of functions for establishing and operating slices.

As used herein, "SONAC" refers to Service Oriented Network Auto Creation management entities, which should be understood to be network controllers or a set of network control functions. In various embodiments, SONAC can be based on a number of technologies, and can include a Software Defined Networking (SDN) Controller (SDN-C), a Software Defined Topology (SDT) Controller, a Software Defined Resource Allocation (SDRA) controller, and a Software Defined Protocol (SDP) controller. In a given SONAC instance, some or all of SDN, SDT, SDRA and SDP may be used and controlled. Which of these technologies are included in a given SONAC instance can be controlled. In embodiments where the network makes use of virtualization, some of these SONAC functions may reside in an orchestrator. In some embodiments, a network slice can be allocated to host a SONAC controller; such a slice may be referred to as a SONAC slice. In some embodiments a SONAC slice may be a network within which a controller that can be instantiated to manage and control functions in other slices, as well as manage the creation and deletion of other slices according to at least one of customer requirement and policy. In some embodiments, SONAC can include SONAC Composition (SONAC-Com) functions and SONAC operation (SONAC-Op) functions. Generally speaking, SONAC-Com is a composition function responsible for the composition of slices and management of resources at the slice level. Accordingly, SONAC-Com can be thought of as a service orchestrator as it "orchestrates" the selection, placement and configuration of the slice components. Accordingly, the term service orchestrator may be used interchangeably with SONAC or SONAC-Com. Thus, for example the term global customer service orchestrator can be used interchangeably with the term global SONAC-Com. The Slice components include the components used for the composition and operation of a slice. For example, the slice components can include the Network Operation Support (NOS) services, operating functions and user plane functions and the network elements and links which route data between these nodes and other networks.

SONAC-Op is an operation function responsible for management of the operation of slices. For example, SONAC-Com develops slices using the general infrastructure resource pools, while SONAC-Op manages the delivery of slice traffic packets over deployed slices.

Embodiments include methods, systems and network architectures which allow MyNET, and SONAC to allocate resources to provide services across network slices. In some embodiments, MyNET and SONAC can be used together to enable any of: slice definition and realization (including development of initial slice topology and resource allocation), slice adaptation (including modifying slice topology and resource adaptation), and slice operation (including customer service delivery over slices). In some embodiments MyNET and SONAC are used as part of a development framework that incorporates a plurality of phases (stages) before slice topologies and resource allocations are defined, and before the slice is in operation. In such a framework, a series of function libraries are developed. An infrastructure database identifying available resources is also developed and maintained. A SONAC-Com function receives the specification for a network as an input. A SONAC-OP function is then developed and deployed, as are various SONAC-Com NOS functions. In some embodiments, MyNET and SONAC enable business revenue assurance for network operators.

FIG. 1 contrasts an exemplary 4G Wireless Network Architecture with a 5G Wireless Network Architecture according to an embodiment. As can be seen, the 5G model provides flexibility, as indicated by question marks indicating flexible approaches to aspects such as UE levels, service levels, and infrastructure levels. Accordingly embodiments allow for service customized slices. The ability to support service customized service may be a differentiator of 5G network from 4G Networks. The components of the 4G Model 30 are the Per UE Level 31, Device Traffic 32, Network Level 33, and Infrastructure (i.e. a MBB slice) 34. Other 4G operational functions are described in 35. The 5G model 40 is comprised of the UE Traffic Management with awareness of slice 41, Device Traffic 42, static and dynamic Slice resource management 43, per Service Slice 44, Infrastructure Management 45, and BW and Cloud Infrastructure 46. Other 5G Operation Functions are described in 47.

According to embodiments, a 5G network may beneficially follow 3 principles. The first principle is the separation of resource management related functions and other operational functions. The second principle is network function modularization and re-organization. The third principle is to transform non-resource related functions into Network Operation Support (NOS) Services. The Network Operation Supporting (NOS) services include Connectivity Management (CM), Infrastructure Management (InfM), Customer Service Management (CSM), Content & Forwarding Management (CFM) and data analytics management (DAM) functions.

Principle 1 involves the separation of resource management related functions and other operational functions. For example, key network resource allocation/assignment functions can be exclusively controlled by operators. This can allow for physical network resource allocation/assignment over a common infrastructure resource pool. Further, resource management functions can be defined by operators. Accordingly while a slice may be managed by a network operator, for slices with physically dedicated resources, embodiments can allow such resources to be managed by customers. Further, a virtual operator can be allowed to manage resources at the virtual network level (e.g., VN level routing). Other network operation functions may not directly involve resource allocation/assignment. For example, such functions can provide required information to support resource control and management. Such functions can be viewed as one of a number of possible NOS services. Such functions can be treated the same as other customer services by a resource control and management entity, and in some cases can be managed by a 3rd party. In some cases information can be provided to 3rd parties. This information may be provided to the third party to provide the third party service with the information required to provide the desired service.

Principle 2 is that NFV/SDN enables systematic design and may allow for interface minimization. Slice support and NFV/SDN information can be analyzed to generate 5G network function analytics. The slice information provides function analytics and can also be used to re-group or modify the operation of network functions. These analytics provide information that can be used by control and management entities (e.g. entities within the control and management planes respectively) in the control and management of devices, services, infrastructures, operations, and content. UE and device level statistics can be used to provide connectivity control and management via UE and device reachability with the object of managing devices including UEs. Both business customer and end customer analytics including service assurance, context, and charging are used at the service level for customer service control and management. Generic infrastructure resource pool management analytics are used at the infrastructure level to manage infrastructure. Analytics generated from infrastructure and network data logs are used at the operation data level for control and management. Analytics created from cache and forwarding management are used at the content level for control and management of cache and forwarding.

Principle 3 Transforms non-resource related functions into Network Operation Support (NOS) Services. Attributes of NOS include any one or more of a specific type of service, support for service resource control and management optimization by providing required information, customized for business customers, on-demand exposure of information (internally and externally), impact total cost of customer service product package (e.g. CM service), mutual provisioning of NOS services (e.g., a NOS service can ask for the service from another NOS (e.g., an InfM NOS can ask a DAM NOS for network load distribution data)).

In some embodiments SONAC treats Customer services and NOS services in the same manner, as services which in some embodiments can be allocated to slices. Such NOS slice composition and adaptation depends on such factors as the Service description and requirements, which in some cases can be jointly provided by an operator, customers, or $3^{rd}$ parties.

Accordingly, in some embodiments, such a 5G network can transform the 4G closed network operation environment into a controllable open operation environment. In this environment, there can also be a decoupling of various aspects of network architecture and control which would conventionally be under the control of a service provider. This allows for each of these controllable aspects to be provided by a different entity. For example, infrastructure can be provided separately by different entities and in different ways. In some scenarios, infrastructure resources can be obtained from the provider of network services that are offered to subscribers. In other scenarios the infrastructure can be obtained from the provider of slices resources. In another scenario the infrastructure resources can be obtained from the provider of NOS services. It will be apparent to those skilled in the art that combinations of the above scenarios and the provision of infrastructure resources from other sources can also be implemented. For example an infrastructure provider can provide infrastructure used by a slice provider to provide network slices to virtual network providers which provide services to end customers.

Figure 2:
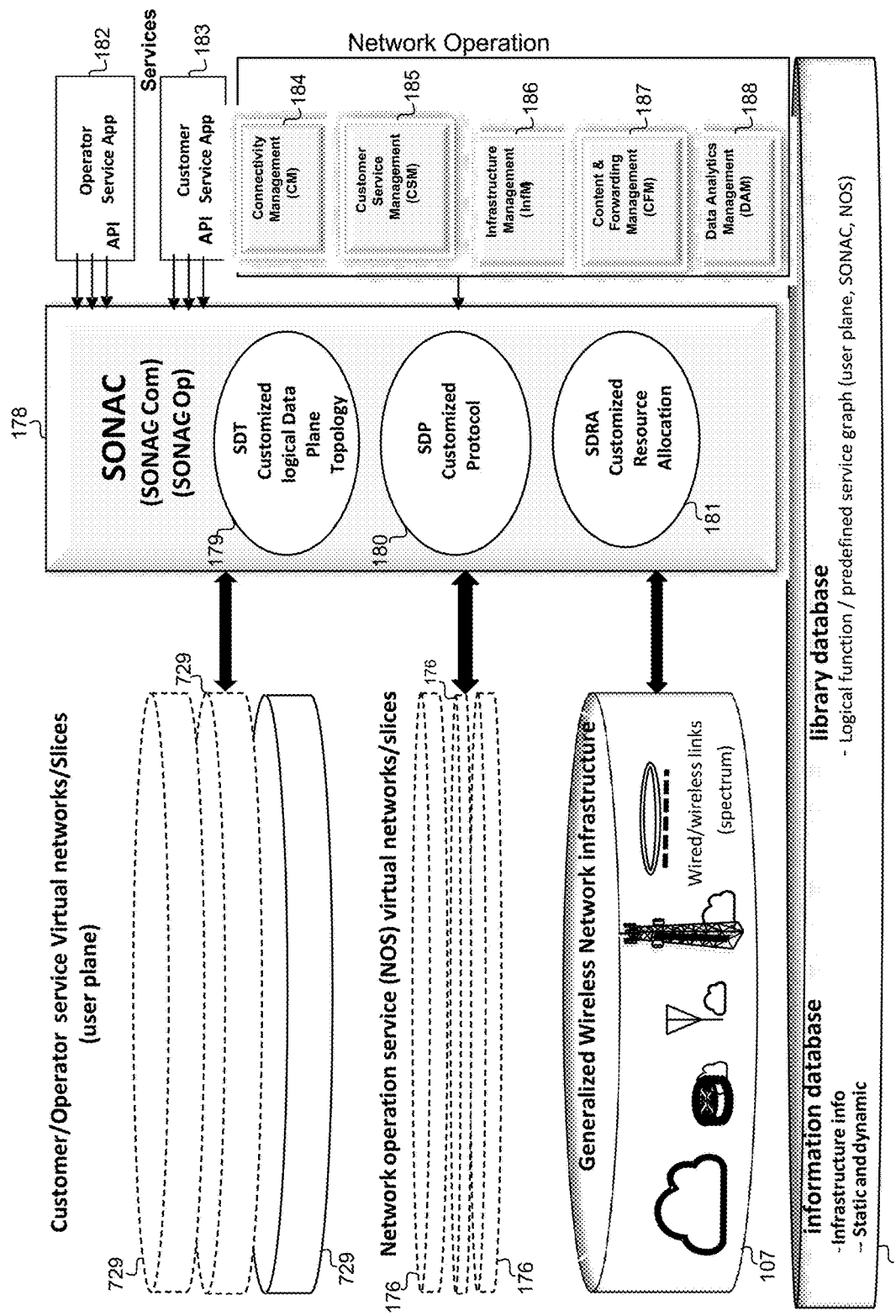
FIG. 2 illustrates a network architecture according to an embodiment.

FIG. 2 illustrates a network architecture according to an embodiment. FIG. 2 illustrates SONAC entities 178 and SONAC interfaces for establishing slices 176, controlling General Wireless Network Infrastructure (GWNI) 107, and interacting with NOS services 729. In some embodiments a slice is allocated for SONAC functions. SONAC may interface with a Customer app/gateway 183, an operator app/gateway 182, and a 3rd party app/gateway (not shown). There can be a plurality of customer/operator service slices, which can operate as user plane virtual networks. These slices can interface with SONAC using a user plane SONAC interface, which may be referred to as a SONAC-U interface. The illustrated SONAC function can include the SONAC-Com and SONAC-OP functions. These functions may include the SDT customized logical data plane topology 179, SDP customized protocol 180, and SDRA customized resource allocation 181. SONAC can also use data from the information database and library database 177 to structure slices.

GWNI elements can include Radio Access Network (RAN) nodes such as receivers, antennas, base stations (BS), base transceiver stations (BTS), Node-B, evolved Node-B (eNodeB), a gNodeB, a home Node-B, a home eNodeB, site controllers, APs, data centers, C-RAN clusters which include Remote Radio Heads (RRHs) controlled by a suitable controller, and other network components including network elements and links which route data between these nodes and other networks. The GWNI can communicate with SONAC via a SONAC-I interface.

NOS services include services such as Connectivity Management (CM) 184, Infrastructure Management (InfM) 186, Customer Service Management (CSM) 185, Content & Forwarding Management (CFM) 187 and data analytics management (DAM) functions 188. In some embodiments each NOS interfaces with SONAC via an NOS API. In some embodiments each NOS can be allocated its own slice. A NOS within its own slice may interface with SONAC via a SONAC-NOS interface.

Such an architecture can have one or more of the following benefits: on demand customer service provisioning, unified treatment of customer service and NOS service by operators, well-structured operational process, or a flexible cost structure.

Figure 3A:
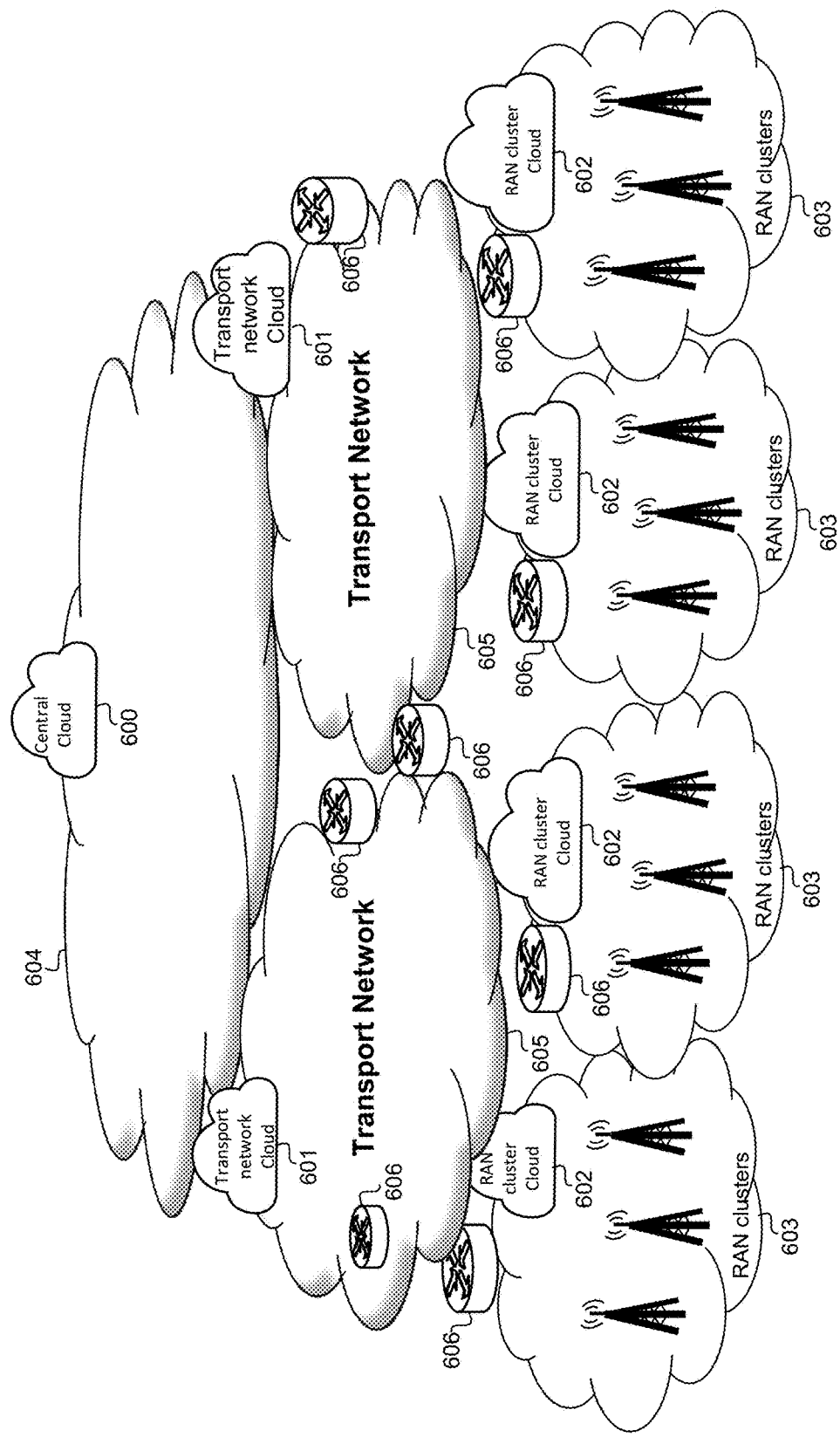
FIG. 3A schematically illustrates a network, according to an embodiment.

FIG. 3A schematically illustrates a network, according to an embodiment. The network may be formed from resources drawn from different network domains. This can be achieved by obtaining resources, in this example as network slices, from different providers, and building interfaces between elements in these slices. Such a network can span across multiple domains, and multiple domain types (administration, technology, topology, etc.). For example a Global domain 604, using central cloud 600 and bridge or router 606, can support Data Centers (DCs) and networking between DCs. The transport domain 605, using transport network cloud 601 and bridge or router 606, can provide networking between the global domain and the RAN clusters 603 (via RAN cluster cloud 602 and bridge or router 606). An access domain can manage access nodes in an access layer (AL). The RAN cluster domain is an example of an access domain. The RAN cluster domain includes radio edge nodes that allow a User Equipment (UE) to attach for network access. The RAN cluster domain may include mobile edge computing (MEC) resources to provide a RAN cloud that can serve the needs of access nodes. These infrastructure domains can belong to one provider or multiple infrastructure providers. A multi-domain environment can utilize a Network Operation Support (NOS) slice providing function distributions and interconnections between the function or components. Each domain can include central and local clouds, which can include DCs or nodes which can host the various functions described herein, including the SONAC and NOS functions.

Figure 3B:
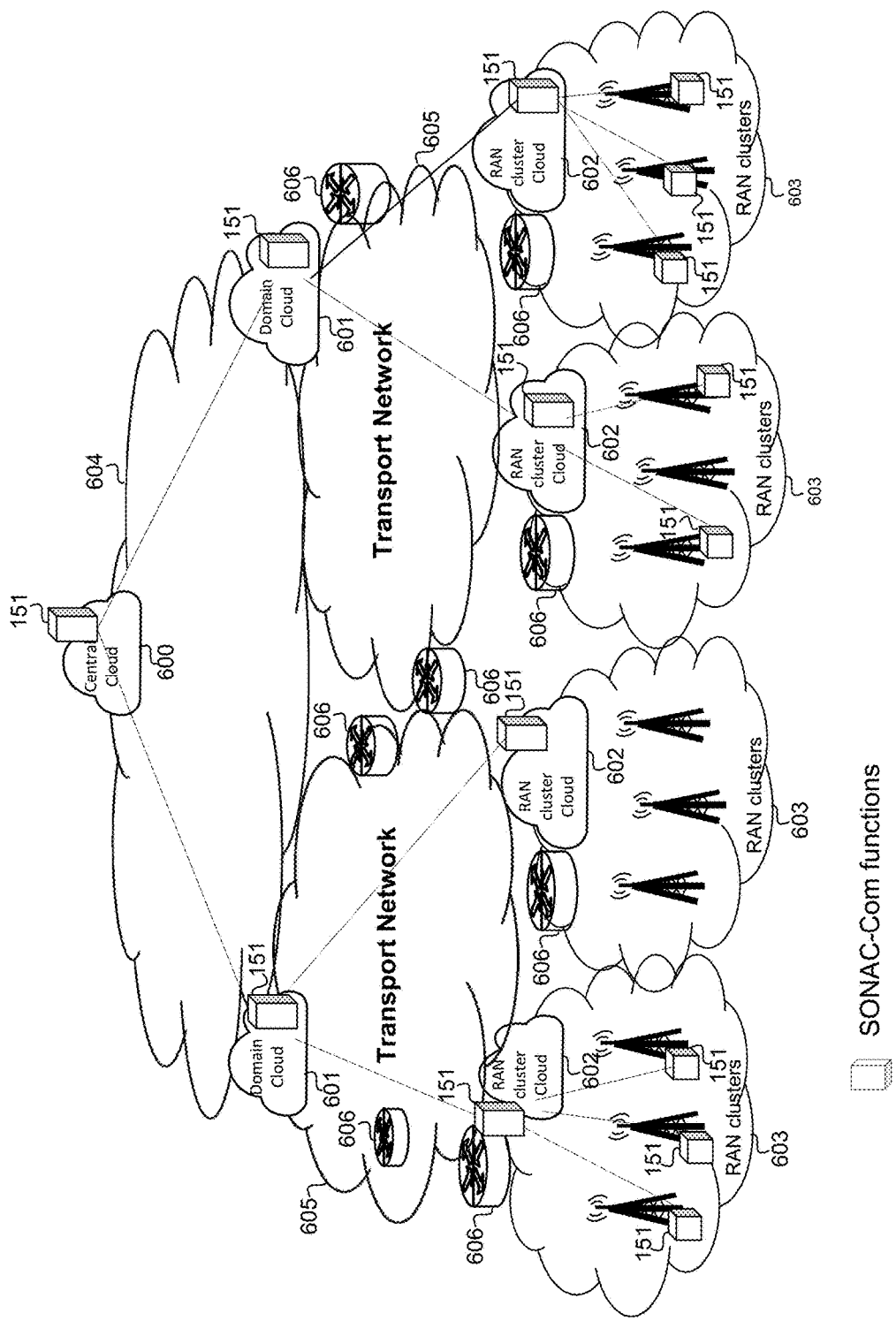
FIG. 3B illustrates an example of a SONAC-Com slice deployment, and FIG. 3C illustrate an example of a MyNET platform deployment, according to embodiments.
Figure 3C:
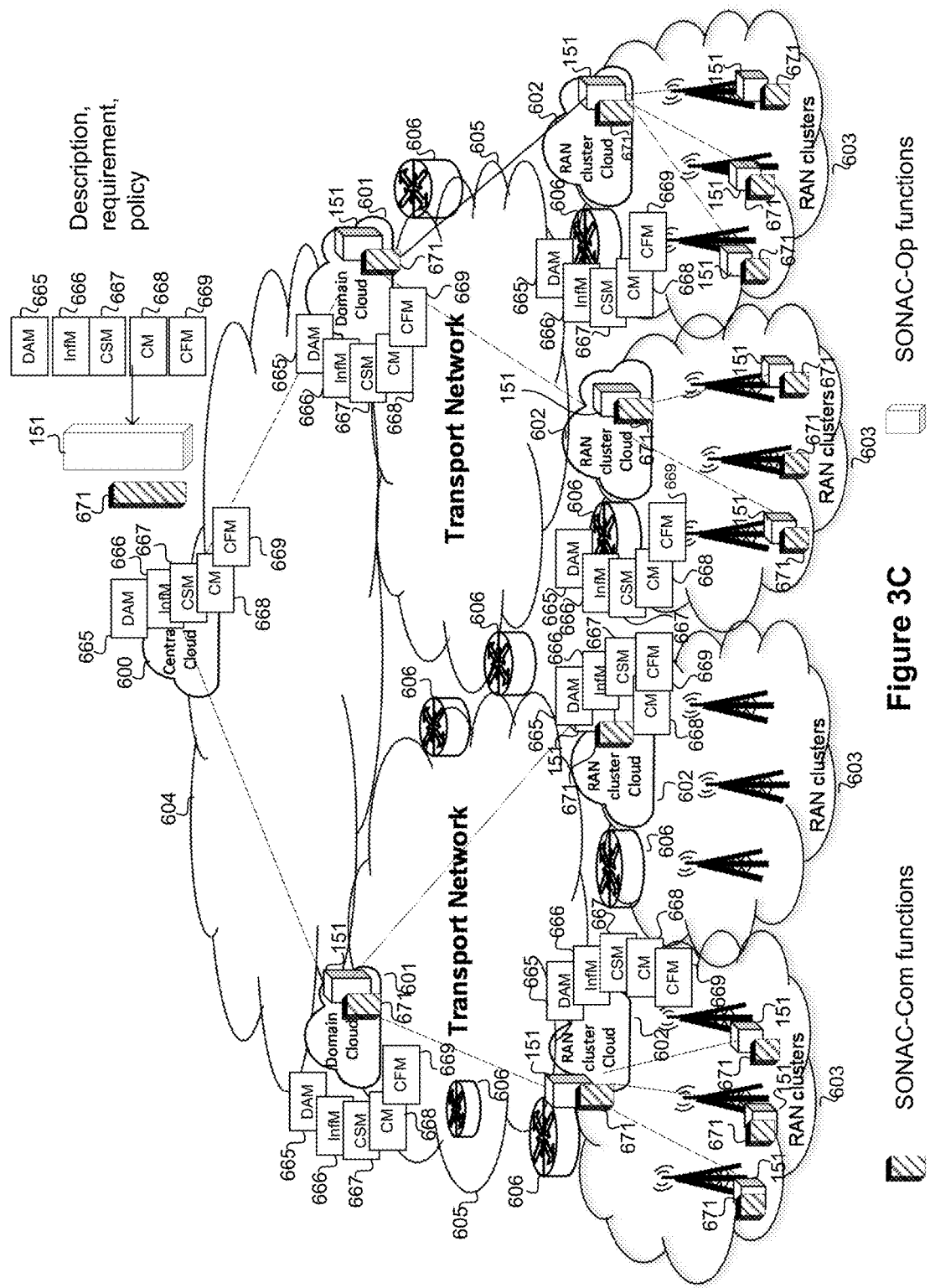

FIG. 3B illustrates an embodiment where the core network 604, via a central cloud 600 and a SONAC-Com function 151 communicates with transport networks 605 via domain cloud 601 and SONAC-Com function 151. The transport network in turn communicates with RAN clusters 603 via RAN cluster cloud 602 and SONAC-Com function 151. UEs can connect to the RAN cluster supported by or implemented as a result of SONAC-Com function 151. It should be noted that bridges (or routers) 606 can be provided in this configuration to pass traffic between the domains. FIG. 3C illustrates a more complete embodiment from that shown in FIG. 3B. In FIG. 3C, the SONAC-Op functions 151, DAM 665, InfM 666, CSM 667, CM 668, and CFM 669 functions are shown since these functions are used to configure network. FIG. 3B illustrates an example of a SONAC-Com slice deployment, and FIG. 3C illustrates an example of a MyNET platform deployment, according to embodiments as well as the connectivity of SONAC-Com Functions 671, Central Cloud 600, core network 604, Domain Clouds 601, Transport Networks 605, bridges/routers 606, RAN Clusters 603, and RAN cluster Clouds 602. FIG. 3B illustrates the deployment of SONAC-Com functions for a SONAC-Com slice. FIG. 3C illustrates the deployment of SONAC-Com functions, SONAC-Op functions and NOS functions. In this example, hierarchical architectures of SONAC and NOS slices are shown. However, a centralized architecture is also possible, where some NOS functions may not need to be deployed in lower domains. The architecture of MyNET platform is flexible and the exact configuration can be a decision of slice providers.

Execution of methods used by SONAC-Com such as those used for MyNET platform adaptation will now be discussed, according to embodiments.

Embodiments of the MyNET platform deployment are able to adapt to infrastructure network changes. For example a change could be caused by additional pieces of infrastructure networks being integrated into the entitled infrastructure networks when it is necessary. Degradation in the performance of infrastructure underlying these networks (e.g. equipment failure, etc) can also cause the infrastructure topology to change. In some embodiments these changes to the underlying topology of the infrastructure could trigger the adaptation of MyNET platform topology adaptation. SONAC-Com can instantiate MyNET functions for newly integrated infrastructure network segments or remove existing MyNET functions in some places. Although such events may not happen frequently, the automatic adaptation in response is beneficial.

Figure 4:
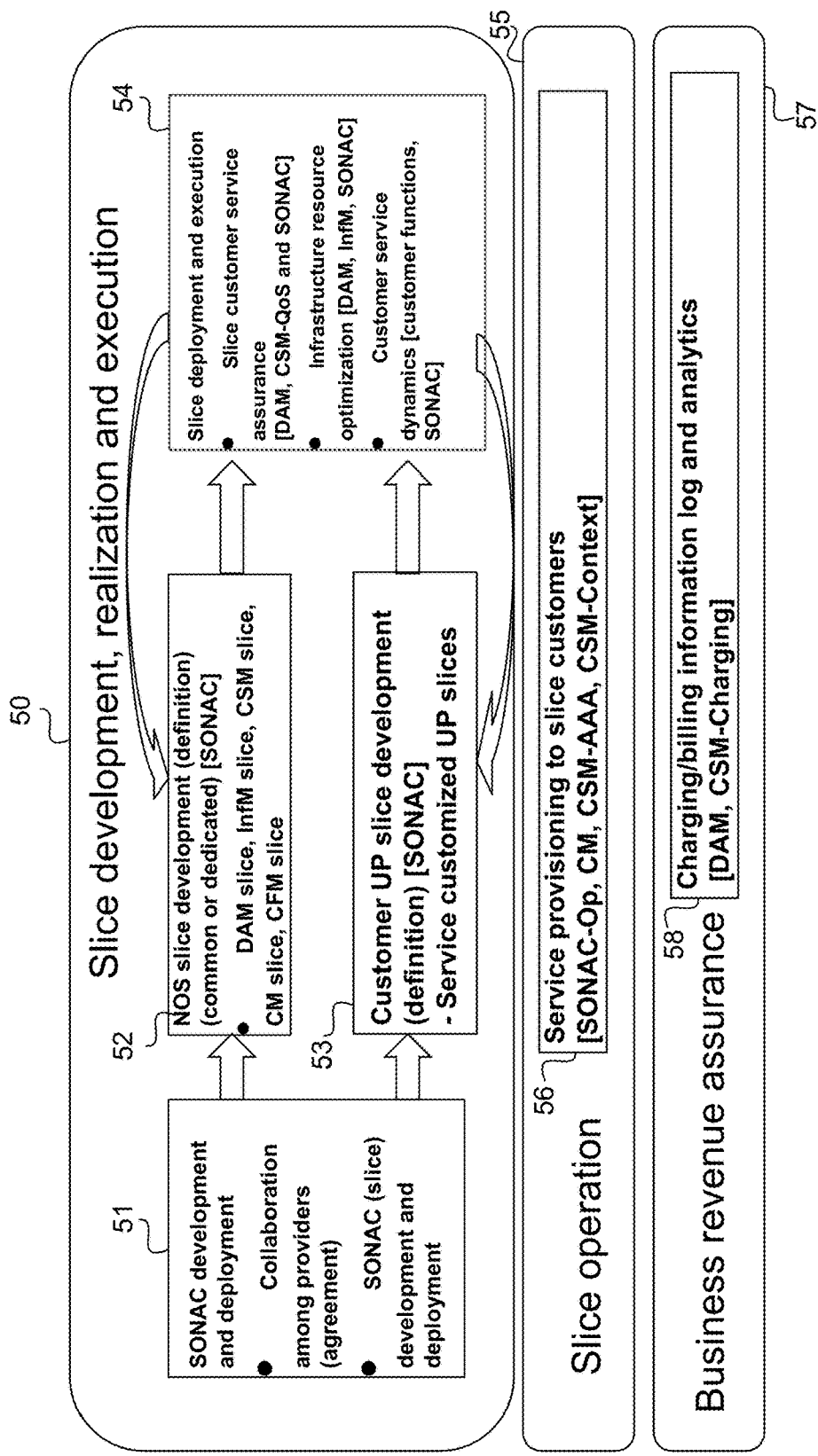
FIG. 4 illustrates a framework for Slice Automation and operation, according to an embodiment.

FIG. 4 illustrates a framework for Slice Automation and operation, according to an embodiment 50. Various services and functions can be separated into different slices 55. Functions related to the realization and execution of slice instantiation can be separated from the functions used to ensure slide operation 56. Similarly functions that are used to ensure revenue tracking can be put into a different slice 57. By separating these functions 58, a degree of customizability can be provided if different instances of each are created, and mix-and-match services can be provided (for example DAM and CSM-Charging). Slice development, realization and execution (as illustrated by embodiment 50) is comprised of SONAC development and deployment 51, NOS slice development (definition) (common or dedication) 52, customer UP slice development (definition) 53, and slice deployment and execution 54.

Figure 5:
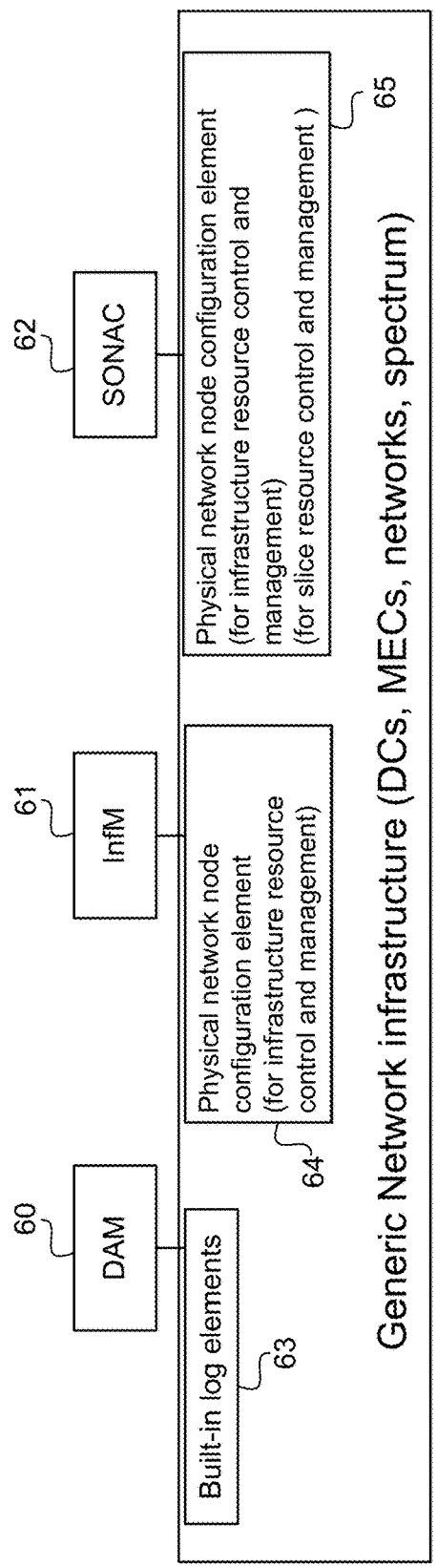
FIG. 5 illustrates one example of how SONAC, DAM and InfM functions can interact with GNWI, according to an embodiment.

SONAC Development and Deployment, according to an embodiment will now be discussed. FIG. 5 illustrates one example of how SONAC 62, DAM 60 and InfM 61 functions can interact with GNWI, according to an embodiment. In some cases, there may be pre-slicing collaboration between entities. For example, there can be collaboration between an end-to-end slice provider and domain infrastructure providers. In such a collaboration, an Infrastructure provider can provide one or more of: a built-in log function 63; an interface to external entities for configuring and collecting the logged raw data; an interface for an external entity (61 and 62) to configure physical network nodes 64 and 65 (respectively), e.g., RAN access nodes power-on and off, etc; and an interface for external entity to configure and assign resource for creation of slices. An Infrastructure provider can also provide a domain infrastructure topology description.

SONAC functionality at all domains can be developed and deployed by an end-to-end slice provider. In some embodiments an Infrastructure network provider may not have SONAC capability. SONAC can provide for the software controlled instantiation of network functions. However, an infrastructure provider who is in the business of providing underlying resources, upon which SONAC can create and manage network services, may not provide the management services itself. Accordingly, an infrastructure provider may provide an interface to enable an external entity (such as a slice provider based SONAC function) to configure the infrastructure.

SONAC at different domains can be defined and deployed by domain infrastructure owners. These may be different legal entities. A standardized interface between SONAC functions in different domains can be defined.

It is noted that some infrastructure owners may not want to dedicate infrastructure but may agree to provide infrastructure resources on an on-demand or negotiation basis.

Figure 6B:
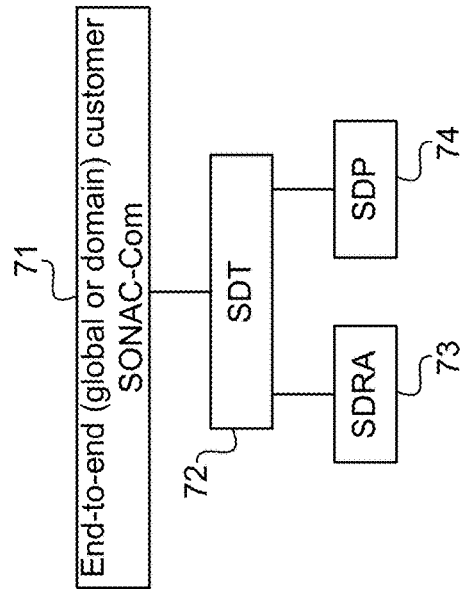
FIGS. 6A and 6B illustrate two example SONAC configurations, according to embodiments.
Figure 6A:
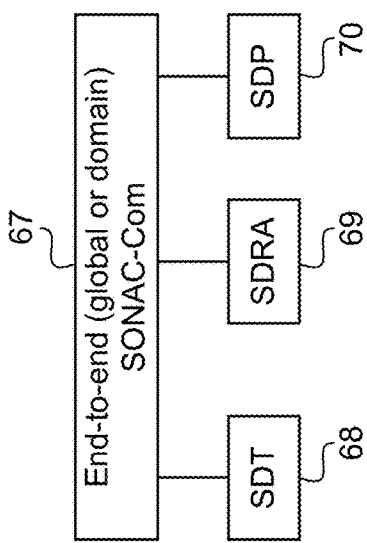

It is noted that SONAC can be implemented in a variety of ways, of which FIG. 6 illustrates two examples. FIG. 6A illustrates an Orchestrator 67 (illustrated as an end-to-end SONAC-Com) which interacts directly with each of the SONAC components (SDT 68, SDRA 69, SDP 70), according to an embodiment. FIG. 6B illustrates an Orchestrator 71 (again illustrated as an end-to-end SONAC-Com) which interacts indirectly with some of the SONAC components, according to an embodiment. FIG. 6B illustrates Orchestrator 71 directly interacting with SDT function 72, and indirectly (through the SDT function 72) interacting with the SDRA 73 and SDP 74 functions.

A SONAC hierarchy can be established to support multiple domains (for example administration, technology, topology). In some embodiments a SONAC instance can be deployed in a network element for each domain (including access nodes), although it should be appreciated that in other embodiments a single SONAC instance can be used to support multiple domains. In other embodiments, several SONAC instances can be co-located in the same node. The manner in which management entities, such as SONAC instances, are connected to each other within a SONAC slice can vary. In some embodiments, the topology of the SONAC slice can be a mesh, while in others it can be a tree or other such structure. In some embodiments a service orchestrator can determine the placement of SONAC instances which make up the SONAC hierarchy.

These variances of configuration can depend on the nature of the customer request. For example a request can be received from a network customer (Applicable for Global customer service orchestrator) or can be received from an upper layer SONAC instance. A few example scenarios include: scenario 1: end-to-end service level description/requirement, scenario 2: end-to-end service level description/requirement with application function definition and chains, and scenario 3: end-to-end service level description/requirement with application function (AF) definition and chains and preferred PoPs.

Further, in some embodiments a SONAC instance can be established for a particular slice. The service orchestrator (or other network entity) can determine the involved domains, for example which domains can be involved for supporting a requested slice. The service orchestrator (or other network entity) can also determine the required network functions needed to support the request, and the End-to-end service QoS requirement division among domains. The service orchestrator (or other network entity) can interface with a Domain customer service orchestrator (domain SONAC) and can determine a topology indication (mesh, tree, star) associated with network functions assembled to support the service request. Those skilled in the art will appreciate that a received service request can typically be broken into a set of primitive network functions. Based on the requested service, the primitive network functions can then be arranged in one of a number of different network topologies. By connecting the primitives, and examining geographic needs, a logical topology mapping to physical locations can be arrived at, and used as an input to instantiation.

Figures 7A, 7B:
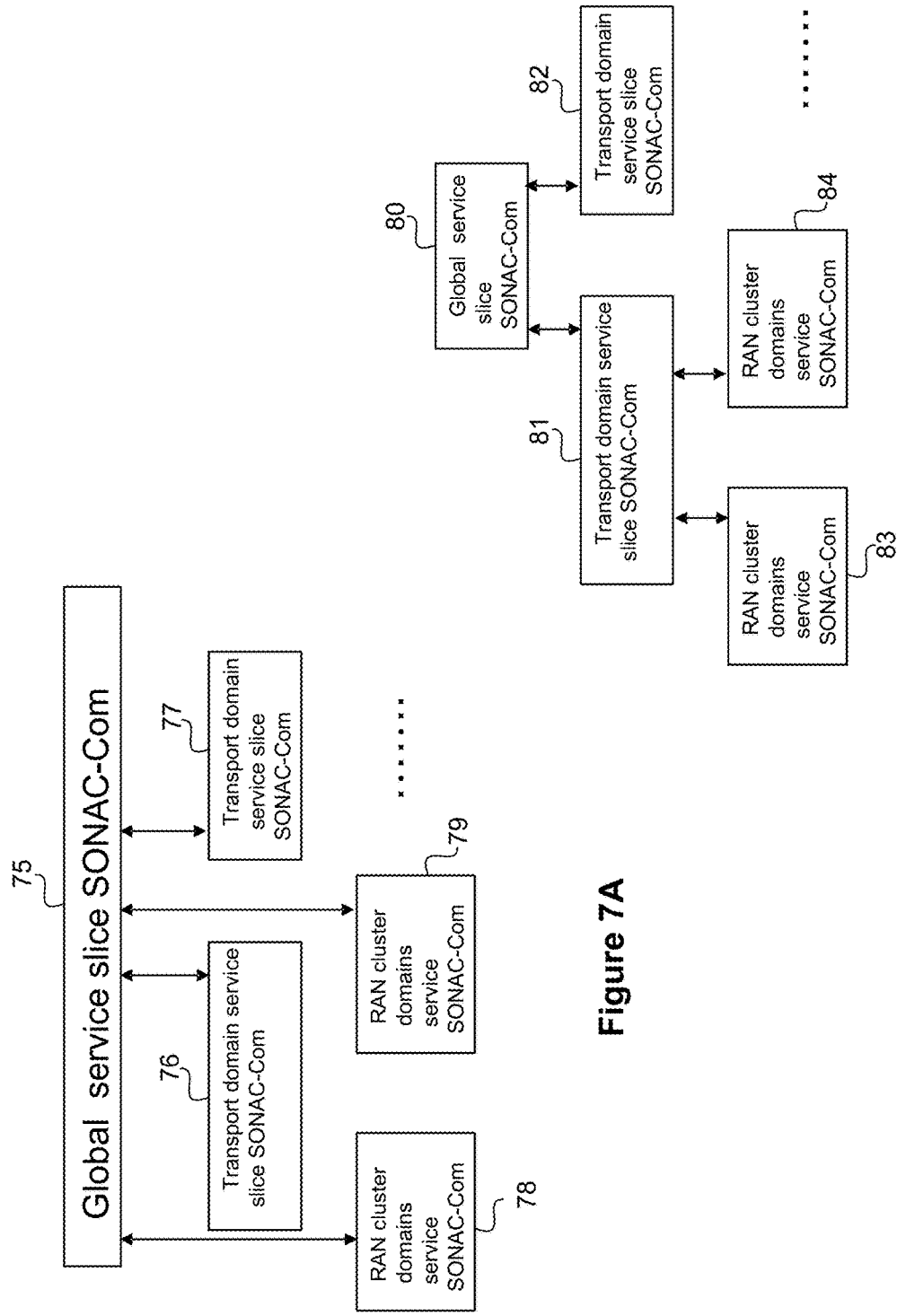
FIG. 7A illustrates global service orchestrator directly controlling each domain according to an embodiment.
FIG. 7B illustrates global service orchestrator in-directly controlling each domain according to another embodiment.

A global service orchestrator, which can be part of a global SONAC-Com 75 can control domains by directly sending instructions to all domain SONAC-Com instances 76, 77, 78 and 79, as illustrated by way of example in FIG. 7A. Further, a global service orchestrator, which can be part of SONAC-Com 80 can control multiple domains by indirectly sending instructions to SONAC-Com instances in some domains (e.g., RAN domain SONAC-Com instances 83 and 84) via other domains SONAC-Com (e.g., transport Domain SONAC-Com instances 81 and 82), as illustrated in FIG. 7B. Accordingly, in FIG. 7A, global SONAC-Com 75 interfaces with the transport domain service slice orchestrator (which can be part of transport domain SONAC-Com) 76, the transport domain service slice orchestrator (which can be part of transport domain SONAC-Com) 77, the RAN cluster domain service orchestrator (which can be part of RAN domain SONAC-Com) 78, and the RAN cluster domain service orchestrator (which can be part of RAN domain SONAC-Com) 79. FIG. 7B illustrates this scenario according to an embodiment, in which it is noted that SONAC at lower layers can interact with one or more domains. Accordingly, the global service slice orchestrator (which can be part of SONAC-Com) 80, interacts with the transport domain service slice orchestrator (which can be part of transport domain SONAC-Com) 81 and the transport domain service slice orchestrator (which can be part of transport domain SONAC-Com) 82. The transport domain orchestrator 81 in turn interacts with the RAN cluster domain service orchestrator (which can be part of RAN domain SONAC-Com) 83, and the RAN cluster domain service orchestrator (which can be part of RAN domain SONAC-Com) 84. It is appreciated that although only two cluster domain service orchestrators 83, 84 are shown, there can be multiple RAN Orchestrators interacting with each domain orchestrator 81, 82.

At the global level, the SONAC.COM receives "slice admission requests" from customers. This request can be assigned to SDT when a "slice admission request" is received. This request can be assigned to SDRA when a "logical topology" design request is received, and the request can be assigned to SDP slice when both a "logical topology" design and a "tunnel mapping" design requests are received.

Before assigning the request to the SDT, global SONAC checks the DC's resources (active DC infrastructure map and Remaining Infrastructure Resource map), determines the logical topology (NFs locations and interconnections) based on policy, and then provides a "logical topology" design to the Customer Service Orchestrator. These requests may include service attributes, requirements, and application functions and may also include the preferred network location (e.g. DC(s)). The global orchestrator determines the transport domains which will contribute to provisioning the slice. The global orchestrator also determines the responsibility of each domain or service QoS requirement (e.g. end-to-end latency budget map to domain latency budget range). It also determines the recommended network functions the reference graph of each domain, the end-to-end protocol (S/D address, end-to-end reliability), determine the protocols, and send the "slice admission request" (service attribute/requirement and recommended NFs and reference graph) to each selected transport domains.

Prior to assigning a request to the SDRA, global SONAC checks the transport network resource (active transport network resource map and remaining resource map), determines the mapping of logical tunnels to physical network resource based on policy, and then provides a "tunnel mapping" design to the Customer Service Orchestrator.

Before assigning a request to the SDP, global SONAC can check the available protocol stack for functions, determine the tunnel protocol (per tunnel security, per tunnel reliability, per-tunnel flow control, etc.) based on policy, and provide a "tunnel protocol" design to the Customer Service Orchestrator.

Each transport SONAC receives a slice admission request, provides requests to the SDT entity and receives decisions on "logical topology" design from the SDT entity. Transport SONAC can also provide "logical topology" design to an entity within the SDRA slice and receives "tunnel mapping" design from the SDRA. It can also provide a "logical topology" design to the SDP management entity and receive "tunnel protocol" designs from the SDP management entity. Transport SONAC evaluates/estimates the supportable performance (e.g. latency estimates) and sends the "slice admission response" (including the supportable performance) to global Customer Service Orchestrator. If any of the SDT, SDRA, SDP entities cannot meet the specified requirements, this procedure may be repeated. For example, the SDT may re-design the topology based on feedback of SDRA and SDP. Transport SONAC also sends the design to impacted RAN cluster Customer Service Orchestrator(s) with the confirmed supportable performance and sends the "slice admission response" to global "slice admission response" and relays "slice admission response" from lower layers.

When a SONAC-Com function in a transport domain receives a "logical topology" design, this can be treated as a SDRA request. The transport SONAC-Com checks the transport network resources (e.g., active transport network resource map, remaining resource map and domain transport resources), determines the mapping of logical tunnels to physical network resources based on policy, and provides a "tunnel mapping" design to the Customer Service Orchestrator.

Transport SONAC receives a SDP request when it receives a "logical topology" design and "tunnel mapping" design. Transport SONAC checks the available protocol stack (functions), determines the tunnel protocol (per tunnel security, per tunnel reliability, per-tunnel flow control, etc.) based on policy, and provides "tunnel protocol" design to the Customer Service Orchestrator.

A node within the RAN cluster receives a "slice admission request" and provides the request to the SDT entity. In response to the request, the RAN cluster node receives a "logical topology" design from the SDT entity. The RAN cluster node can also provide the "logical topology" to the SDRA entity and entities within SDP layers. The RAN cluster node receives a "tunnel mapping" design and a "tunnel protocol" design, which may be repeated, from these layers. The RAN cluster node evaluates and estimates the supportable performance (e.g. latency estimates) and sends "slice admission requests" (including the confirmed supportable performance) with the design to the Customer Service Orchestrator associated with the impacted Access nodes. Finally, the RAN cluster sends "Slice admission responses" to the transport Customer Service Orchestrator and relays Customer Service Orchestrator to the access nodes.

RAN SONAC receives a request for the SDT slice when it receives "slice admission request" from the Customer Service Orchestrator. When processing the request, SDT SONAC, checks DCs resource (active DC infrastructure map, Remaining Infrastructure Resource map and RAN cluster MEC resource), determines the logical topology (NFs locations and interconnections) based on policy, and provides "logical topology" design to the Customer Service Orchestrator.

RAN SONAC receives a SDRA slice request when it receives a "logical topology" design. RAN SONAC checks transport network resources (active transport network resource map, remaining resource map and the RAN cluster BH), determines the mapping of logical tunnels to physical network resources based on policy, and provides "tunnel mapping" design to the Customer Service Orchestrator.

RAN SONAC receives a SDP slice request when it receives a "logical topology" design and "tunnel mapping" design. When this request is made, RAN SONAC checks the available protocol stack for functions, determines the tunnel protocol (per tunnel security, per tunnel reliability, per-tunnel flow control, etc.) based on policy, and provides "tunnel protocol" design to the Customer Service Orchestrator.

The access node SONAC receives "slice admission requests", provides these requests to SDRA-AL and SDP slices. It also sends and receives "AL resource" design and "AL protocol" designs. Finally it provides the "slice admission response" to the RAN cluster Customer Service Orchestrator.

Access node SONAC receives a SDRA request when it receives a "logical topology" design. In response, access node SONAC checks transport network resources (active transport network resource map, remaining resource map and AL resource), determines the mapping of logical tunnels to physical network resources based on policy, and provides a "tunnel mapping" design to the Customer Service Orchestrator.

The access node SONAC receives a SDP slice request when it receives a "logical topology" design and a "tunnel mapping" design. Access node SONAC, as a result, checks the available protocol stack for functions, determines the tunnel protocol (per tunnel security, per tunnel reliability, per-tunnel flow control, etc.) based on policy, determines the AL protocol, and provides the "tunnel protocol" design to the Customer Service Orchestrator.

Various examples of slice development and deployment will now be discussed, according to embodiments. First, development of NOS Slicing—with examples for InfM slices and DAM slices. Then Development of customer slices will be discussed, before slice deployment is discussed.

According to one embodiment some NOS slices are developed and deployed before other NOS slices. One possible example is when NOS slices are developed and deployed before the other slice are developed (i.e. DAM slice is developed and deployed), topology and policy specified, and NOS slices can be developed and deployed before or at the same time as the development of customer slices. The topology and policy specification in this example refers to the interconnection to build-in log functions developed in the infrastructure resource (i.e. InfM slice is developed and deployed, topology and policy defined, inter-connection to DAM, and inter-connection to built-in configurable infrastructure elements). The deployment of NOS slices at the same time as customer slices requires three steps. The first step is where the CSM slice is developed and deployed with its topology and policy defined for common CSM slice and for all slices or dedicated CSM for a single slice, interconnection to DAM, and interconnection to SONAC-Op. The second step is when the CM slice is developed and deployed and its topology and policy are defined as well as its interconnection with SONAC-Op. The third step is when the CFM slice is developed and deployed with its topology and policy defined and its interconnection with SONAC-Op setup.

InfM will now be discussed, according to an embodiment. Abstraction is one of the important functions performed by the InfM function family. The purpose of abstraction of InfM is to allow for a service to be implemented without requiring SONAC to have complete knowledge of the nature of the underlying network resources. This can be done to allow SONAC to function independently of the infrastructure on which it is instantiated. In this way, SONAC can function in different mediums (e.g. wireless or wired transport, different infrastructure providers, different infrastructure protocols), and SONAC only needs to be informed of the available resource/capacity and latency. This allows for LTE, WiFi, and other RATs to be simply modeled as a network topology with link capacity and latency. Further, DC or MECs or other data process resources which can be configured externally can be modeled as an entity with certain process function capabilities.

DCs at the global level are abstracted as an entity with certain process capacity. The capacity (e.g., the remaining capacity) of a DC is obtained from the DC resource manager (e.g. NFV VIM). InfM is initially configured with a developed DCs map. This map includes information such as the locations of DCs and their capacity. This map is updated during infrastructure network operation. InfM is initially configured with a candidate $3^{rd}$ party DC map, assuming the owner of Customer Service Orchestrator and the owners of candidate DC have an agreement allowing for the sharing of this information.

A MEC in certain embodiments is an abstracted entity with certain process capacity. The remaining capacity of a MEC Resource Manager (e.g. NFV VIM) can be obtained by a DC in certain embodiments at the RAN cluster. InfM is initially configured with the "developed MEC map". This map includes the locations of the MECs and their capacity. This map is updated during the infrastructure network operation. InfM is initially configured as a candidate $3^{rd}$ party MEC map, assuming the owner of Customer Service Orchestrator and the owners of candidate DC have an agreement allowing for the sharing of this information.

At both the global and transport (DC-RAN) levels, the transport network is abstracted as a physical network topology of network nodes (NN) which consist of the NN's data process capacity and the capacity of their links. At this level, InfM is initially configured with the "developed network map". This map includes information such as the network topology. This map is updated during infrastructure network operation. InfM is initially configured as a candidate of a $3^{rd}$ party map, assuming the owner of Customer Service Orchestrator and the owners of candidate DC have an agreement allowing for the sharing of this information. It should be noted that the underlying transport network could be any type of transport medium.

At the RAN cluster level, the RAN cluster cross-haul is an abstracted network topology. This topology is abstracted by the Network Node process capacity and the capacity of the links (for example by an InfM. The underlying network could be any type of network (e.g. wired, wireless, etc.).

At the AL level, the AL is abstracted as a link with certain link capacity distribution. However, it should be noted that there are many abstraction methods that can be used. The underlying AL can be any type of 3G, 4G, 5G, WiFi, etc.

At both the global and transport (DC-RAN) levels, protocols are initially configured with protocol stack resources maps. Also, protocols at this level check with DAM for available protocol stack resources and provide the protocol resource to SDP.

Figure 8:
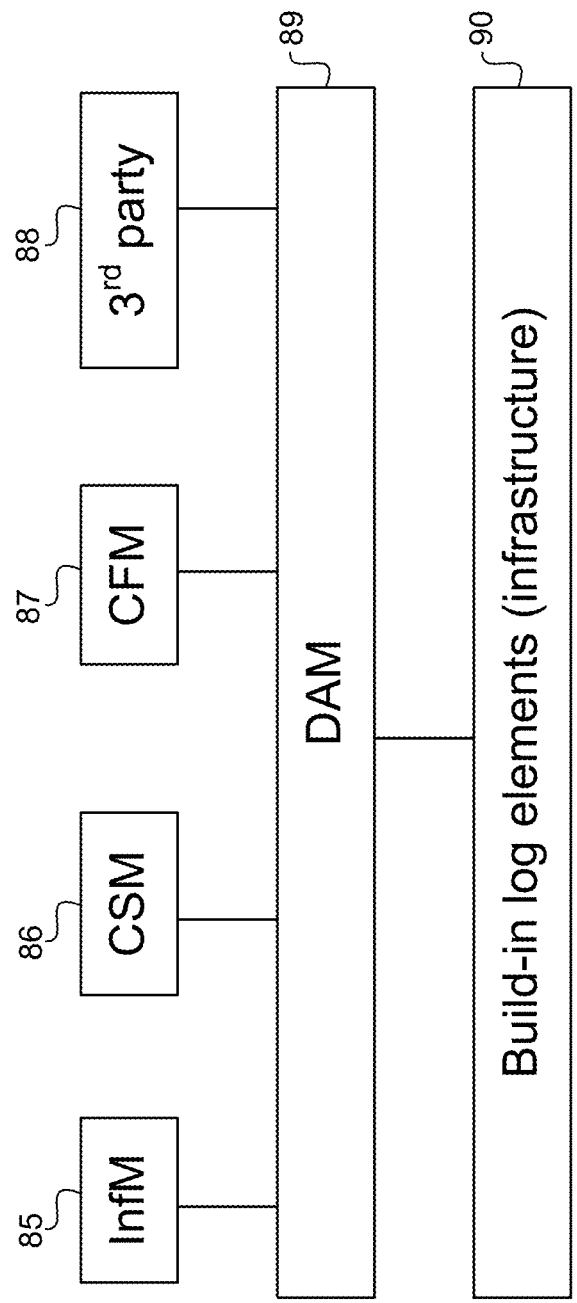
FIG. 8 illustrates how a DAM function can interact with other functions and infrastructure, according to an embodiment.

FIG. 8 illustrates how a DAM function 89 can interact with other functions and infrastructure elements 90, according to an embodiment. In such an embodiment, DAM is one of the functions that can be implemented in a flexible network architecture. In some embodiments DAM 89 may be used to assist in enabling slice automation. DAM can be used to interconnect with built-in logging functions embedded in infrastructure elements 90. DAM operation modes can be defined and configured by other NOS functions such as InfM 85, CSM 86, CFM functions 87, and 3rd party functions 88 operated by slice owners and slice customers. In some embodiments a DAM slice can be created. The DAM slice can include DAM functions specific to some domains over which the network is built. The interconnection between DAM functions in different domains forms the DAM slice. In some embodiments DAM functions interconnect with built-in traffic logging elements in DCs. DAM functions may instantiate traffic or compute logging elements and analytics function. DAM functions can receive "log and analytics request". In some cases DAM functions can configure: the mode of logging (e.g., when to log: on-demand or periodically) and the info ID of what is logged (latency of packet, packet counting over a window, bit/byte counting). DAM functions can also configure the granularity of logging at the application level of a device, at the device level, at the service level, at the slice level (e.g., a slice load, packet latency stats of a slice NF), and at the infrastructure level (e.g., DL load). DAM functions can also analyze logged data and send a log and analytics response.

NOS functions can span multiple domains, which can be classified in terms of at least one of administration, technology, and topology. In some embodiments the NOS can connect sufficient elements in different domains so that NOS can function much like a slice (across multiple domains and interconnected functions). For example, in some embodiments InfM, DAM, and CSM, etc., can be implemented as slices in the central cloud and propagated to the RAN local clouds. In some embodiments the topology of a NOS slice could be the same or different as the topology of the network. In some embodiments the NOS slice(s) can be extended to access nodes (e.g., by instantiating NOS functions at access nodes). Accordingly a composition function such as SONAC-Com can implement a NOS slice by stitching together a plurality of NOS functions in different domains. In some embodiments this can be implemented by a global SONAC-Com sending a request to the domain SONAC-Com instances.

Figure 9:
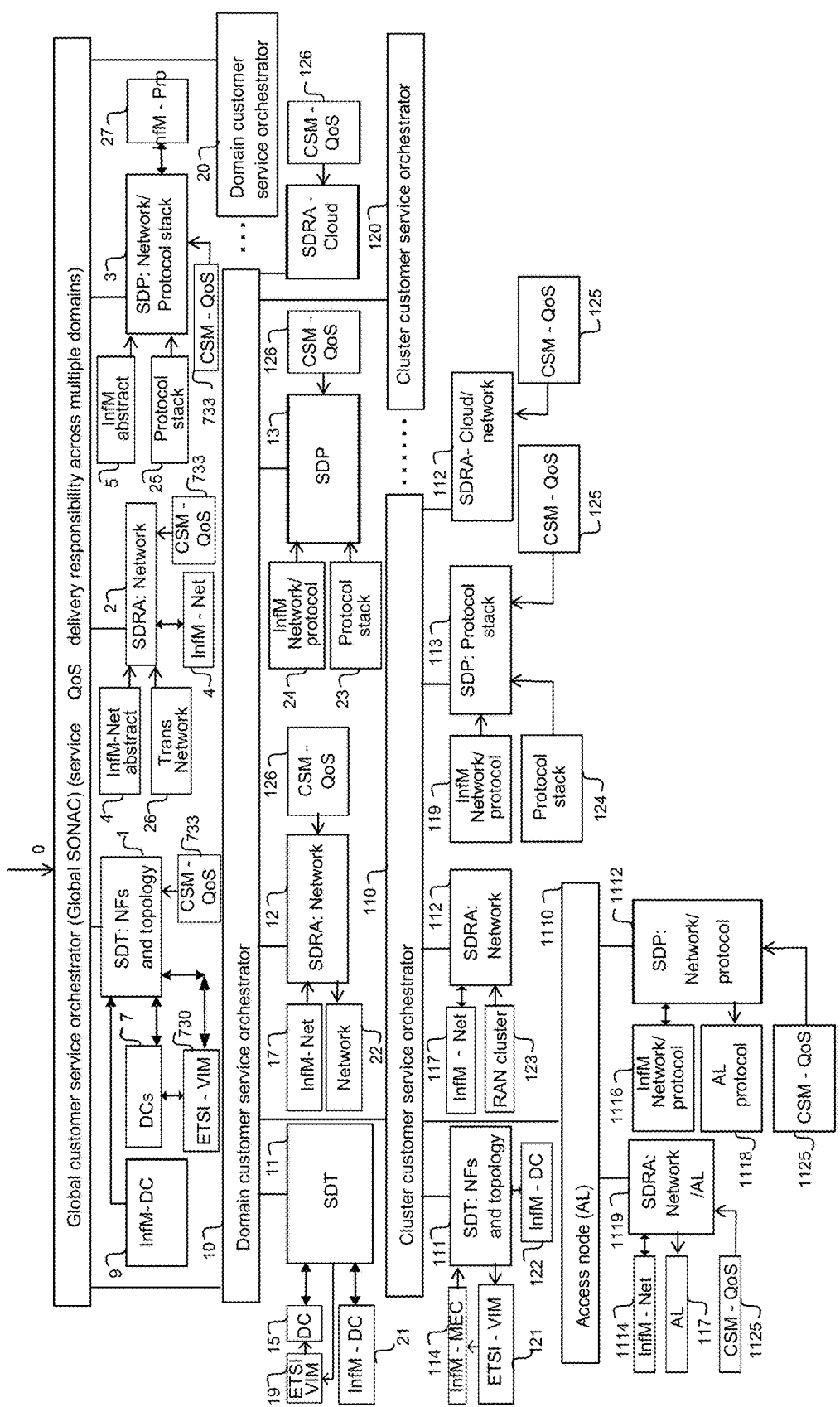
FIG. 9 illustrates a Service Slice Definition/Slice Realization for a Hierarchical domain, according to an embodiment.
Figure 19:
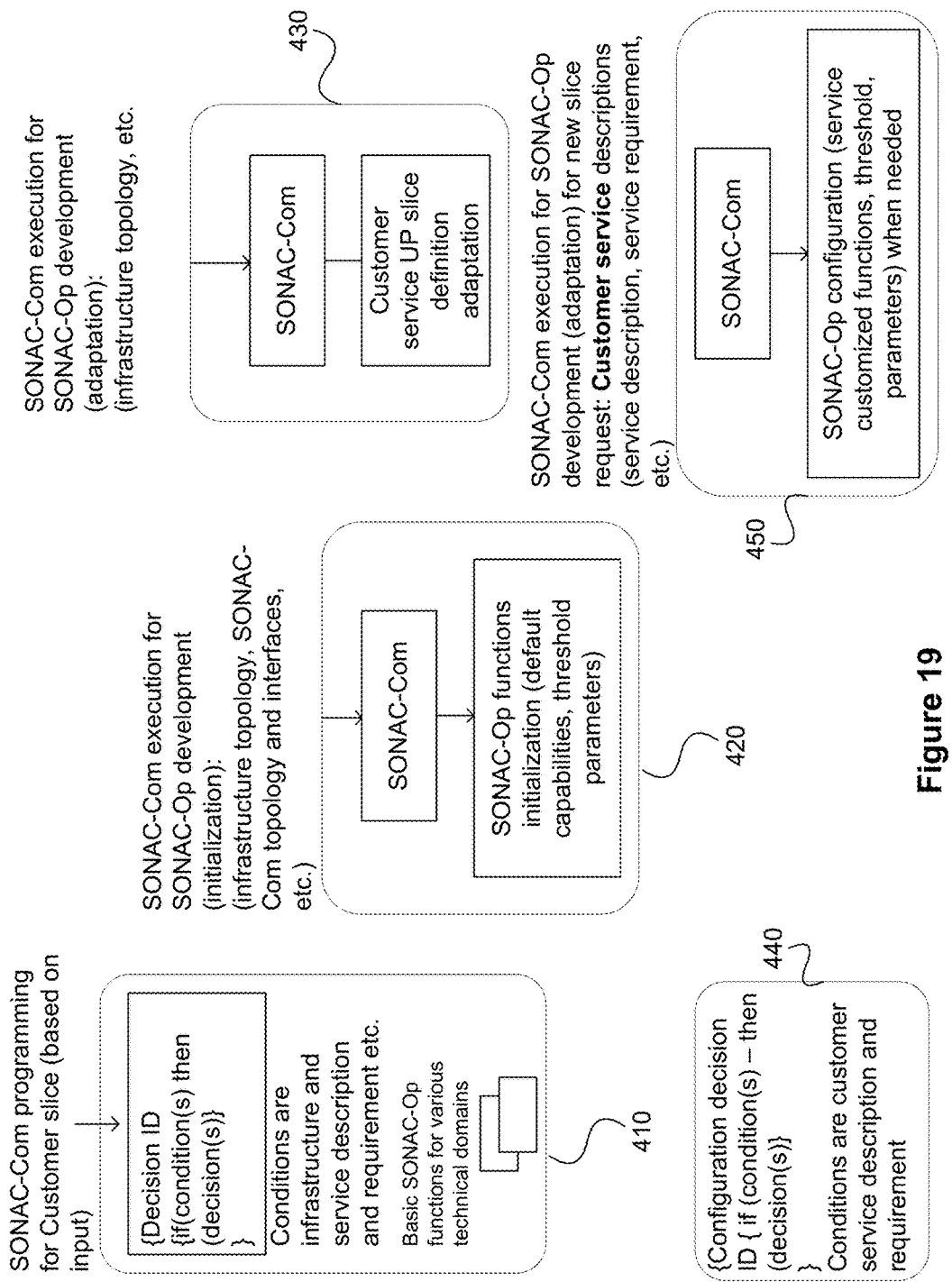
FIG. 19 illustrates the SONAC-Com execution to develop the SONAC-OP functions, according to an embodiment.

Slice development for customer slices will now be discussed, according to an embodiment. In such an embodiment, slice development can be an iterative procedure. An End-to-End SONAC (orchestrator) translates slice requester's requirements into per domain requirements. If domain(s) cannot provide resources to meet the requirements, end-to-end (global) SONAC can re-divide the QOS requirement among domains (the response from each domain should carry the information remaining resource). Such a procedure stops when either all domains can provide the required resources or requirements to domains cannot be satisfied after certain number of iterations. If the request cannot be satisfied, the requester may be notified. In some embodiments a Global SONAC function can negotiate with a slice requester Systems and methods for slice deployment will now be discussed, according to an embodiment. After a successful development procedure, a slice may be realized in the infrastructure networks. For cloud resources (DCs, MECs) SONAC may instruct DCs and MECs resource managers (e.g., NFV VIM) to instantiate NFs. For transport networks, including RAN BH, SONAC configures infrastructure equipment. After the procedure finished, a slice is ready to run (execution of NFs and data transmission). FIG. 19 illustrates a Service Slice Definition/Slice Realization for a Hierarchical domain, including an Initial definition and Admission control—Iterative procedure, according to an embodiment. The global customer service orchestrator (Global SONAC) 0 interfaces to the SDT 1 which in turn interfaces with the InfM 9, the ETSI VIM 730, and DCs 7. Global SONAC also interfaces with the SDRA 2, which in turn interfaces with the InfM Network abstractor 4 and transport network abstractor 26, and the CSM-QoS function 733. Global SONAC also interfaces with the SDP 3, which in turn interfaces with the InfM 27, the CSM-QoS function 733 and controls the protocol stack 25. Global SONAC also interfaces with the domain customer service orchestrator 10 and 20. The domain customer service orchestrator in turn interfaces with the SDT 11, which in turn interfaces with InfM 21, ETSI 19, and DCs 15, the SDRA 12, which in turn interfaces with InfM 17 and network 22, and the SDP 13, which interfaces with the protocol stack 23 and the InfM 24, and the Cluster customer service orchestrator 110 and 120. The cluster customer service orchestrator in turn interfaces with the SDT 111, which in turn interfaces with InfM 122, ETSI 121, and MEC 115, the SDRA 112, which in turn interfaces with InfM 117 and the RAN cluster 123, the SDP 113, which in turn interfaces with the InfM 119 and protocol stack 124, and the access node 1110. The access node 1110 interfaces with the SDRA 1119, which in turn interfaces with the InfM 1114 and the AL 1117, and the SDP 1112 which in turn interfaces with the InfM 1116 and AL protocol 1118. It should be appreciated that the InfM and CSM-QoS can also be inputs, though not shown in FIG. 9, to FIG. 9's SDT, SDRA, and SDP functions.

Slice Execution (Automation) will now be discussed, according to an embodiment.

Factors Impacting Slice Adaptation/automation will be discussed. Such factors may include Customer service assurance, which can be set and monitored by a CSM-QoS function. For example one factor which can trigger a change (adaptation) is when the QoS provided to a service within a customer service slice does not meet the QoS level promised to the service (this would not typically be triggered within a slice without traffic). Other examples include Slice resource efficiency (normal traffic, but over-provisioned), and Customer service traffic changes (demand and load distribution change). Other factors can include Infrastructure resource optimization, which can be monitored by an InfM function. This can include a Network infrastructure change to the DCs/NNs/Links which make up the GNWI. Another factor includes service application functions that are visible from the customer perspective. Another factor includes Infrastructure network load aspect, which can be monitored by a SONAC instance. For example, a new slice request may cause modifications to an existing slice.

Figure 10B:
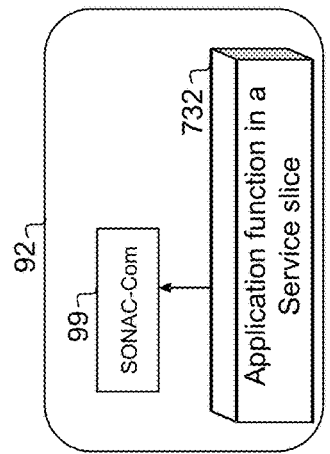
FIGS. 10A, B, and C illustrate examples of functions involved in slice automation.
Figure 10A:
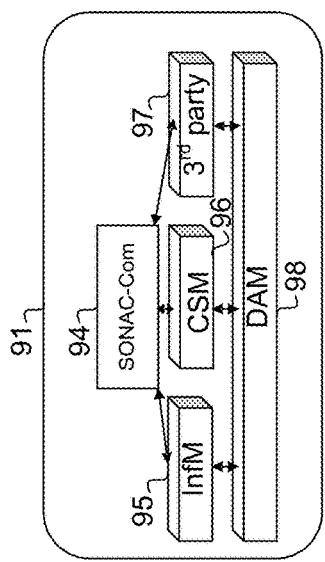
Figure 10C:
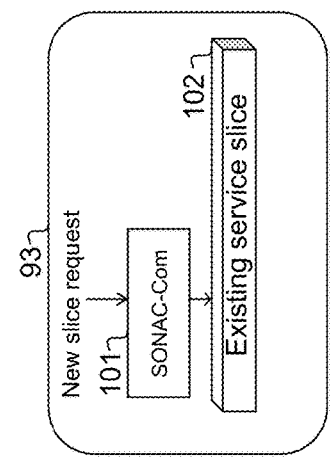

It should be appreciated that some slice adaptations are global in scale, and could impact an entire slice. The impact will typically be contained within the slice, and will not impact services in other slices. However, if the slice subject to the adaptation has been subdivided into further slices, the adaptation can be controlled to prevent unintended or unmanaged impacts on the environments within the internal slices. This can depend on the service scale. Other adaptations can be local and may not impact other parts of a slice. FIGS. 10A-C illustrate examples of functions involved in slice automation. FIG. 10A illustrates example NOS functions which actively involve slice automation, which according to an embodiment 91 operate in a closed loop procedure. For example, an InfM function 95 provides infrastructure resource pool control and management. A CSM function 96 provides customer service control and management which can ensure the slice resource best fits the customer service requirements. Third party 97 functions can also be allocated by SONAC-Com 94. A DAM function 98 can monitor a slice which includes built in controllable log functions distributed in the network infrastructure. FIG. 10B illustrates how other functions, such as a service application function 732, can trigger a slice adaptation, according to an embodiment 92 via SONAC-Com 99. FIG. 10C illustrates how other events, such as a new slice creation may cause modifications to an existing slice 102 by SONAC-Com 101, according to an embodiment 93.

Examples of MyNET platform and customer service slice adaptation will now be discussed, according to embodiments. SONAC-Com enable slice adapt to real-time change of certain conditions. Four examples will be discussed with reference to FIGS. 11A-D.

Figure 11A:
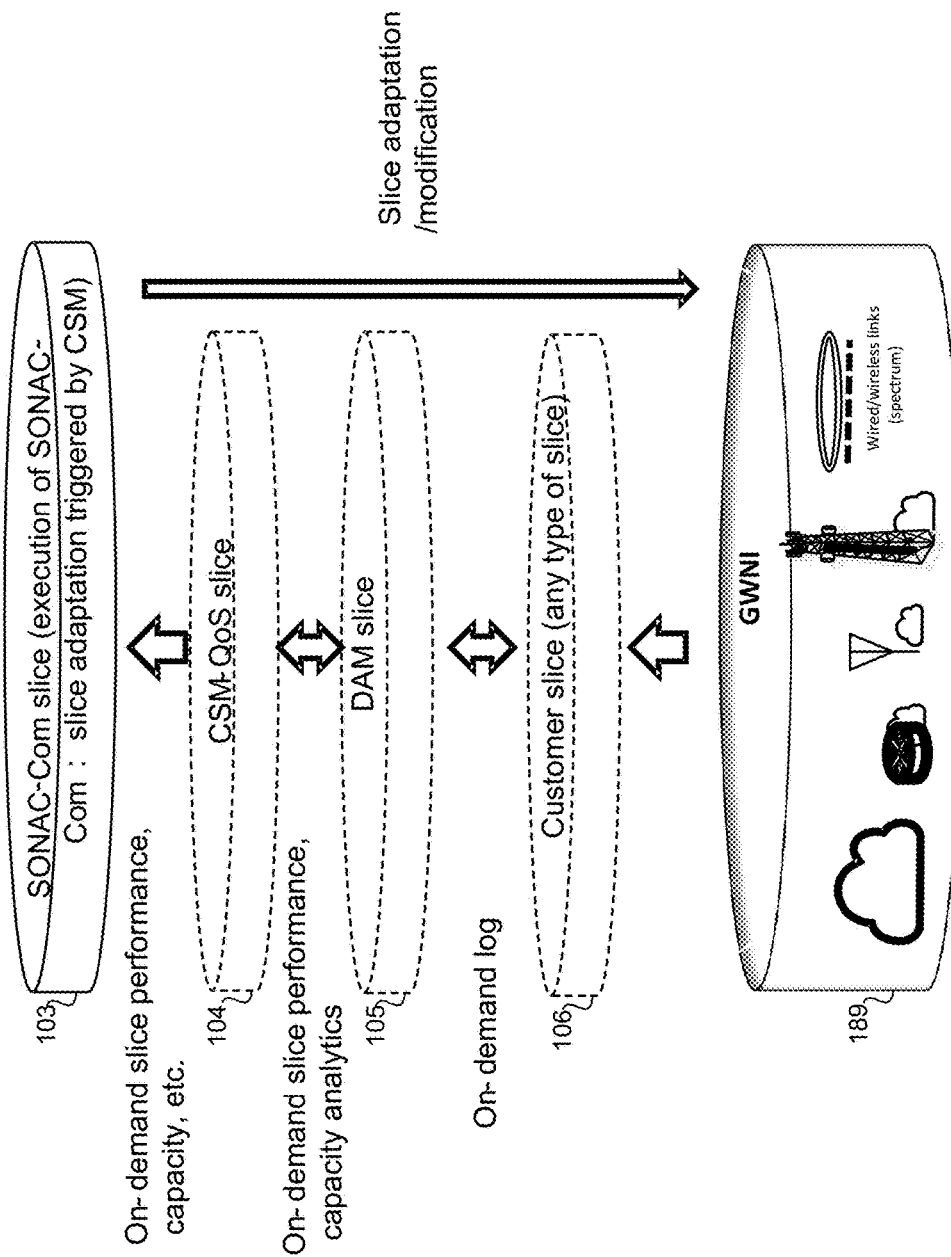
FIGS. 11A, B, C, and D illustrate factors impacting slice adaptation, according to an embodiment.

Slice Automation—Slice Service Assurance will now be discussed, according to embodiments. FIG. 11A illustrates an example of CSM-QoS and Slice Adaptation and Automation according to an embodiment. Such a process can make a slice fit the slice traffic load dynamics (e.g., due to a load distribution change). Such a process includes a CSM-QoS function 104 obtaining the slice performance requirement and traffic load expectation for the slice in which it is deployed. The CSM-QoS may check with DAM 105 for slice performance and slice traffic stats (policy) which are used by the CSM-QoS 104 to decide on triggering a slice adaptation/modification (policy). Accordingly the CSM-QoS function 104 may be involved with Slice Performance assurance to make the slice resource best fit the service attributes and QoS requirement. Accordingly CSM-QoS 104 may interact with DAM 105 for slice automation to determine if a Slice resource is over-provisioned. The CSM-QoS 104 may also engage with the DAM 105 to obtain information about the errors in estimations of the slice traffic. Estimating the traffic loads carried in user demand driven networks may be difficult. Updating estimates before they diverge too greatly may be beneficial. Accordingly the CSM-QoS function 104 can interact with SONAC for slice automation. The SONAC slice 103 performs these slice adaptation and modification tasks by interfacing with the CSM-QoS slice 104, DAM slice 105, and customer slice 106 to select resources from the generalized wireless network infrastructure 107.

Some embodiments may continuously track the traffic load to determine the requirements for a service slice adaptation, which can include the migration of a slice. For example, the current traffic load may not align with an initial description, with the traffic load possibly being higher or lower than the expected. Such conditions can trigger a service slice adaptation, depending on policy, which can be global or local.

In some embodiments, MyNET creates customer slices that are resource efficient. They are created so that they are not resource over provisioned when traffic load is less than or equal to the predicted value. A CSM function instantiated within in a DC CSM (DC) checks with and obtains a slice resource utilization report from the DAM at the DCs. This report is also used by the CSM as a trigger to reduce resources allocated by selected DCs. The CSM (transport) checks with the DAM to obtain a report of the slice resource utilization. This CSM uses this report to trigger a reduction in transport resources. CSM (RAN MEC) checks with the DAM at the RAN MECs to obtain a slice resource utilization report. This CSM uses this report to trigger a resource reduction at selected MECs. CSM (RAN BH) checks with the DAM at RAN BH to obtain a resource allocation report. This CSM uses this report to trigger a reduction in the transport resources. CSM (access link) checks with DAM at the access link to obtain a slice resource utilization report. This CSM uses this report to trigger AL resource reduction at selected nodes.

In some embodiments MyNET also allows the management of slice resources to avoid overprovisioning when customer service traffic changes as a result of migration. Embodiments of MyNET have a closed loop correction so that resources are allocated to only meet the requirements of slice traffic. MyNET can also handle with situations where the short term traffic load is higher than estimated. In this situation, CSM (DCs) check with DAM functions at DCs to obtain a report on slice traffic statistics. CSM (transport) checks with the transport DAM to obtain a report on the slice traffic statistics. This CSM compares the reported traffic statistics with initial predicted traffic statistics. This CSM uses this result as a trigger to determine if additional resources are required by selected DCs. This CSM then informs the customer service orchestrator or DC resource manager of any changes. CSM (transport) checks with DAM at transport to obtain a slice traffic statistics report. This CSM compares the reported statistics with the estimated traffic load to decide if additional resources are required. CSM (RAN MEC) checks with the DAM at MECs for a slice traffic statistics report. This CSM compares the statistics in this report with the estimated traffic load to determine if selected MECs require additional resources. CSM (RAN BH) checks with DAM at RAN BH to obtain a slice traffic report. This CSM compares the statistics in this report with the estimated traffic load to determine if additional BH resources are required. CSM (access link) checks with DAM ALs to obtain a slice traffic report. This CSM compares the statistics in this report with the estimated traffic load to decide if additional AL resources are required at selected access nodes.

Customer service assurance in terms of slice performance for CSM and DAM (DCs), CSM (transport), CSM (RAN cluster-MEC), CSM (RAN BH), and CSM (access link) is achieved by providing the CSM functions with input from the DAM functions. For all of these CSM functions, CSM configure the DAM on demand and due to an event trigger report. CSM configures DAM based on stats name (ID) and supplies performance metrics such as slice traffic latency.

For the CSM and DAM (DCs), CSM (RAN cluster-MEC), and CSM (access link) functions, CSM also configures DAM, selected for logging/monitoring, to provide NFs or a DC. CSM configures DAM with thresholds for event triggered reports. For example, trigger events could be when the traffic latency is higher than X ms at a NF or DC.

For the CSM (transport) and CSM (RAN BH) functions, CSM configures DAM with a threshold for event triggered reports. For example, in some embodiments where CSM (transport) functions are utilized, a trigger could be when the traffic latency is higher than X ms at the transport network or at a logical tunnel. Another example trigger, where an embodiment utilizes CSM (RAN BH), is when the traffic latency is higher than X ms at a NF or DC.

Customer resource efficiency and service traffic load change, due to migration, in terms of slice traffic load for CSM and DAM (DCs), CSM (transport), CSM (RAN cluster-MEC), CSM (RAN BH), and CSM (access link) the CSM needs to know the capabilities of the DAM. For all of these CSM functions, CSM configures the DAM on demand and due to an event trigger report. CSM configures DAM based on stats name (ID) and supplies slice incoming traffic stats. CSM also configures the DAM with the threshold for event triggered reports such as when the traffic load is higher or lower than X bps at a NF or MEC (RAN cluster-MEC), at RAN cluster (RAN BH), at an access node (access link).

For CSM (transport), CSM (RAN cluster-MEC), and CSM (access link) functions, CSM configures DAM as the target to be monitored. In an embodiment utilizing transport functions, logical tunnels can be monitored. In an embodiment utilizing RAN cluster-MEC functions, NFs or a MEC can be monitored/logged. In an embodiment utilizing access link functions, access nodes can be logged/monitored.

Slice Automation—Infrastructure Resource Optimization will now be discussed, according to embodiments.

The InfM function may monitor Infrastructure Resource usage efficiency for on-demand infrastructure resource provisioning. The InfM may check with DAM for GWNI performance and available capacity stats. The InfM may decide (based on defined policies) whether to increase/reduce the GWNI capacity (infrastructure resource pool size). This can include providing updated GWNI resource abstraction to SONAC and receiving resource usage registration from SONAC.

A non-limiting example involving InfM which can implement at least one of an infrastructure resource change and add infrastructure resource will now be discussed as an example of how to adapt the abstraction. Firstly, this example involves two infrastructure topology maps: infrastructure resources (owned by single or multiple infrastructure providers), and active infrastructure resources (part of development stage of slice creation). The remaining resource in active infrastructure resource (part of active infrastructure resources). When a new slice request is received, SONAC can determine the following: If the remaining resources within an existing slice are sufficient to accommodate the new request without changing the existing slice; If the remaining resources are not sufficient but there are sufficient active resources this information can be provided to the InfM; SONAC can also determine that the active resources are insufficient to accommodate the new request but the developed resources are sufficient. In the event that the developed resources are insufficient SONAC can keep rejection rate and can send an indication to the InfM to request the integration of more infrastructure resources. Secondly, InfM can provide remaining/active infrastructure Map to SONAC and SONAC can register the resources allocated to a slice with the InfM. Thirdly, InfM can negotiate with other infrastructure providers to obtain additional infrastructure resources if the slice request rejection rate is higher than a threshold. Fourthly, InfM can be configured with the candidate $3^{rd}$ party infrastructure resources and certain agreements should be in place to support this on-demand integration of infrastructure resources. Further details of INFM slice adaptation, according to some embodiments, will be discussed below with reference to FIG. 11B.

FIG. 11A illustrates an example of slice adaptation triggered by CSM-QoS, according to an embodiment. CSM-QoS 104 provides slice resource utilization optimization and slice service performance assurance. The slice is defined based on statistics (by SONAC-Com 103) of distribution of devices, traffic load, and QoS requirement provided by slice requester. There are multiple reasons which can require adaptation of slices from customer service slice perspective. First of all, although a SONAC-Com algorithm is developed to try to best match resources with demands, certain level mis-match can occur. Whenever such mis-matching is identified by CSM-QoS, modification of the slice resources can be performed. This includes over-provisioning or insufficient of resource allocation. For over-provisioning of slice resources, infrastructure network resources may not be efficiently used for other slices and may result in unnecessary cost to the slice owner, i.e., for dedicated physical resource allocation case. The insufficient resource allocation to a slice may cause the service performance delivered to not match the performance promised by slice provider. These can be identified by CSM-QoS through slice resource utilization statistics and slice performance statistics. Secondly, the description of service attributes by slice requester may not be perfectly reflect the real service attributes. CSM-QoS can monitor the statistics of pattern of traffic load, etc. and correct the initial service description. Thirdly, for some service, by nature, it is difficult to provide accurate description in advance due to dynamics of traffic load and mobility, etc. Embodiments allow the slice resource allocation to adapt to such dynamics after the initial deployment. CSM-QoS can monitor the slice traffic load change and migration and trigger slice adaptation.

CSM-QoS functions are designed to make sure that the slice service performance is satisfied during the entire slice lifecycle, and ensure that the slice resource matches the slice traffic. In the embodiment shown in FIG. 11A, this may be a close-loop control system, and can continuously operate during the entire lifecycle of a customer slice 106. After a slice is developed and deployed, CSM-QoS 104 can be configured and information of this newly created slice can be informed to the CSM-QoS 104. This information can include a slice service description and the service requirements. This information can be used by CSM-QoS 104 as certain thresholds to compare against measured performance in order to trigger slice adaptation. This function is owned by slice providers.

For triggering a slice adaptation, CSM can send message (slice adaptation request) to SONAC-Com 103 functions which is responsible for slice adaptation triggered by CSM, as described above. The message can include the following contents: slice ID, cause ID (e.g., slice resource utilization statistics, slice service performance statistics, slice traffic behavior statistics), corresponding information. After receiving the request, SONAC-Com 103 determines topology change, or only slice resource modification (increase or reduce slice resource), protocol functions, etc.) of the UP slice and reconfigure NOS and SONAC-Op if needed.

CSM-QoS function 104 obtains statistics of slice resource utilization, slice service QoS, and long term slice traffic behavior. CSM-QoS, as configured by SONAC-Com, may trigger the slice modification. For the cases where over-provisioning of slice resource is identified, CSM-QoS 104 may, as configured by SONAC-Com 103, inform domain/end-to-end resource coordination function of SONAC-Com. The resource coordinator modifies the slice resource allocation. For the cases where mis-match between delivered slice service performance (from DAM slice 105) and the promised performance is identified, CSM-QoS interacts with domain service coordinator (end-to-end service coordinator). This may trigger slice resource allocation modification (resources are requested from the GWNI 189). For the cases where the long term statistics of traffic load distribution is different that is provided to SONAC-Com by customer. The information may need to be sent to customer and service coordinator. This may results in the adjustment of the slice resource allocation modification. For the cases where the traffic load, by nature, is difficult to estimate, CSM-QoS needs to more frequently monitor the traffic load change and report to resource coordinator to make the SONAC-Com to perform slice adaptation.

Figure 11B:
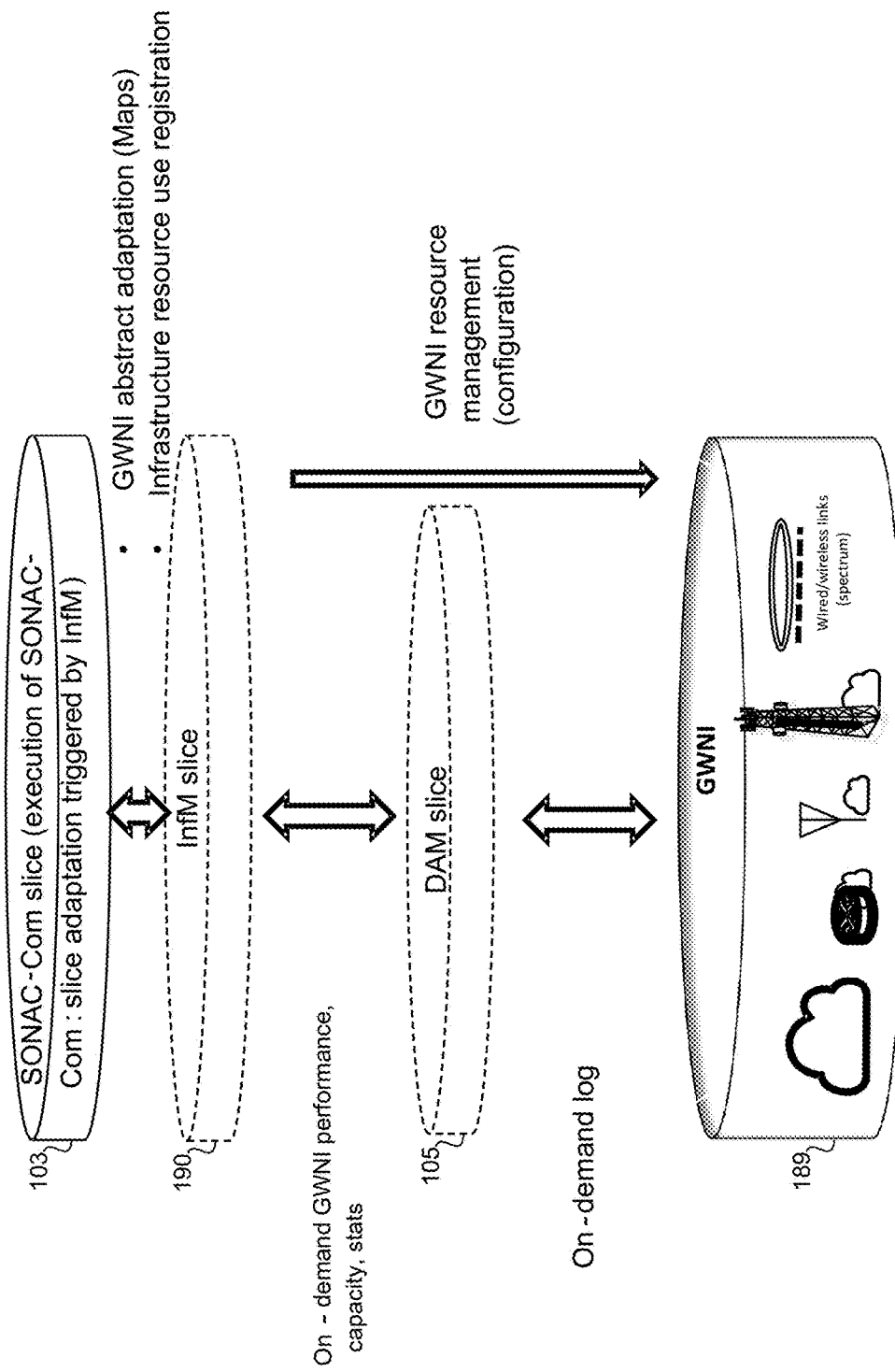

FIG. 11B illustrates an example of slice adaptation triggered by InfM 190, according to an embodiment. Infrastructure resource optimization, which can be determined by the DAM slice 105 can result in the change of Infrastructure network topology, capacity, etc. This can cause the adaptation of existing slices and be triggered by InfM functions. Three non-limiting examples include an Infrastructure network equipment degradation, i.e., equipment failure, etc. InfM is responsible to the infrastructure network performance assurance by monitoring the infrastructure equipment and make decision on infrastructure network adaptation. A second example is a wireless backhaul network node configuration. (e.g., power-on/off, etc). One of the responsibilities of InfM is to determine the RAN backhaul network topology based on traffic load statistics, i.e., power-on/off wireless network nodes. A third example is an on-demand integration of additional infrastructure networks. When the infrastructure network resources are not sufficient to admit new slice request and if on-demand infrastructure integration is possible, InfM can trigger the integration and enlarge the integrated infrastructure network resource pool size. The change in infrastructure network topology, resource capacity, etc, can result in adaptations of some existing slices impacted by the change.

InfM function 190 manages the infrastructure resource utilization optimization. For InfM triggered slice adaptations, InfM 190 sends a message to SONAC-Com function 103, which in some embodiments may be within a SONAC-Com slice 103 which is responsible to process the request message sent by InfM 190 for slice adaptation. The information carried in this message includes infrastructure network description (domain ID, equipment ID, etc), information of infrastructure network updates, and possibly other information supplied by the DAM slice 105.

SONAC-Com, after receiving this message, can determine the slices which have been impacted, determine any adaptation of current slices; reconfigure NOS slices and SONAC-Op slices if needed.

For the cases the infrastructure equipment/elements performance degradation is identified by InfM function, InfM can take certain actions to such events, e.g., activate backup system. At the same time, if this causes changes in the infrastructure topology, capacity, etc. InfM function 190 can inform domain and end-to-end SONAC-Com 103 by providing the updated infrastructure network information. For the cases where the infrastructure resource utilization rate is low, InfM 190 can react to this by de-activating certain infrastructure elements, or some sub-systems of equipment. Notification of such a change can be sent to SONAC-Com 103. For the cases where the rejection rate of slice creation requests by SONAC-Com 103 is higher that a pre-configured threshold, InfM 190 may trigger additional infrastructure network integration. This update is informed to SONAC-Com 103.

For the cases where the access link frame structure needs to be modified based on traffic load statistics (from DAM 105), InfM 190 can configure the frame structure and inform SOMAC-Com and SONAC-Op by requesting resources from the GWNI 189.

Figure 11C:
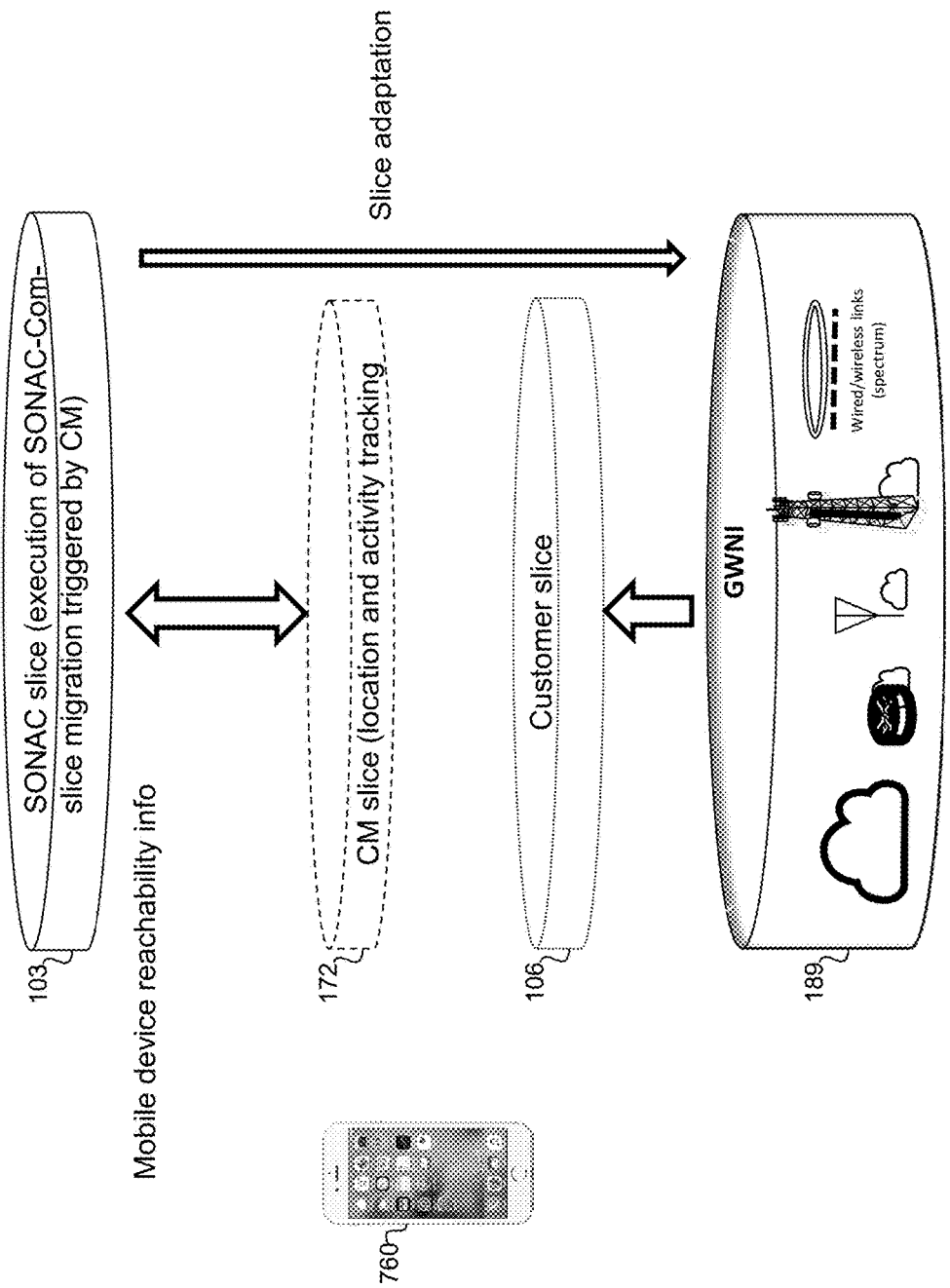

FIG. 11C illustrates an example of slice adaptation triggered by CM 172, according to an embodiment. In some cases a customer slice dedicated to a customer with mobile devices 760, e.g., some service specific functions associate with devices. In this case, the slice topology may be adapted to the movement of mobile devices. In this case, the locations of the devices (via CM 172) of the slice may trigger the adaptation of current customer slice 106, i.e., the slice topology needs to be modified. This is called a slice migration.

For the case where a slice is designed for a customer with certain number of mobile devices and service specific functions. The migration of devices may cause the slice migration, i.e., functions are migrated from one place to another place. Such a migration may be triggered by CM function which is responsible to perform device location tracking.

To enable this, CM function 172 (for this slice) can be configured to trigger slice migration if certain condition is met. The slice migration request message sent by CM function to SONAC-Com 103 can include information, such as, slice ID, mobile device migration information, etc.

SONAC-Com function 103 which is responsible for processing slice migration request needs to determine the adaptation of a current slice. This may include new function instantiation or activation or configuration of pre-installed functions, reconfigure NOS and SONAC-Op if needed. These functions are obtained from GWNI 189.

Figure 11D:
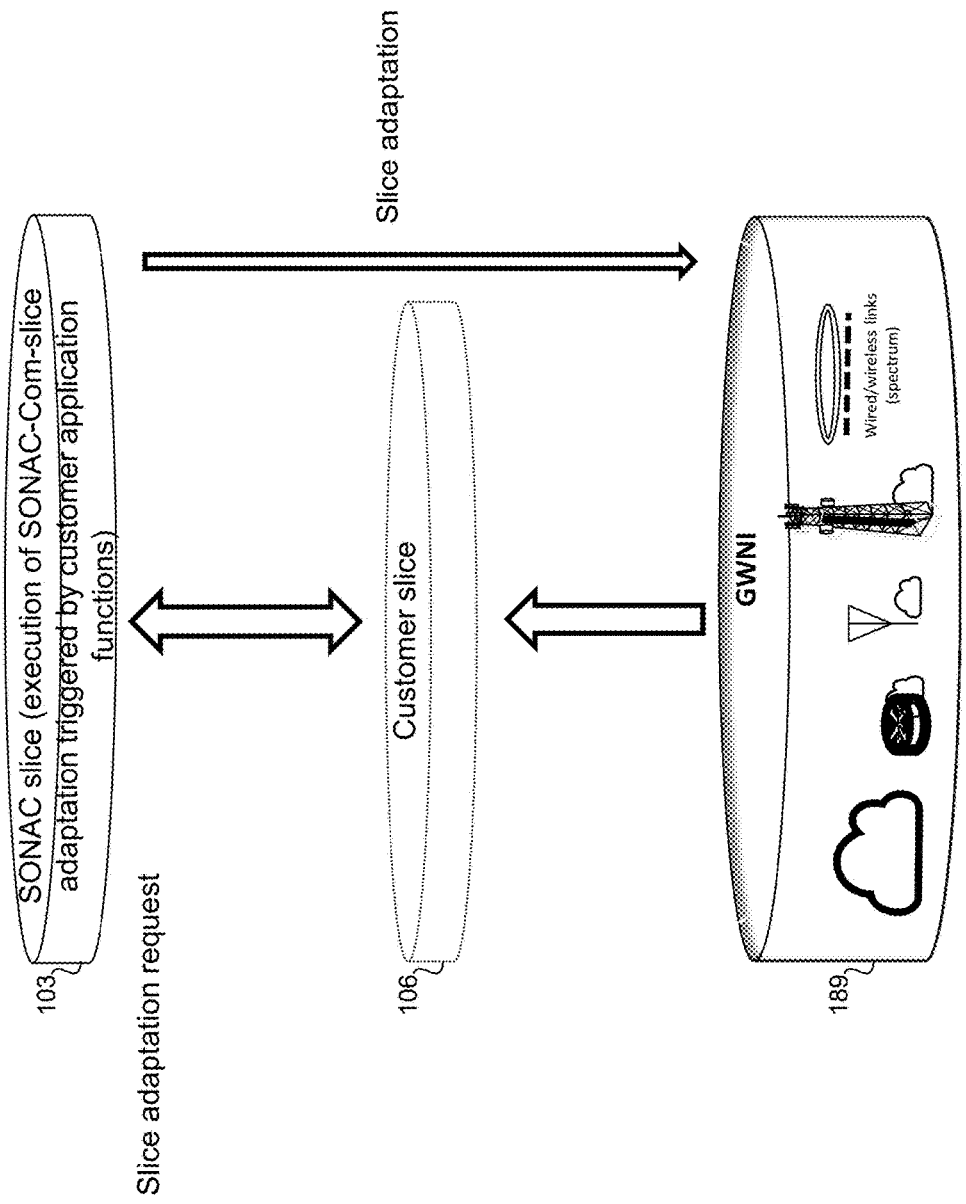

FIG. 11D illustrates an example of slice adaptation triggered by a service/application function, according to an embodiment. For example, for some services, the density of devices or the traffic load distribution may adapt to certain event. This may require slice adaptation to the event. Such event can be detected by service application function. In this case, application function may trigger slice adaptation. The interface between such an application function and SONAC-Com 103 can be configured at initial slice deployment.

For services which require application function/server trigger slice adaptation during slice operation, the application function can interact with SONAC-Com 103 to trigger a slice adaptation. The interface between application function and SONAC-Com 103 can be defined or reuse the API interface for customer at the slice initialization.

For this case, service application function can interface with SONAC-Com and customer slice 106 to trigger slice adaptation and request resources from the GWNI 189. The message requesting slice adaptation may carry information such as, slice ID/service ID, service descriptions, service requirement, etc. the API interface can be reused here for this purpose. SONAC-Com 103 function processes the request from service application function to determine the impacted segment of the slice, determines the adaptation of the current slice, and reconfigures NOS and SONAC-Op if needed.

While not illustrated, another example is CFM for content delivery optimization. For a CF (content and forwarding) slice, based on the statistics of requests of certain contents, and content delivery, CFM may trigger an existing CF slice to adapt to the detected change, e.g., to instantiate caches close to edge of the networks to reduce. CFM function can send request message to SONAC-Com for this purpose. This message may carry information, such as, device distributions which are expected to be interested in certain contents, and performance requirement of content delivery.

MyNET provides for on demand activation of the resource infrastructure. The InfM of DCs receives requests from SDT (DCs) and as a result, activates DCs (when possible) and also provides an updated "active DC infrastructure map". The InfM of the transport network (in multiple domains), for the transport resource case, activates transport resources in response to a request received from the SDRA. This InfM also provides an updated "active transport infrastructure map". The InfM of the RAN cluster (MEC) activates MECs in response to a received request from the SDT (RANs). This InfM also provides an updated "active MEC infrastructure map". The InfM of the RAN BH activates RAN nodes (access nodes as BH nodes based on policy) in response to requests received to the SDRA (RAN BH). This InfM can allocate a spectrum or an entirely new BH infrastructure topology. This InfM also provides an updated "active RAN BH infrastructure map". The InfM of RAN access link (AL) for the frame structure allocates additional spectrum in response to requests received from the SDRA (AL). This InfM can also provide resource coordination for ALs in terms of power, time, frequency, and code domain. After this InfM has completed configuration, it provides an updated "AL infrastructure map" to the SDRA-AL.

MyNET also provides for deactivation of infrastructure resources in order to optimize resource allocation. In this situation, InfM of DCs iteratively and periodically (specified by policy) check resource usage with the DAM (DCs). Based on these checks, this InfM deactivates selected DCs and provides an updated "active DCs infrastructure map" to SDT (DCs). The InfM of the transport network periodically checks for resource usage with the DAM as defined by the policy. Based on these checks, this InfM decides whether it should deactivate certain transport infrastructure resources. This InfM also provides an updated "active transport infrastructure map" to the SDRA transport network. The InfM of RAN cluster (MEC) checks resource usage with the DAM (MECs) periodically as specified by policy. The decision on deactivation of selected MECs is based on these periodic resource checks. This InfM also provides an updated "active MEC map" to the SDT MECs. The InfM of RAN BH periodically checks resource usage with the DAM as defined by policy. Its decision on deactivation of selected BH nodes is based on these resource checks. This InfM also provides an updated "active RAN BH infrastructure map" to the SDRA RAN BH. The InfM of RAN access links (AL) for the frame structure periodically checks resource usage as defined by policy. This InfM decides to deactivate selected access nodes or deallocate selected spectrum based on these checks. This InfM also provides an updated "active access infrastructure map" to the SDRA-AL.

MyNET integrates third party infrastructure resources so that all NOS slices are updated as technology changes. In this situation, InfM of DCs receives a request for additional infrastructure resources from the customer slice orchestrator. A high rejection rate of these requests creates a bottleneck for resource allocation. This InfM negotiates with candidate DCs based on these decisions. This InfM also provides an updated "active DC infrastructure map" to the SDT (DCs). The InfM of the transport network receives requests for additional infrastructure resources from the customer slice orchestrator. Decisions as to whether additional resources should be allocated trigger negotiation with candidate transport infrastructure based on policy. InfM of RAN cluster (MEC) receives requests for additional infrastructure resources from the customer slice orchestrator. This InfM's decision, based on policy, of whether or not to allocate additional resources is the trigger to negotiate with candidate RAN infrastructure providers. This InfM also provides updated "active MEC map" to SDT RAN clusters. The InfM of RAN BH receives requests for additional infrastructure from the customer service orchestrator. This InfM's decision is the trigger to begin negotiation with candidate RAN BH providers. This InfM also provides an updated "active RAN BH infrastructure map" to the SDRA (BH). The InfM of RAN access link (AL) for the frame structure receives requests for additional infrastructure from the customer service orchestrator. This InfM's decision whether or not to provide additional infrastructure triggers negotiation with RAN candidate infrastructure providers or a spectrum of providers. This InfM also provides an updated "active access infrastructure map" to the SDRA-AL.

MyNET also allows for the release of third party infrastructure resources. In this situation, InfM of DCs periodically, as defined by policy, checks DAM for resource allocation. Based on these checks, this InfM makes a decision if it should release selected third party DCs. This InfM also provides an updated "active DCs infrastructure map" to SDT DCs. The InfM of the transport network periodically checks resource usage with DAM based on policy. Based on these checks, this InfM makes a decision if it should release selected third party transport infrastructure resources. This InfM also provides an updated "active infrastructure map" to the SDRA transport network. The InfM of RAN cluster (MEC) periodically checks resource usage with the DAM (MECs) based on policy. Based on these checks, this InfM decides if it should release selected MECs. This InfM also provides an updated "active MEC map" to the SDT (MECs). The InfM of RAN BH periodically checks resource usage with the DAM based on policy. Based on these checks, this InfM decides if it should release selected third party RAN BH. This InfM also provides an updated "active RAN BH infrastructure map" to SDRA (RAN BH). The InfM of RAN access link (AL) periodically checks resource usage with DAM. Based on these checks, this InfM makes a decision if third party access nodes or if a selected spectrum should be released. This InfM also provides an updated "active access infrastructure map" to SDRA-AL.

MyNET also can accommodate the situation where infrastructure performance degrades—even to the point of failure. In this case, InfM of DCs configures DAM for DC performance monitoring and sets a threshold for issuance of an alarm (based on policy). This InfM also determines when to trigger NFs migration, based on policy, or if backup DCs should be activated. Either decision is reported to the SONAC. The InfM of transport network configures both the DAM for infrastructure network performance monitoring and the DAM for link performance monitoring. This InfM also sets the threshold used to issue an alarm for both DAMs. This InfM determines the threshold to activate alternative equipment and links. The configuration is provided to the SONAC. The InfM of RAN cluster (MEC) configures DAM for MEC performance monitoring and the threshold to issue an alarm. This InfM also determines, when triggered, the NF migration as well as when to active backup MECs. This InfM provides this configuration the SONAC. The InfM of RAN BH configures DAM for RAN cross-haul performance monitoring as well as the alarm threshold. This InfM also determines, when triggered, the topology change to alternative links and provides this configuration to the SONAC. The InfM of RAN access link (AL) for the frame structure, configures the DAM for access link performance monitoring as well as the alarm threshold. This InfM also determines, when triggered, topology changes. These changes could be to turn off some access nodes, turn on other backup nodes, or increase AL resources for neighboring nodes (based on power and spectrum).

Infrastructure performance degradation (i.e. failure) for DC's InfM, transport network InfM (which may be multiple domains), RAN cluster (MEC) InfM, RAN BH InfM, and RAN access link (AL) frame structure can be either or both of monitored and logged. InfM configures the DAM on demand and in the event of a trigger report. InfM also configures the DAM with the stats name (ID) based on performance load, with a threshold for event triggered reports, and the target to be logged/monitored. Examples of the target are a DC (for an InfM associated with a DC), equipment or link (InfM associated with transport network or RAN BH), MEC (RAN cluster InfM), and access node (RAN access link (AL) InfM).

Slice migration as an example of slice automation, according to an embodiment will now be discussed. This can allow for device specific NFs (e.g., device specific SGWs/ Anchor point)) migration. For example, a CM function tracks mobile device reachability (which can be based on policy) and determines the need for triggering a slice adaptation (e.g., device specific SGW/AP migration, which can involve migrating a device from one serving slice to another). The CM interacts with SONAC to implement any required migration and possibly obtain new triggering conditions/policy. In some embodiments the CM function encompasses a CM slice for location and activity tracking.

Examples of New slice impacting existing slice will now be discussed illustrating an example of SONAC and policy. In such an example, SONAC can calculate the logical topology for the new service and when there are conflicts, SONAC may need to change the existing slice topology to avoid denying the new request for addition of infrastructure resources. The procedure for the adaptation could be local or global, and is similar to that of new slice creation. Policy considerations may include NF relocation, determining whether to add new NF (e.g., for load balance or if a new logical tunnel is needed), and determining whether dedicated physical resources are needed. Depending on at least one of a request's importance level, and the capacity of an existing slice, SONAC decides if a current slice can accept a new request or can be modified to accept a new request.

Figure 12:
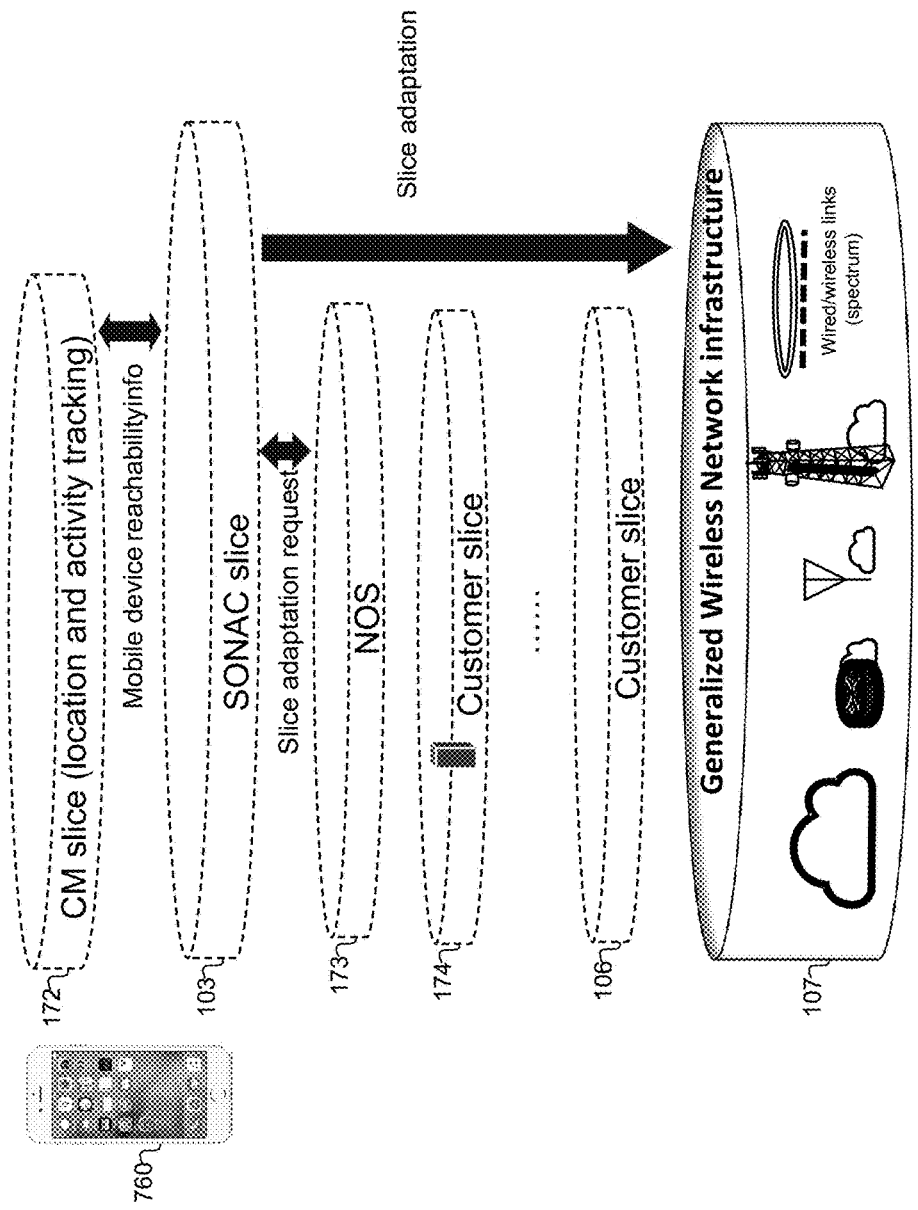
FIG. 12 illustrates a generic NOS Slice, according to an embodiment.

Examples of Slice Automation—Slice Customer Service Dynamics will now be discussed. It should be appreciated that such a procedure can be applicable to other NOS slices, and customer slices. FIG. 12 illustrates an approach for a generic NOS Slice to automatically cause adaptation of a customer slice. Generally function entities within NOS slices are configured for NOS slice adaptation according to policy. Accordingly an NOS application function 173 can be configured with policy considerations based on information from CM slice 172 on location and reachability information of a mobile handset 760. This slice adaptation request triggers a request to SONAC 103 to trigger a slice adaptation to GNWI 107. Similarly, slice customers 174 through 106 can configure application functions based on customer policy to trigger an adaptation of their current slice. Accordingly, during the slice execution, the application function communicates with SONAC to trigger a slice adaptation.

Figure 13:
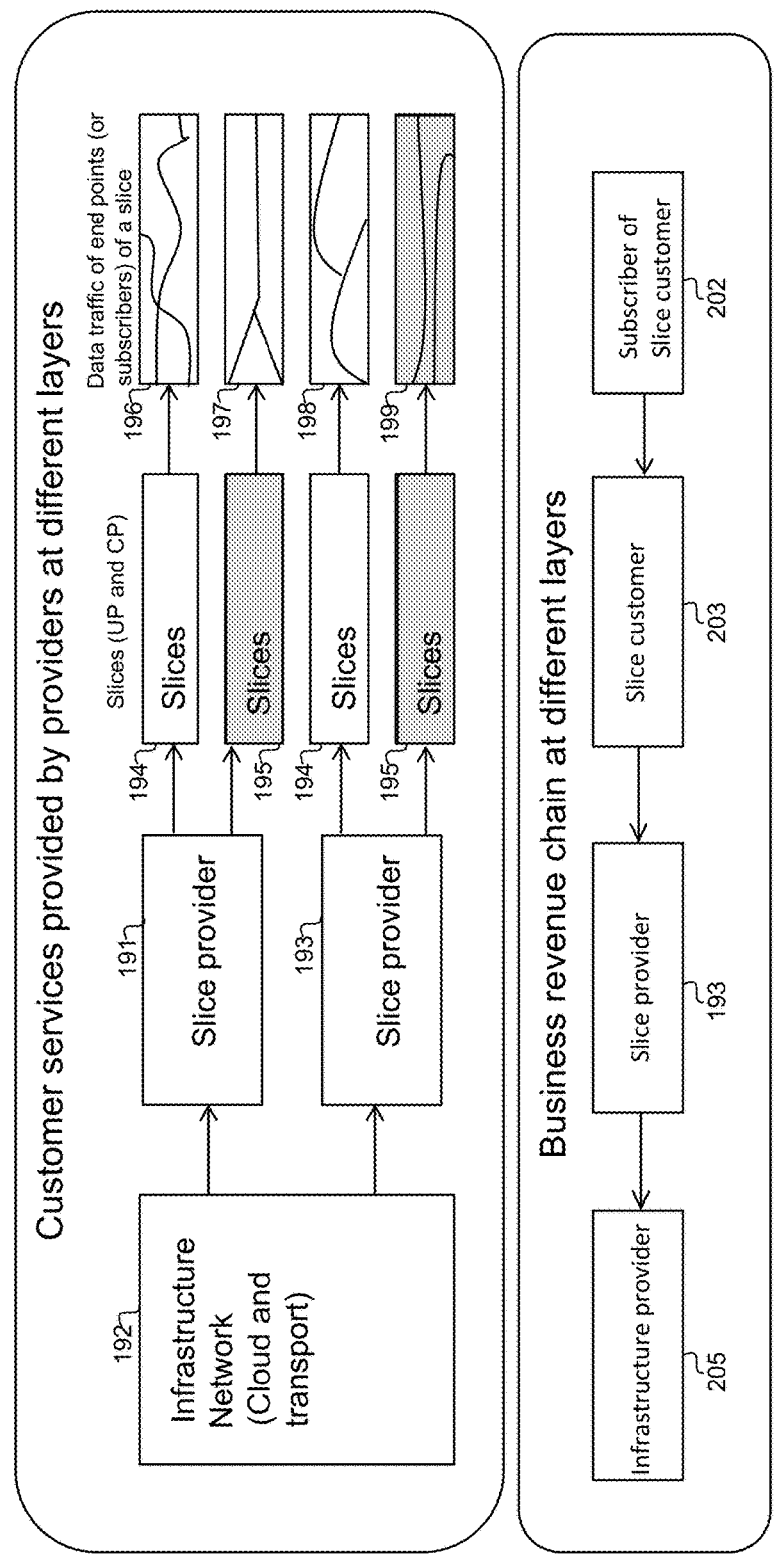
FIG. 13 illustrates an example of providing business revenue assurance for single domain but for multiple slice providers, according to an embodiment.

When a new slice request is received, the SONAC (slice) can re-evaluate slice resource allocations for existing slices, effectively performing a load distribution corresponding to the infrastructure capacity. In some embodiments this can include either or both of a global or local optimization when a new slice request is received. Accordingly SONAC can determine whether to modify selected existing slice(s) based on policy. FIG. 13 illustrates an embodiment where the infrastructure network 192 initiates such a request through multiple slice providers 191, 193 to UP and CP slices 194 and 195 which terminates at various endpoints (or subscribers) of a slice 196, 197, 198, and 199 with different data traffic.

Figure 14:
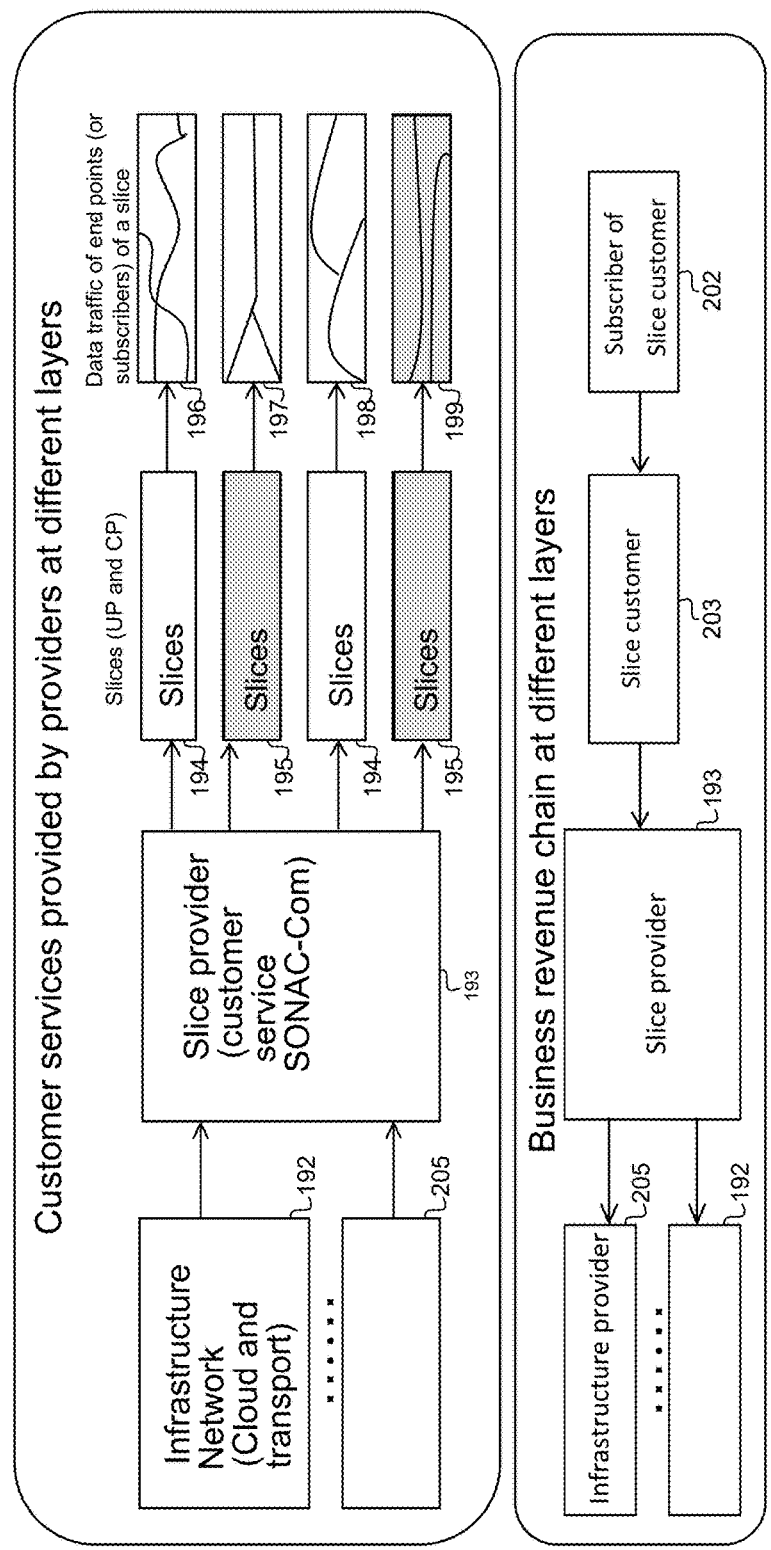
FIG. 14 illustrates an example of providing business revenue assurance for multiple administrative domains, according to an embodiment.

Such a reconfigurable network can provide business revenue assurance, according to an embodiment. In some embodiments such assurance can be on at least one of a slice level and a subscriber level. The lower portion of FIG. 13 illustrates an example of providing business revenue assurance (BRA) for single domain for a single slice provider 193, according to an embodiment. The business revenue chain is initiated by the subscriber of slice customer 202, whose request is passed by slice customer 203 to slice provider 193 to the infrastructure provider 205. FIG. 14 illustrates an example of providing business revenue assurance for multiple administrative domains, according to an embodiment. In this embodiment, the subscriber of a slice customer 202 initiates a request that is passed through slice customer 203 to slice provider 193 to multiple infrastructure providers 192, 205. In some embodiments the CSM-Charging function receives input from BRA functions. For example the BRA functions can operate globally to coordinate statistics across domains and to create global statistics. It is noted that that this can be done regardless of whether BRA is instantiated as domain slices. FIG. 14 also shows multiple infrastructure networks 192, 205 as the point where requests originate. These requests pass through the slice provider 193 to the UP and CP slices 194 and 195 to multiple endpoints (or subscribers) of a slice, 196, 197, 198, and 199, that each have their own unique data traffic.

For both scenarios a CSM-Charging function can be based on policy provided by a global service orchestrator can include log level charging and placement of log (DAM) for charging. Log level for charging can be at the session level (for an application session of a subscriber (per session charging)), at the subscriber level (for slice customers with subscribers (individual charging)), at the slice customer level (for slice customer with its devices/servers, e.g., a smart meter reading customer (charging a service customer of a slice owner)), at the slice level—for slice owner (charging a slice owner), or at the infrastructure level (for infrastructure provider (charging a slice provider)). Placement of the logging functions or the logs themselves (which may be used by a DAM function) for charging can be at the individual domain level (for each admin domain) or at an optimized charging log location (best location of log for charging, independent of domains). It should be appreciated that the rules of charging are negotiated with slice provider and that charging integration includes charging counts on all slices and customer service slice and also NOS services.

Figure 15:
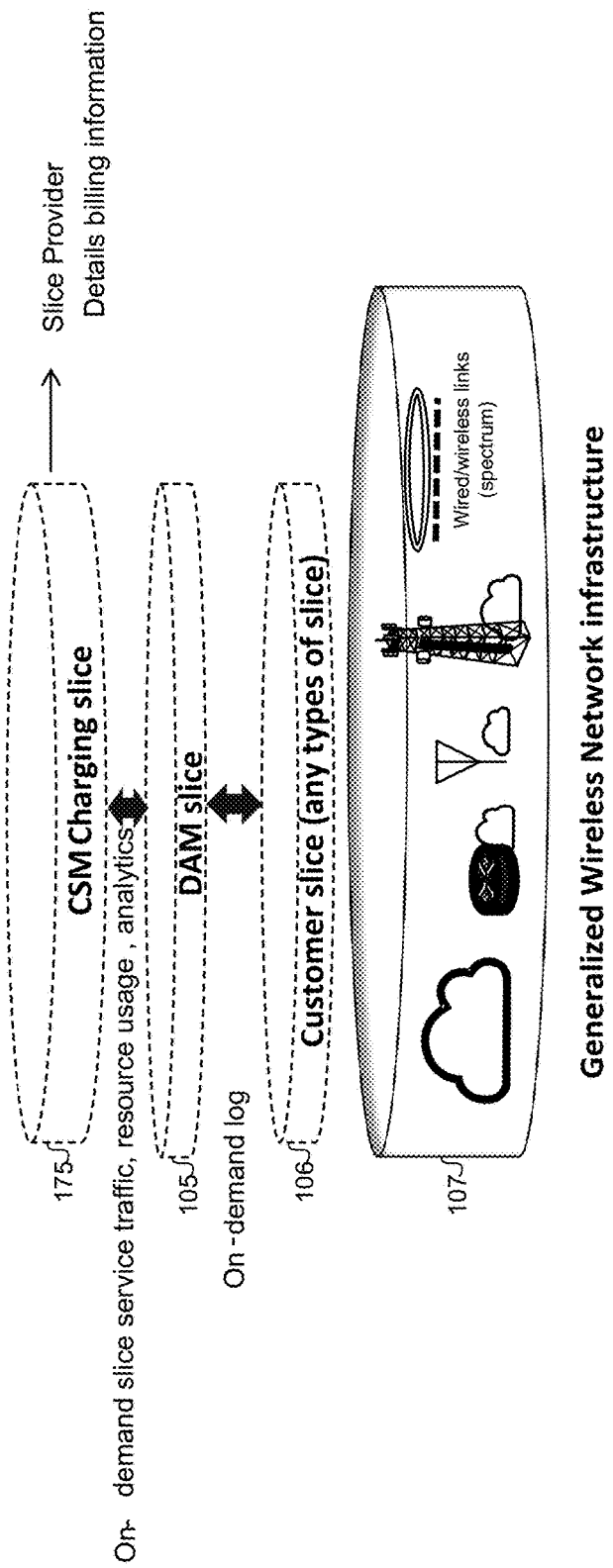
FIG. 15 illustrates an example of a CSM-charging slice which can provide customized and flexible charging, according to an embodiment.

FIG. 15 illustrates an example of a CSM-charging slice 175 which can provide customized and flexible charging, according to an embodiment. CSM-Charging configures and checks with the DAM slice 105 for statistical logging and analytics (policy) from the customer slice 106 and information from the GWNI 107. In some embodiments the CSM-Charging slice can collect charging information for End-to-End slice providers. In some embodiments an overarching slice can track charging in each domain of a network of slices from a number of different providers (multi-domain).

Other embodiments can provide flexible collaborations between different entities. Embodiments can provide a flexible environment which allows for ownership and control of various network functions by various parties, and allow different levels of openness between them.

Before discussing further details of this framework development, an example network architecture will be introduced.

Figure 16:
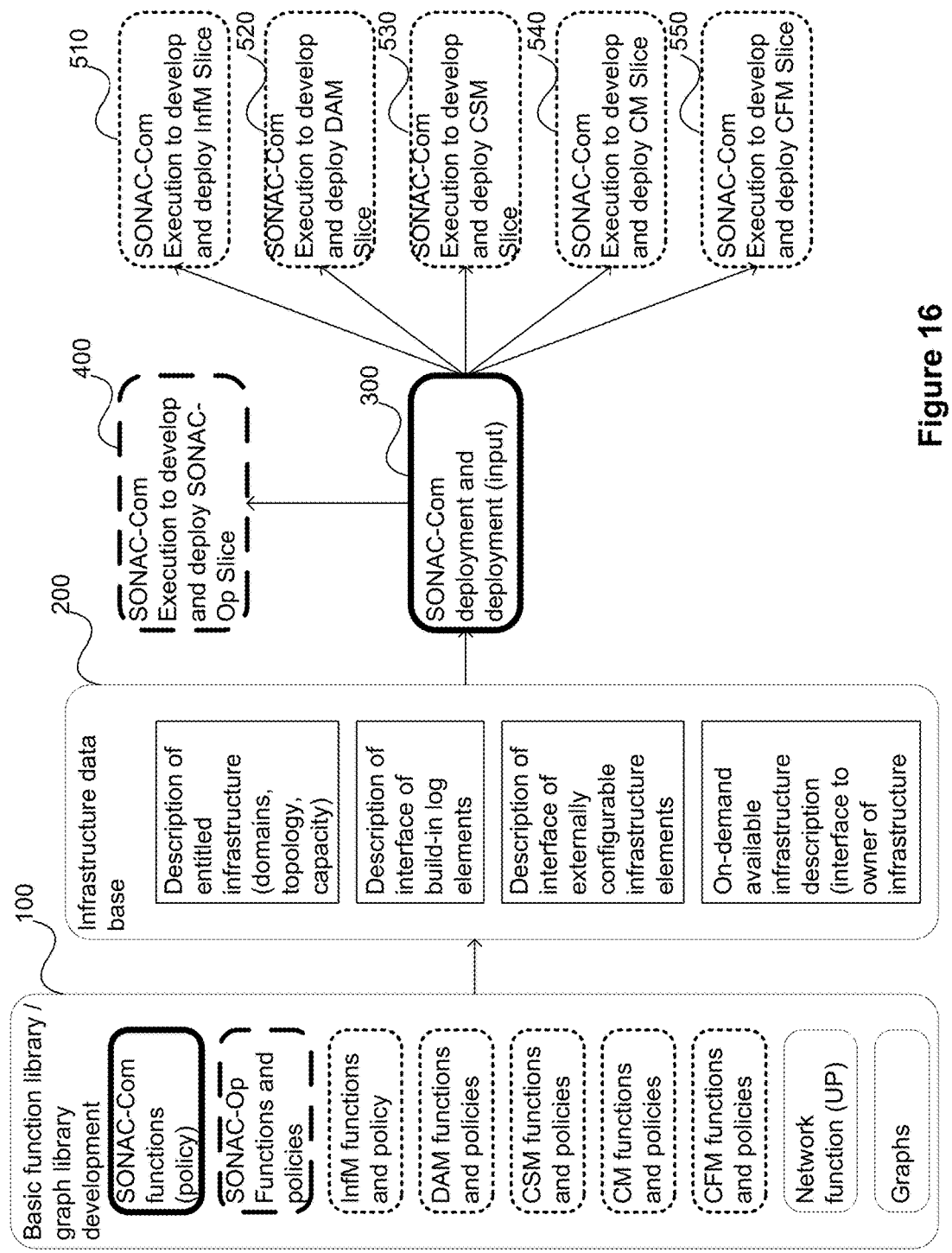
FIG. 16 schematically illustrates a MyNET platform development, according to an embodiment.

FIG. 16 illustrates an example of a MyNET platform development as functional blocks, according to an embodiment. MyNET platform is developed to enable automation of definition/development, deployment and operation of service customized slices using integrated network infrastructure resources. In some embodiments, this platform development follows a series of phases, including a development phase 100 (also referred to as configuring), a deployment phase 300 and execution phases 400, 510-550. The configuring phase can include a slice provider defining User plane functions, NOS service functions (and policies), SONAC-Op functions (and policies), SONAC-Com functions (and policies) and network graphs. The following convention will be used: SONAC-Com functions are illustrated in bold dark lines; SONAC-OP functions are illustrated in dashed dark lines; NOS functions are illustrated in dotted lines; Other functions are not emphasized and are shown with solid lines.

Infrastructure database 200 describes the GWNI allows SONAC to identify the available resources. Infrastructure database 200 can describe the topology (and optionally other information such as the capacity of the networking resources within the topology) and be populated by slice providers and infrastructure providers. Infrastructure database 200 can include an entitled infrastructure resource pool description, which can describe the technology domains, ownership domains and geographic domains. The term "entitled infrastructure resource" refers to the infrastructure resource pool which is available for slice deployment. It can be understood as the set of resources that have been allocated to the slice, and thus, the resources that the slice is entitled to use. Infrastructure database 200 can also include an entitled on-demand infrastructure topology description, as well as a description of interface to build-in log elements and a description of interface to configurable infrastructure elements. Infrastructure database 200 can also include an on-demand available infrastructure description (which can provide an interface to an owner of infrastructure).

The deployment phase includes the SONAC-Com deployment 300. This includes deploying the SONAC-Com slice, i.e., placements of SONAC-Com functions and interconnections among functions over multiple domains and deployed over entitled infrastructure. Entitled infrastructure refers to infrastructure which is owned, controlled or otherwise made available, and allocated to the slice, for example, by a slice provider. For example, an integrated infrastructure network is usually composed of multiple technical domains, e.g., RAN domains, and transport domains, etc. they use different techniques for traffic forwarding. A large infrastructure network is usually divided into different domains to make control and management scalable, even though the entire infrastructure network may be belong to a single owner. These domains often correspond to geographic regions. If the entire infrastructure network is the integration of multiple infrastructure networks the administrative domains may be used as natural domain divisions. The deployment of SONAC-Com is a decision of a slice provider given an entitled infrastructure network topology and resource. This phase 300 includes receiving input and provisioning the functions based on information selected and provided by a slice provider. In some embodiments this includes an interface for receiving the input from a human operator.

The execution phase refers to the execution of the SONAC-Com functions to develop and deploy the various slices (e.g., develop and deploy the SONAC-Op slice 400 and the NOS slices 510, 520, 530, 540 and 550). The SONAC-Op slice is developed and deployed 400 after SONAC-Com slice is deployed. The execution of SONAC-Com functions for SONAC-Op slice initialization develops SONAC-Op slice. For NOS slices, NOS service description and requirement can be provided by the slice provider via APIs to SONAC-Com (as seen in FIG. 2). The execution of SONAC-Com functions designed for developing NOS slices develops the NOS slices.

The code execution phase includes the SONAC-Com code execution for the development and deployment of the SONAC-Op slice 400, which occurs after receiving the input at phase 300. This phase can depend on default thresholds and parameters, if any. The code execution phase also includes SONAC-Com code execution 510 to develop and deploy the InfM slice, which can be based on the description of InfM received via an API. InfM functions will be discussed further below with reference to FIG. 27. The code execution phase can also include SONAC-Com code execution 520 to develop and deploy the DAM slice based on the description of DAM received via an API. The DAM functions will be discussed further below with reference to FIG. 28. The code execution phase also includes SONAC-Com code execution 530 to develop and deploy CSM slices based on the description of CSM received via an API. The CSM functions will discussed further below with reference to FIG. 29. The code execution phase also includes SONAC-Com code execution 540 to develop and deploy the CM slice based on the description of CM received via an API. The CM functions will be discussed further below with reference to FIG. 30. The code execution phase also includes SONAC-Com code execution 550 to develop and deploy the CFM slice based on the description of CFM received via an API. The CFM functions will be discussed further below with reference to FIG. 31. At this point the platform is ready to accept customer slice requests and to develop and deploy customer slices.

Figure 17:
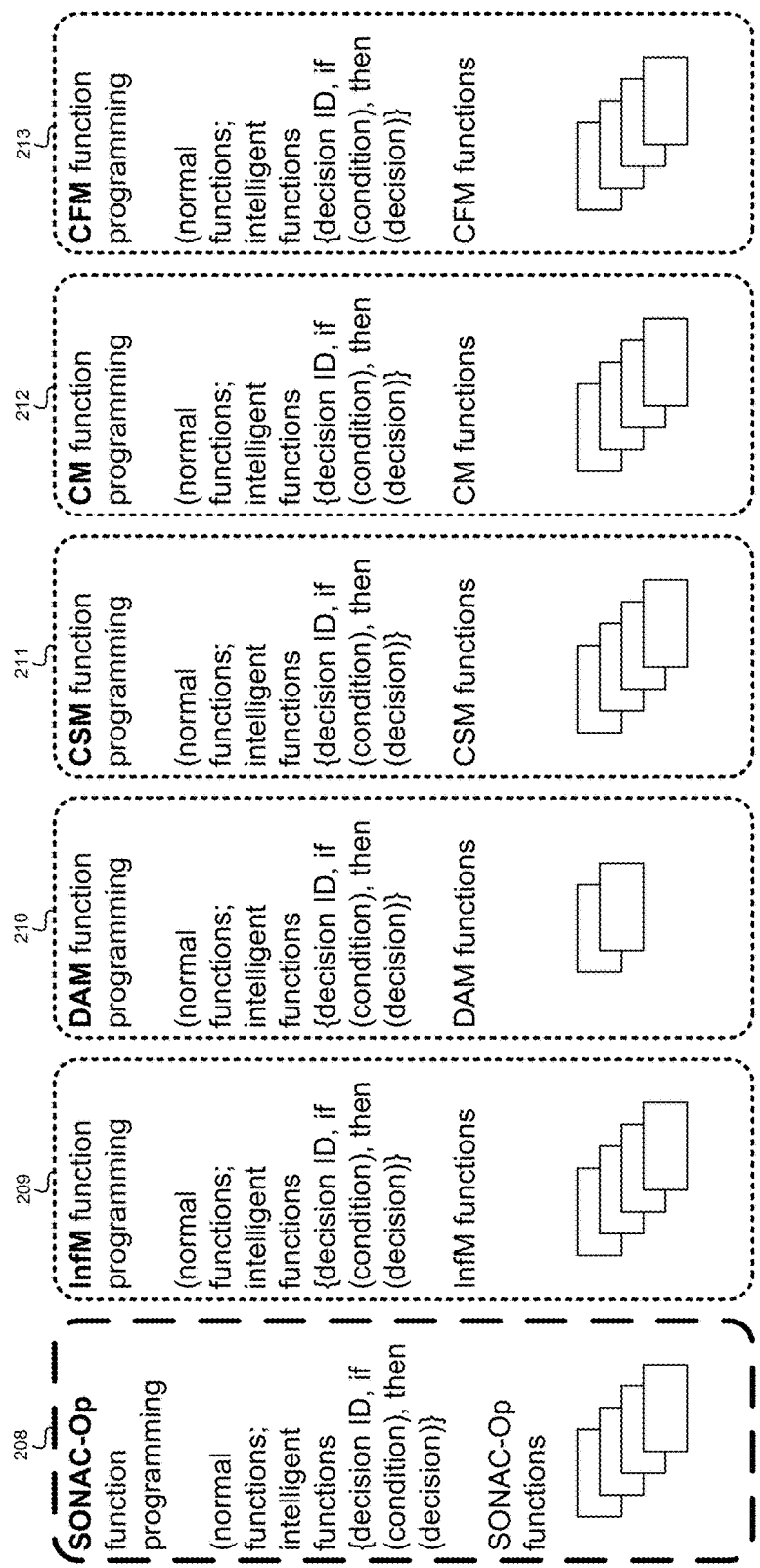
FIG. 17 illustrates an example of programming the SONAC-OP and NOS functions, according to an embodiment.

FIG. 17 illustrates an example of programming the SONAC OP and NOS functions, according to an embodiment. This phase includes the SONAC Com programming the basic functions of SONAC Op and NOS of the library. The SONAC Com functions can execute this programming using a set of function ID and corresponding functions, and a set of "if . . . then" rules (or their equivalent) for selecting appropriate functions based on input received from the monitoring of real time conditions. In some embodiments, operator input may be used in non-real time execution environments. This can include "normal" functions and "intelligent" functions which make decisions based on real time condition. SONAC-Op function programming is illustrated in 208, InfM function programming in 209, DAM function programming in 210, CSM function programming in 211, CM function programming in 212, and CFM function programming in 213.

Figure 18:
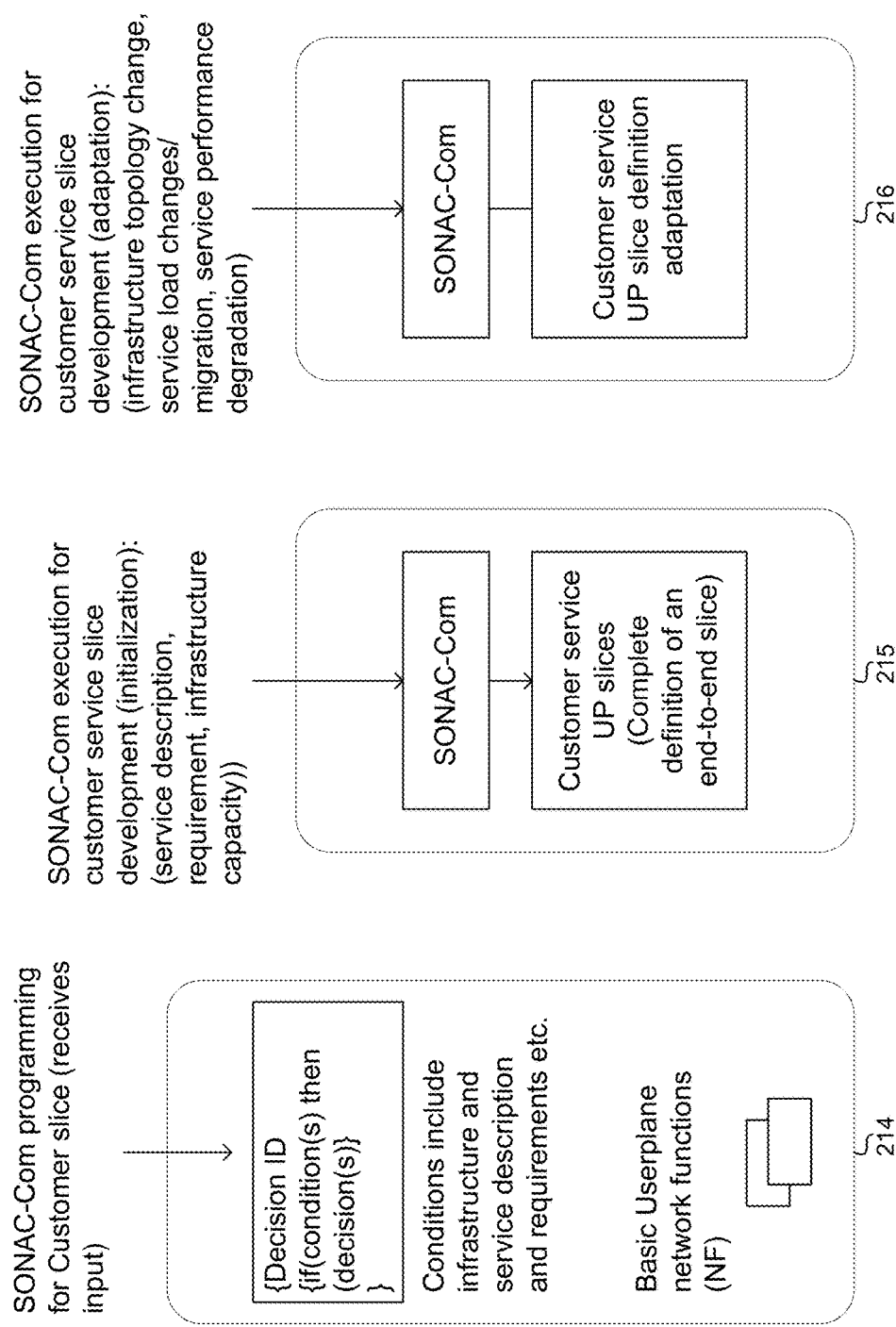
FIG. 18 illustrates the SONAC-Com function used for the development and adaptation of customer UP slices, according to an embodiment.

FIG. 18 illustrates the SONAC-Com function and mechanisms that it may use for the development and adaptation of customer UP slices, according to an embodiment. In the left column, the SONAC-Com function 214 receives inputs, which may be from a human operator. This input is used to select from the library of network functions to determine which network functions and graphs to include, based on the received input. The middle column illustrates a programming phase for slice initialization 215, according to an embodiment. The SONAC-Com receives as service request which includes a set of conditions (parameters) relating to service descriptions and requirements, infrastructure capacity, etc. These parameters are input from APIs, for example from the InfM NOS function. The programming involves making a set of decisions, each with a Decision ID. For example, in some embodiments the decisions can take the form of Decision (parameters)=f (service, infrastructure), such that the decision taken in response to a set of parameters is a function of both the service and infrastructure used. For example, the SONAC-Com function receives a number of parameters and makes a number of decisions as to selecting network functions to populate a slice, based on the received parameters. These decisions are used to complete the definition of an end-to-end slice. The right column illustrates a programming phase for slice adaptation 216, according to an embodiment. Here the SONAC-Com function receives input relating to conditions (e.g., infrastructure topology change, service load changes/migration, service performance degradation, etc) from other NOS functions. The SONAC-Com function makes a series of decisions: Decision (parameters)=f (condition) to facilitate customer service UP slice definition adaptation based on the received conditions. Once again, the input can be received from APIs, for example from NOS services.

FIG. 19 illustrates the SONAC-Com execution process used to develop the SONAC-OP functions, according to an embodiment. The top portion of FIG. 19 illustrates the programming phase. In some embodiments, a SONAC-OP slice is created. At 410 the SONAC-Com receives input as to parameter values which are used to select from a set of SONAC-OP library functions based on a set of if-then rules. For example, for each decision ID: If (infrastructure topology, domain technology), then (at least one of scheme ID, and threshold ID (value), parameter ID (Value)). Box 420 illustrates SONAC-Com execution for SONAC-OP development and initialization. At this stage, default capabilities and threshold parameters are established. Box 430 illustrates SONAC-Com execution for SONAC-OP development for adaptations, for example, which may be triggered by changes in infrastructure.

The bottom portion of FIG. 19 illustrates at box 440 the Programming phase of SONAC-Com for SONAC slice configuration at new slice request. For each decision ID, if-then rules are used to determine the SONAC-Op function configurations:

If (service) then (at least one of SONAC-Op function configurations, andthreshold ID (Value), and parameter ID (value))

This phase sets the rules for how the SONAC-OP functions will respond to new slice requests, for example as shown at 450 at the Execution phase for the creation of a new UP slice based on a received new slice request. Based on the service type from the new slice request, the SONAC-Com determines the SONAC-Op schemes and thresholds and parameters. If the preferred scheme and threshold values (if any) are explicitly indicated in the slice request, SONAC-Com will satisfy the requested schemes, etc. if they are supportable (feedback may be provided to the requester if request is not supportable.) in establishing the new UP slice.

Figure 20:
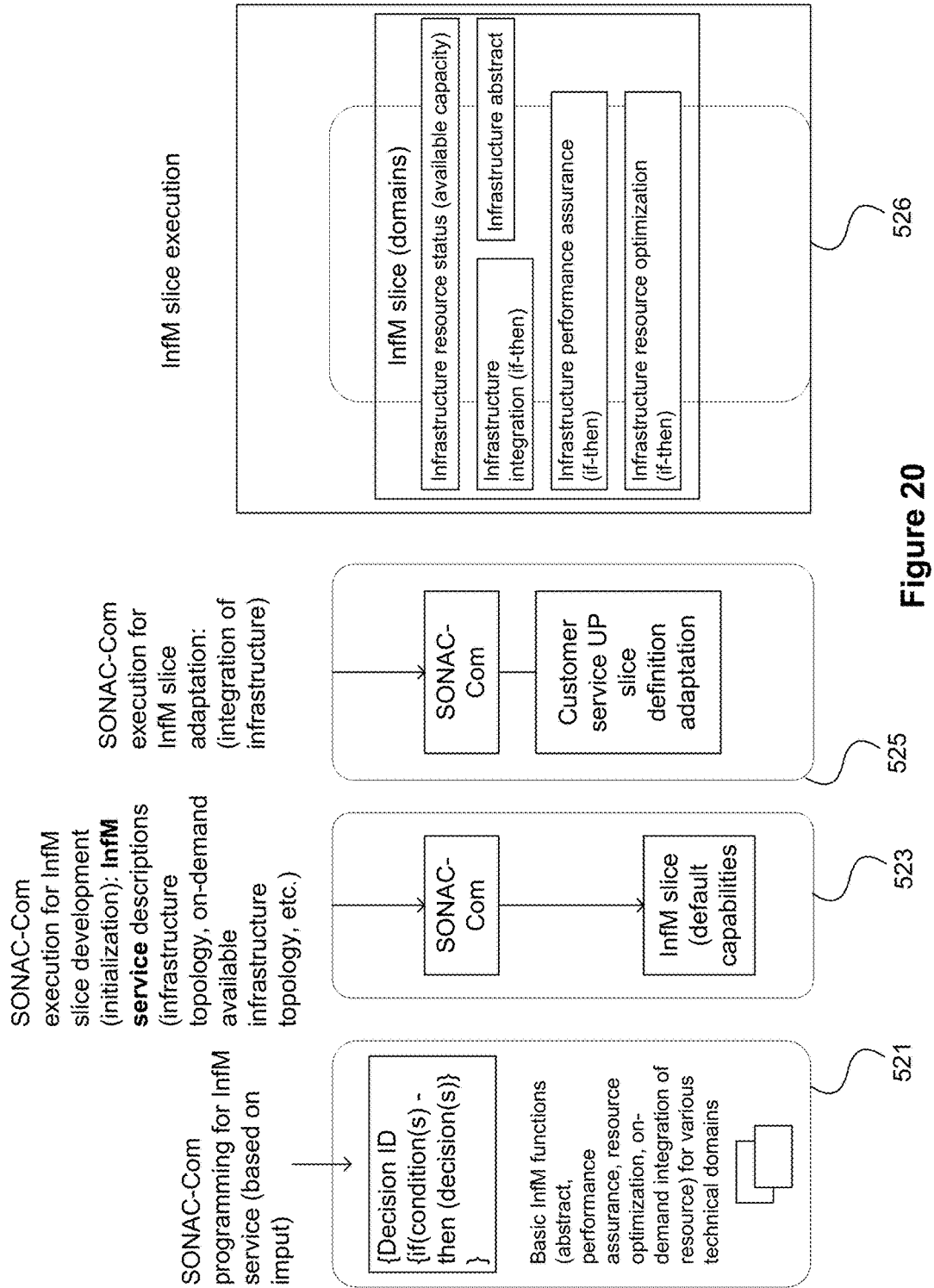
FIG. 20 illustrates the SONAC-Com execution to develop the InfM NOS functions, according to an embodiment.

FIG. 20 illustrates an example of a process executed by the SONAC-Com to develop the InfM NOS slice functions, according to an embodiment. InfM is a NOS function which depends on, and manages available infrastructure. The library includes basic InfM functions and policies, which can include pre-programming of functions for interfacing with, and managing a variety of infrastructure, including required adaptation schemes and threshold and parameters. This can include Graphs/logical topology=f (infrastructure topology). Box 521 illustrates the Programming phase of SONAC-Com for InfM initialization. In other words, SONAC-Com selects from the library InfM functions based on received input and if-then rules. For each decision ID: If (infrastructure type, infrastructure resource usage stats, etc) then (at least one of function ID, and scheme, and thresholds, and parameters). This can be executed for various domains. Boxes 523 and 525 illustrate the Execution phase of SONAC-Com for the development (initialization) and adaptation of the InfM slice, based on the InfM service description received via API from a slice provider. The input can describe the infrastructure domain definition, infrastructure type (techniques), configurable infrastructure element ID and interface, on-demand infrastructure description, etc. Based on this input the SONAC-Com creates the InfM slice, with the selected functions based on the description by slice provider via API. The location of each of InfM functions can be based on infrastructure domain type (RAN, DC, or transport, etc) and determined based on the required function for each of infrastructure domains. FIG. 20 also illustrates the InfM slice execution 526, which in some embodiments can include a InfM slice in each domain operating the illustrated InfM functions.

Figure 21:
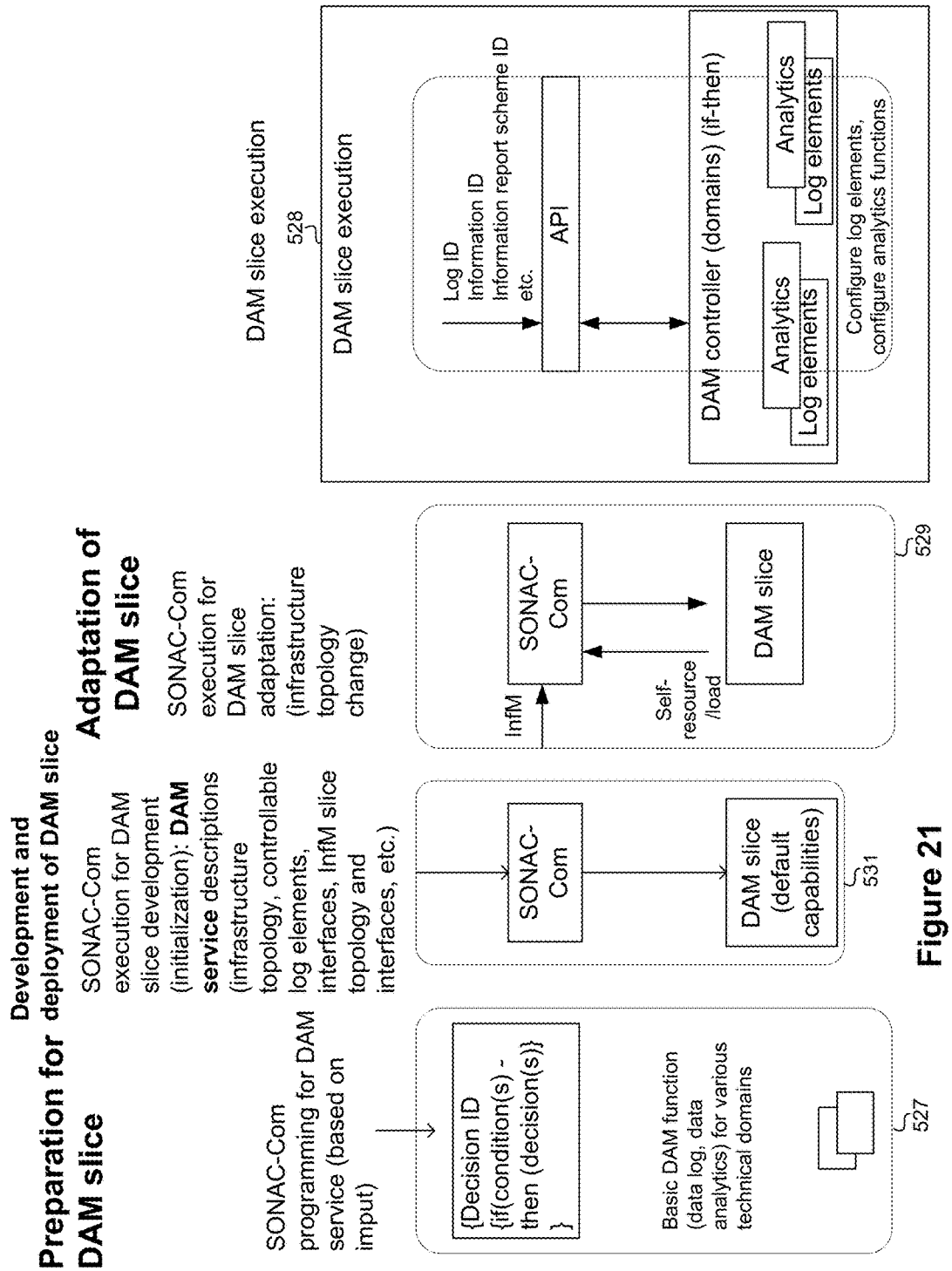
FIG. 21 illustrates the SONAC-Com execution to develop the DAM NOS slice functions, according to an embodiment.

FIG. 21 illustrates methods carried out or executed by SONAC-Com to develop the DAM and NOS slice functions, according to an embodiment. DAM can be a NOS whose operation depends on infrastructure and other NOS service. The Library includes DAM functions=f (at least one of infrastructure type, and information ID) and graphs/topology=f (infrastructure topology). The Programming phase of SONAC-Com 527 includes selecting a function for each decision (based on input reflating to functions), e.g., If (at least one of infrastructure topology and infrastructure domain techniques, log port, etc.,), then (function ID, location ID, etc.). Further, the programing phase also includes an interface for each decision (for input reflating to interfaces), e.g., If (infrastructure slice topology) then (interconnect DAM and InfM).

FIG. 21 also illustrates the execution of SONAC-Com procedures for the development and deployment of the DAM slice 531, based on the DAM service description via API by slice provider. The service descriptions can include any or all of: an Infrastructure domain definition, infrastructure type (techniques), log element ID and interface, on-demand infrastructure description, and InfM slice topology. The SONAC-Com can assign a location for each DAM function that is based on an infrastructure domain type (RAN, DC, or transport, etc) in order to determine the required function for each of infrastructure domains. Once deployed, the DAM slice execution 528 can receive requests and provide DAM analysis via API. Further, the DAM slice can be adapted 529, for example based on an infrastructure topology change.

Figure 22:
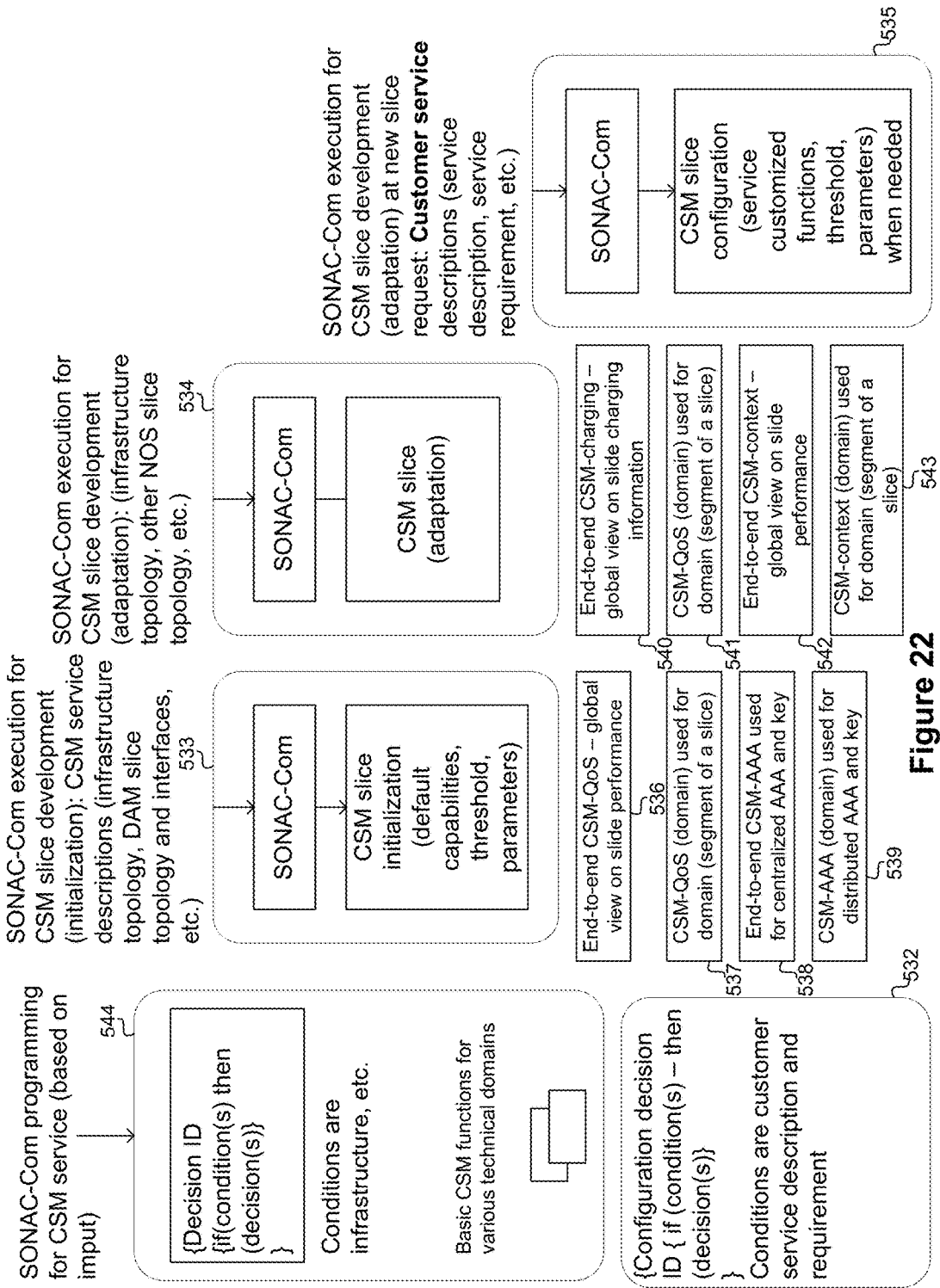
FIG. 22 illustrates the SONAC-Com execution to develop the CSM NOS slice functions, according to an embodiment.

FIG. 22 illustrates the SONAC-Com execution to develop the CSM NOS slice functions, according to an embodiment.

CSM slice is a NOS which depends on customer services, including, a Library of CSM functions that are a function of infrastructure and basic graphs/topology that are also a function of infrastructure. Programming of SONAC-Com for CSM service 544 requires for each decision ID (functions) when infrastructure domain techniques then at least one of: function ID, scheme ID, threshold ID (value), and parameter ID ((value)). Programming SONAC-Com for CSM service requires for each decision ID (interface) when DAM slice topology or CSM slice topology, then interconnect DAM and CSM. Programming of SONAC for CSM slice configuration at new slice request 532 requires, for each decision ID, when service, then at least one of function IDs, threshold ID (value), and parameter ID (value), etc. Execution of SONAC-Com for CSM slice initialization 533 includes the functions: end-to-end CSM-QoS 536, CSM-QoS (domain) 537, end-to-end CSM-AAA 538, CSM-AAA (domain) 539. For CSM, based on the CSM service description via API by slice provider, the required information is infrastructure domain definition, infrastructure type (techniques), and DAM slice topology. SONAC-Com creates CSM slice using functions based on the description by slice provider via API and the location of each of CSM functions (which is based on infrastructure domain type (RAN, DC, or transport, etc) determine the required function for each of infrastructure domains). Execution of SONAC-Com for customized CSM slice configuration includes adaptation 534, end-to-end CSM-charging 540, CSM-QoS (domain) 541, end-to-end CSM-context 542, and CSM-context (domain) 543. For new slice request, SONAC-Com needs to determine the right CSM functions (activation and configuration) based on the customer service description and requirement based on CSM slice development adaptation for a new service request 535.

Figure 23:
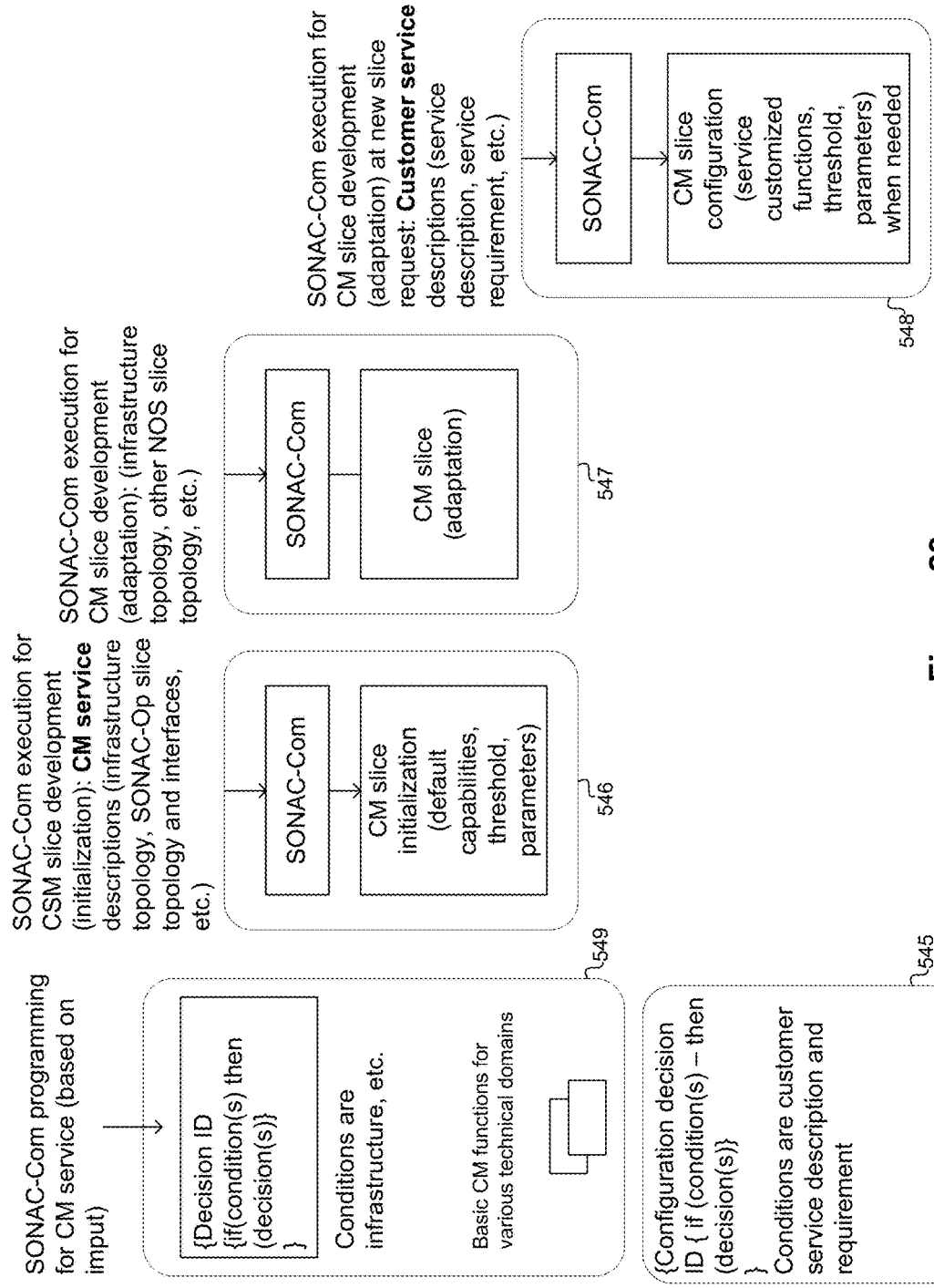
FIG. 23 illustrates the SONAC-Com execution to develop the CM NOS slice functions, according to an embodiment.

FIG. 23 illustrates the SONAC-Com execution to develop the CM NOS slice functions, according to an embodiment. CM is a NOS service which could be common or customer service customized. Further details according to an embodiment include a library, a programming phase of SONAC-Com for CM slice initialization, a programming phase of SONAC-Com for CM configuration at customer slice request, execution of SONAC-Com for CM slice initialization, execution of SONAC-Com for customized CM slice configuration, and SONAC-Com execution for CM slice development (adaptation) for a new slice request. The library requires basic CM functions and graph/topology that is a function of infrastructure. The programming phase of SONAC-Com for CM slice initialization utilizes at least one of function ID, and scheme ID, and threshold ID (default value), and parameter ID ((default value))for each decision (functions), when the function is infrastructure domain technique. For each decision (interfaces), interconnect CM and SONAC-Op is provided when the interface is SONAC-Op slice topology. The programming phase of SONAC-Com for CM 549 and 545 configuration at customer slice request utilizes at least one of function ID/scheme ID, scheme ID, threshold ID (value), and parameter ID (value) for each decision when there is a service. Execution of SONAC-Com for CM slice initialization 546, for CM, based on the CM service description via API by slice provider requires an infrastructure domain definition, infrastructure type (techniques), SONAC-Op slice topology. In this situation, SONAC-Com creates CM slice based on functions based on the description by slice provider via API and the location of each of CM functions (which is based on infrastructure domain type (RAN, DC, or transport, etc) and a determination of the required function for each of infrastructure domains. Execution of SONAC-Com for customized CM slice configuration 547, for a new slice request, SONAC-Com needs to determine the right CM functions (activation and configuration) based on the customer service description and requirement.

SONAC-Com execution for CM slice development (adaptation) for a new slice request 548.

Figure 24:
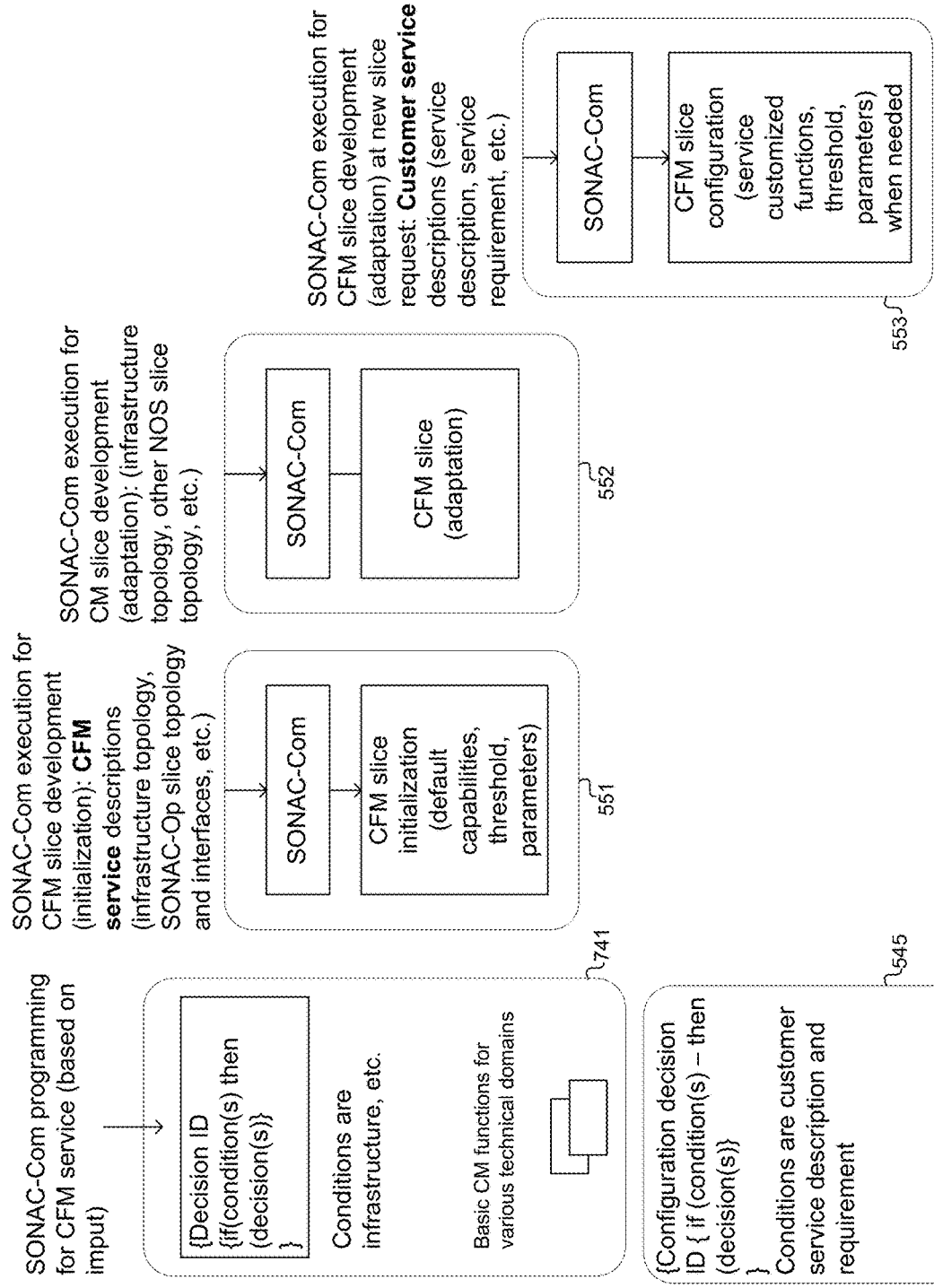
FIG. 24 illustrates the SONAC-Com execution to develop the CFM NOS slice functions, according to an embodiment.

FIG. 24 illustrates a method for execution by SONAC-Com to develop the CFM NOS slice functions, according to an embodiment. Further details according to an embodiment include the details of a library, programming phase of SONAC-Com for CFM slice initialization, programming phase of SONAC-Com for CFM configuration at customer slice request, execution of SONAC-Com for CFM slice initialization, execution of SONAC-Com for customized CFM slice initialization. The library includes basic CFM functions and Graph/topology that is a function of infrastructure topology and SONAC-Op topology. The programming phase of SONAC-Com for CFM slice initialization 741 utilizes at least one of domain ID, function ID/scheme ID, and threshold ID (default value), and parameter ID ((default value) for each decision (functions) when infrastructure topology. When the decision is due to interfaces, interconnect CFM and SONAC-Op are provided, for example, when the function is SONAC-Op slice topology. Programming phase of SONAC-Com for CFM configuration at customer slice request 545 utilizes at least one of function ID/scheme ID, and scheme ID, and threshold ID (value), and parameter ID ((value) when each decision is based on service. Execution of SONAC-Com for CFM slice initialization 551 is based on the CM service description via API by slice provider utilizes an Infrastructure domain definition, infrastructure type (techniques), SONAC-Op slice topology. In this situation, SONAC-Com creates CFM slice functions based on the description by slice provider via API such as the location of each of the CFM functions which are determined based on infrastructure domain type (RAN, DC, or transport, etc) determine the required function for each of infrastructure domains. Execution of SONAC-Com for customized CFM slice configuration 552 for new Cache and forwarding (CF) slice request, SONAC-Com can determine the right CM functions (activation and configuration) based on the customer service description and requirement. Also, SONAC-Com execution for CFM slice development (adaptation) 553 is performed.

Figure 25:
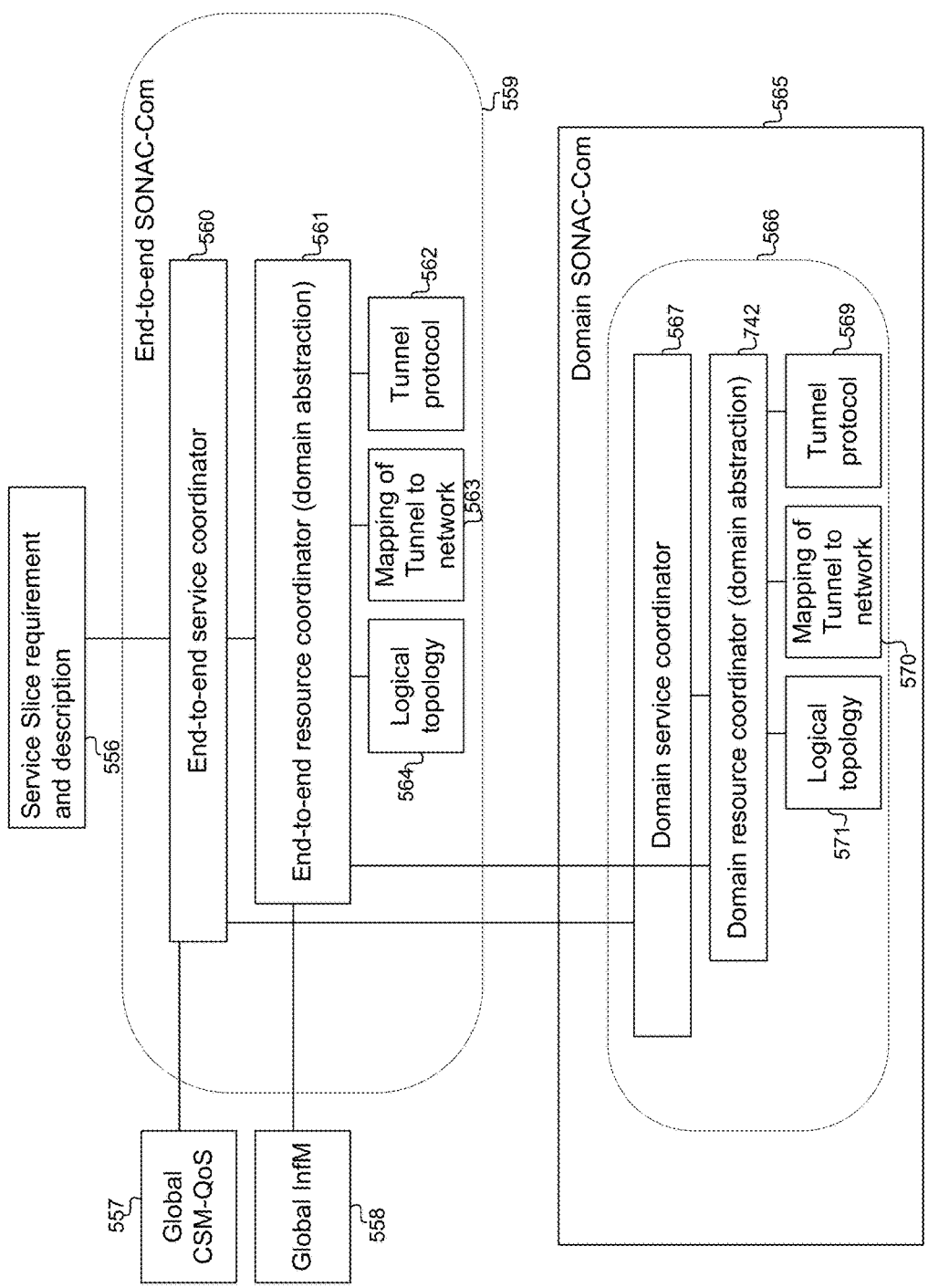
FIG. 25 illustrates further details of the SONAC-Com functions, according to an embodiment.

FIG. 25 illustrates further details of the SONAC-Com functions used for slice development, according to an embodiment. The SONAC-Com functions include a global (or end-to-end) SONAC-Com function 559 and Domain SONAC-Com functions 565, each with a service coordinator 560 and 567 and resource coordinator functions 561 and 742. It should be appreciated that the end-to-end service coordinator and end-to-end resource coordinator interwork together and in some embodiments can be combined into a single entity. The end-to-end service coordinator and end-to-end resource coordinators could be global domain coordinators. Service slice requirements and description 556, global CSM-QoS 557, and global InfM 558 are passed to the end-to-end SONAC-Com. The end-to-end resource coordinator uses the logical topology 564, mapping of tunnel to network 563, and tunnel protocol 562 to process requests. Within the domain SONAC-Com, the Domain service coordinator, domain resource coordinator, logical topology, mapping of tunnel to network, and tunnel protocol are included in a layer of hierarchy 566. It should be noted that the domain resource coordinator uses the logical topology 571, mapping of tunnel to network 570, and tunnel protocol 569 to process requests.

The end-to-end service coordinator (or global domain service coordinator) function receives a slice request (customer request) specifying QoS and service attributes, and provides service requirement to each domain service coordinator. The end-to-end service coordinator includes interfaces to the end-to-end resource coordinator, to the domain service coordinators [service requirement, topology graph, NFs], to the end-to-end CSM-QoS (slice performance) function and API interfaces for service slice requirement and attribute description. The end-to-end resource coordinator function analyzes the request and determines which domains involve the slice composition. The end-to-end resource coordinator function also determines NFs. The end-to-end resource coordinator function determines the end-to-end logical topology at domain levels (or even lower level depending on the infrastructure topology), which can include determining NFs and inter-NFs service slice tunnels. The end-to-end resource coordinator function also determines the mapping scheme for logical tunnels to infrastructure (for cross domain tunnels), the service slice tunnel protocols (for cross domain tunnels), and the end-to-end protocols. The end-to-end resource coordinator function also translates end-to-end service requirements into per domain service requirements (this can also be done top down or bottom up by interacting with domain resource coordinator). The end-to-end resource coordinator function also determines the recommendation for domains on intra-domain logical topology graph, etc. The end-to-end resource coordinator function also configures SONAC-Op and other NOS if needed. The end-to-end resource coordinator function includes Interfaces to the end-to-end service coordinator [service requirement], [domain ID, committed service delivery performance], to the end-to-end InfM [infrastructure resource map, available infrastructure resource map], and to other domain resource coordinators [recommended graph, NFs, domain level logical topology, etc].

Figure 26:
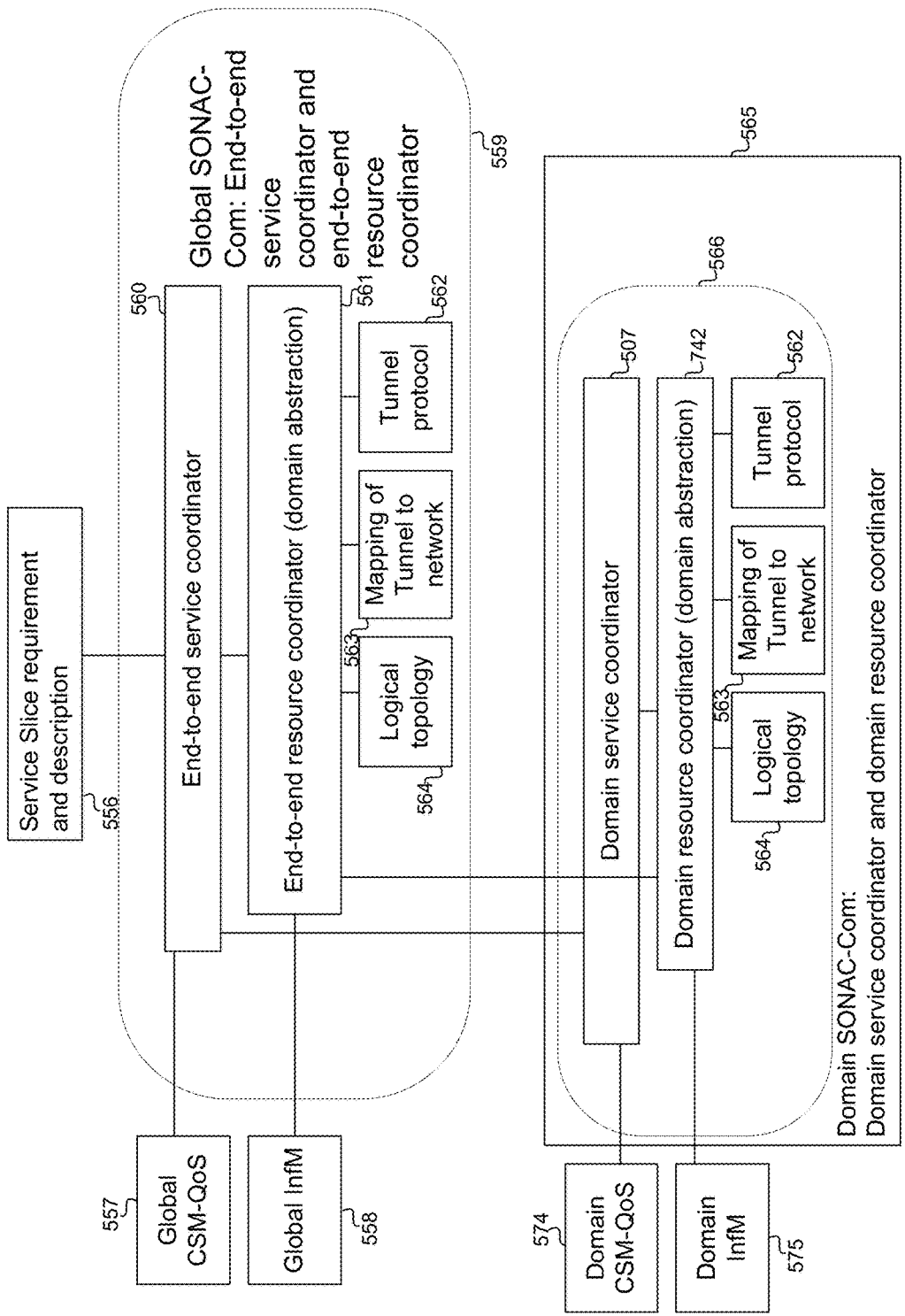
FIG. 26 illustrates further details of the SONAC-Com functions, according to an embodiment.

FIG. 26 is similar to FIG. 25, but adds some more details, according to an embodiment. End-to-end service coordination and end-to-end resource coordination could be an iterative procedure. This procedure can be top-down or bottom-up or purely centralized depending on the infrastructure network topology and toleration for complexity. The end-to-end service and resource coordinators are instantiated in 559.

The domain service coordinators 507 perform some or all of the following functions and include some or all of the following interfaces. The functions are receive service slice request 556 from end-to-end service coordinator or upper layer service coordinator, receive domain CSM-QoS 574 for performance report, and determine an end-to-end slice resource modification. The interfaces are end-to-end service coordinator 560 or upper layer service coordinator, domain resource coordinator 558, or end-to-end CSM-QoS 557 (slice performance).

The Domain resource coordinator 742 performs a subset or all of the following functions (for slice development) and include a subset or all of the following interfaces, according to an embodiment. The functions are to receive decisions made by end-to-end resource coordinator, to provide infrastructure resource map to SDT 564, SDRA 563, SDP 562, the coordination of domain resource 566 and 565 (among SDT 564, SDRA 563, SDP 562), the use of an SDT to determines the logical topology of a slice on this domain, the use of an SDRA to determine the mapping between logical tunnels to physical network, the use of an SDP to determine the logical tunnel protocols, and a function to configure SONAC-Op. The Interfaces are an end-to-end resource coordinator 561 (determined and recommended by end-to-end resource coordinator], a domain InfM 575 [infrastructure resource map, available infrastructure resource map], and a domain resource coordinator.

InfM functions perform infrastructure resource optimization to ensure infrastructure resource utilization optimization. InfM can perform a subset or all of the following functions and include a subset or all of the following interfaces. The functions include a periodic performance monitor (DC, MECs, network nodes, access node, etc) for infrastructure performance assurance; a periodic remaining resource monitor (DC, MECs, link, access link, spectrum); a monitor that periodically checks infrastructure resource utilization; a function to determine changes in infrastructure topology (e.g., wireless BH configuration); a function to determine infrastructure configuration (e.g., turn on and turn off infrastructure elements, access link resource coordination (RAN domains); a function to determine $3^{rd}$ party infrastructure integration ($3^{rd}$ parties on-demand available infrastructure topology is pre-stored); a function to negotiate with a $3^{rd}$ party infrastructure provider; a function to perform domain resource abstract to upper layer. The interfaces are a DAM for configuring log and analytics [location ID (where to log), information ID, reporting mode, log mode]; a domain resource coordinator [domain infrastructure map, available resource map]; an InfM in other domains to provide domain resource abstract [domain abstract map]; a $3^{rd}$ party infrastructure resource providers for infrastructure integration [requesting infrastructure description map]; and infrastructure elements (access nodes, etc) [configuration parameters].

DAM functions provide on-demand data log and analytics services. DAM can perform a subset or all of the following functions and include a subset or all of the following interfaces. This function logs and analyzes data and provides the required information to requesters. In log mode, a periodic monitor (with a configurable monitoring period) and an on-demand log. In report mode, a threshold based report and periodic report and poll based report. A Log ID function that includes in the reports, the packet processing time, number of packets over a window, number of bytes over a window, etc. An Information ID function that includes average packet latency and throughput in the reports. A log packet or traffic attribute ID function that puts the session ID, or subscriber ID, slice customer ID, etc., in the reports. The interfaces are a CSM-QoS interface to provide slice resource utilization; slice traffic load distribution stats; service performance, a CSM-Charging interface to provide subscriber ID, charging info; slice ID, charging info; slice provider ID, charging info, a CSM-Context interface that provides slice ID, context ID, context info, an InfM interface that provides infrastructure performance map, remaining resource map, resource utilization map, a CFM interface that provides content interesting rate distribution, a DAM in other domains, and an interface for $3^{rd}$ party DAM customers.

CSM-QoS function ensures the performance of a slice, and in some embodiments ensures appropriate performance per subscriber as applicable. After a customer slice is deployed, the pre-deployed CSM-QoS (during CSM slice initialization) is configured, including CSM-QoS function selection, activation and configuration. Alternatively, a dedicated CSM-QoS function/slice can be instantiated on-demand if needed. CSM-QoS can trigger slice resource adaptation based on real-time monitoring on slice resource utilization, slice performance, slice traffic change, etc. CSM-QoS interacts with DAM for various status monitoring. Functions at slice level include a function to configure the DAM to monitor the slice resource utilization (best matching of the slice resource and slice traffic), to monitor the slice traffic load change and migration (slice resource modification), to monitor the slice QoS (slice service performance assurance), to monitor slice traffic change pattern (based on both time dependency and geographic dependency (better planed resource allocation to a slice over time and geographic areas)). Also included are functions to determine slice resource modification based on monitoring results (exceed or insufficient slice resource allocated given sufficiently accurate estimation of traffic load, traffic load estimation error, dynamic traffic load change, etc.) and to report performance on demand. Functions at service level (assuming a slice supports multiple services and a customer is associated with multiple devices) configure DAM to monitor per service (customer) performance (delivered by slice provider), to monitor per service (customer) traffic change pattern (based on both time dependency and geographic information), and additional functions that report per service level performance and service traffic load statistics. Functions at subscriber level configure DAM to monitor the per subscriber traffic performance and to report the per subscriber traffic performance. The interface to the DAM for configuring log and analytics provide location ID (where), information ID (what), reporting mode ID; log mode ID. An interface to the service coordinator for slice performance assurance provides slice ID and delivered slice performance.

An interface is also provided to the resource coordinator to provide slice ID and the slice resource utilization ratio. An interface is provided to the CSM-QoS in other domains and (end-to-end service coordinator and end-to-end resource coordinator) to provide domain ID, slice performance, slice resource utilization, slice traffic load statistics. An interface is also provided to the service coordinator for close loop slice traffic characteristic estimation based on traffic load dependency on time, traffic load dependency on geographic location.

It should be appreciated that the listing of information content described for these interfaces is not necessarily a complete set of contents.

CM functions provide device connectivity management (reachability and mobility management). CM can perform a subset or all of the following functions and include a subset or all of the following interfaces. The first function performs device location tracking and resolution (common or customized) based on device name based location tracking information and device name based location resolution information. The second function performs device activity status configuration and tracking (common and customer specific) based on customer assistant activity status configuration information and customer assistant activity status tracking information. The provided interfaces include an interface to the slice operation functions (SDT-Op) with device ID, location (domain ID, or cluster ID or access node ID information and slice operation functions (SDRA-Op) with device ID, activity schedule table information.

CFM is defined for controlling and managing a content cache and forwarding (CF) slice. A CFM slice can be created by a CF customer. Such a slice includes caches distributed in the infrastructure network. Selected contents are kept in selected caches. The functions provide the ability to configure DAM to monitor the content request frequency, to determine and manage content cache, to register to upper layer CFM function and neighbor CFM functions when any new content is cached or any existing content be removed, to indicate to SONAC-Op whenever receive content registration from other CFMs, Etc. The interfaces to DAM for content request log and analytics [reporting mode, log mode], to CF slice for cache instruction [content ID, cache or remove, etc.], to slice operation (SDT-Op) [content ID, cache ID)], to other CMF [content ID, VN Node ID (Cache ID), cached or removed], to $3^{rd}$ party [content cached] or [content cache map], Etc.

Figure 27:
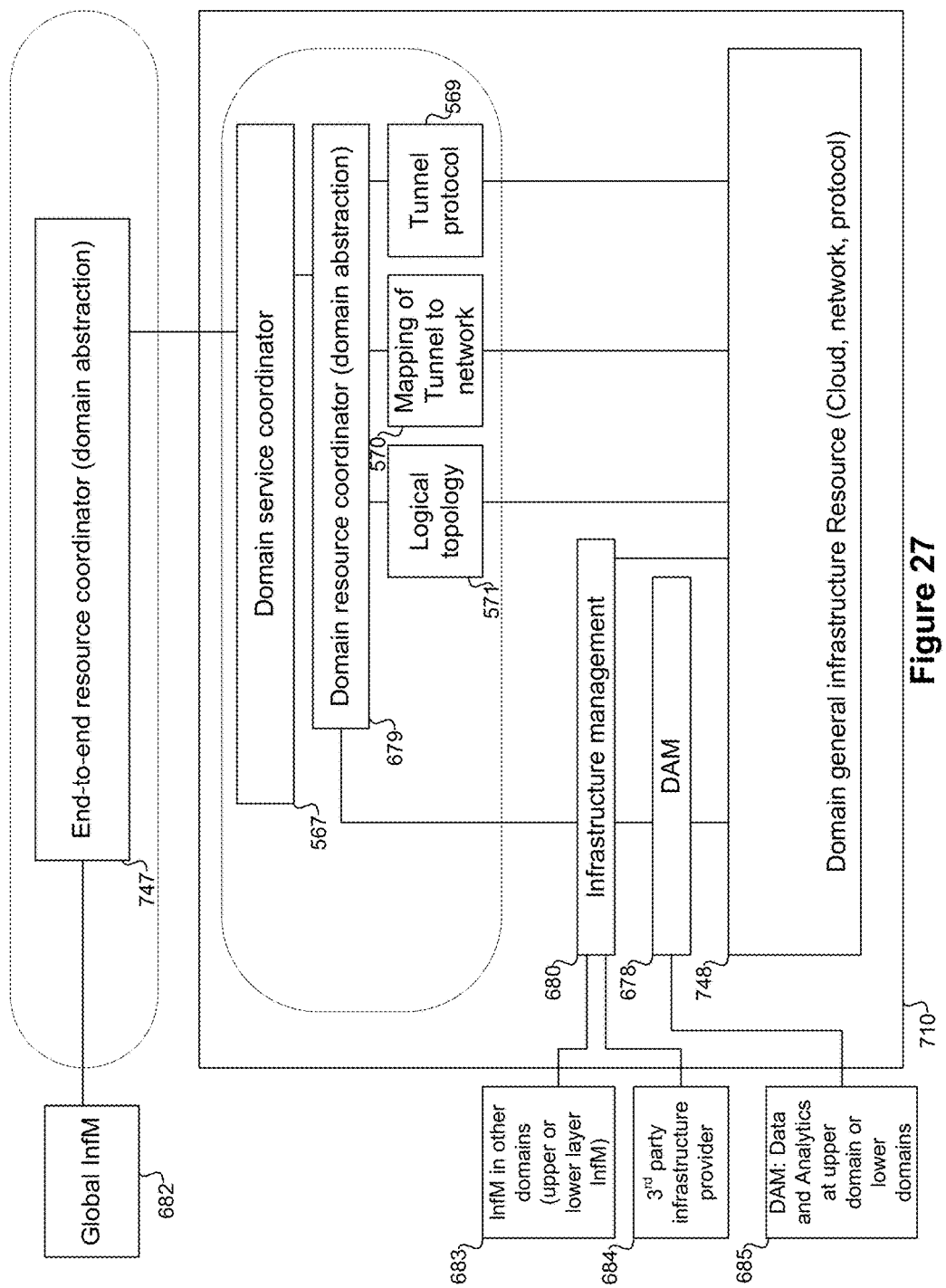
FIG. 27 illustrates InfM functions and interfaces, according to an embodiment.

FIG. 27 illustrates InfM functions and interfaces, according to an embodiment. InfM ensures the optimization of infrastructure resource utilization. According to an embodiment, the InfM performs the following functions and includes the following interfaces. Network functions configure DAM for periodic infrastructure network performance monitoring (DC, MECs, network nodes, access node, etc) for infrastructure performance assurance 710; for periodic remaining resource monitoring (DC, MECs, link, access link, and spectrum); and for periodic monitoring of infrastructure resource utilization. Functions also determine infrastructure topology modification (e.g., wireless BH configuration), determine infrastructure configuration (e.g., turn on and turn off infrastructure elements, access link resource coordination (RAN domains) 748), determine on over-the-air interface (e.g., frame structure), determine on $3^{rd}$ party infrastructure integration ($3^{rd}$ parties on-demand available infrastructure topology is pre-stored), negotiate with $3^{rd}$ party infrastructure provider, perform domain resource abstract to upper layer, Etc. The Interfaces to DAM for configuring log and analytics [location ID (where to log), information ID, reporting mode, log mode]; 678 and 685; to domain resource coordinator 567 which communicates with Domain resource coordinator (domain abstraction) 679 and indirectly with logical topology 571, Mapping of tunnel to network 570, and Tunnel protocol 569 [domain infrastructure map, available resource map]; to InfM in other domains to provide domain resource abstract 683 [domain abstract map] to the infrastructure manager 680; to $3^{rd}$ party infrastructure resource providers for infrastructure integration 684 [requesting infrastructure description map]; and to infrastructure elements (access nodes, etc) 682 via 747 [configuration parameters]. InfM functions can be designed for different technical domains. For example, the access network node configuration function is only applied to RAN cluster. The abstraction functions of InfM for DC cloud and transport network can be different.

Figure 28:
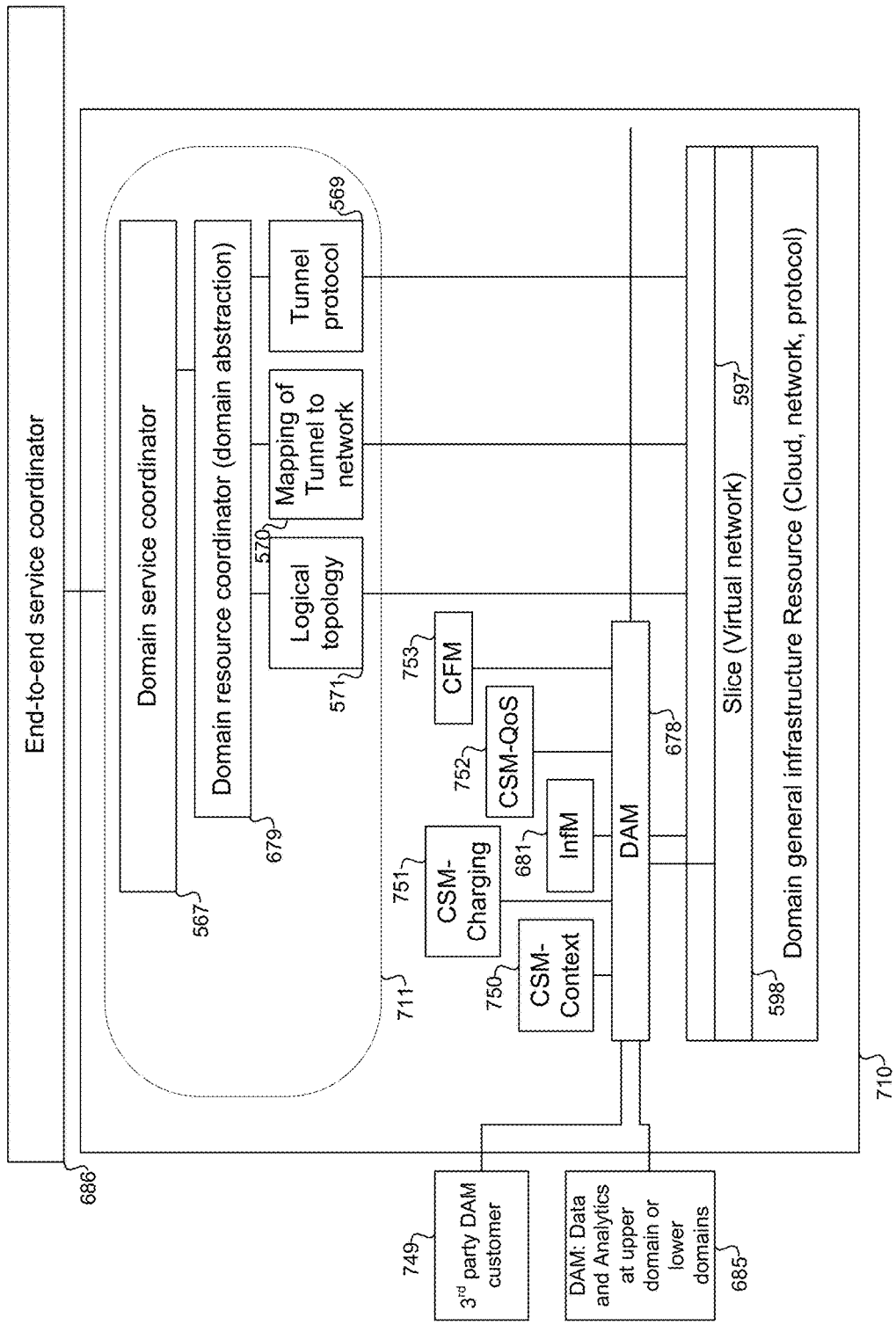
FIG. 28 illustrates DAM functions and interfaces, according to an embodiment.

FIG. 28 illustrates DAM functions and interfaces, according to an embodiment 710. DAM 678 via 685, CSM-Context 750, CSM-Charging 751, InfM 681, CSM-QoS 752, CFM 753 performs on-demand data log and analytics. The DAM slice 597 and 598 utilizes built-in log elements in infrastructure equipment elements, and log elements created for logging virtual network functions. The DAM slice is a unified log and analytics slice for both hard elements (physical network equipment) and soft elements (virtual function elements). It provides services to other NOS services and 3rd parties 749. Different domain techniques may require different DAM techniques. For a NOS service to obtain certain DAM information, the NOS function can send a request indicating the corresponding NOS function ID to the DAM slice which can provide the required information 686 via 711 which includes Domain service coordinator 567, Domain resource coordinator (domain abstraction) 679, Logical topology 571, Mapping of Tunnel to network 570, and Tunnel protocol 569.

To obtain the DAM service, the requester can request log mode (configured as a periodical monitor (configurable period), on-demand log, etc.), report mode (configured as one or more of a threshold based report mode, periodical report mode, poll based report mode), log ID (configured as one or more of a packet process time mode, number of packets over a window mode, number of bytes over a window mode, etc.), log attributes ID (configured in either session ID (packets associated to a session of a device), subscriber ID (packet associated to a subscriber/device), service customer ID (all packets associated to customer), slice ID (all packet associated to a slice), etc.), information ID (configured in either average packet latency mode, throughput mode, etc.), etc.

According to an embodiment, the InfM performs the following functions and includes the following interfaces. The functions log and analyze data and provide required information. The interfaces are to the CSM-QoS for slice resource utilization; slice traffic load distribution stats; service performance, to CSM-Charging for subscriber ID, charging info; slice ID, charging info; slice provider ID, charging info, to CSM-Context for slice ID, context ID, context info, to InfM for use in an infrastructure performance map, remaining resource map, resource utilization map, to CFM for content interesting rate distribution, to DAM in other domains, and to $3^{rd}$ party DAM customers.

SONAC-Com function which is responsible for processing such a request 686 from CFM function, can determine the cache location and adapts the slice topology 710.

Figure 29:
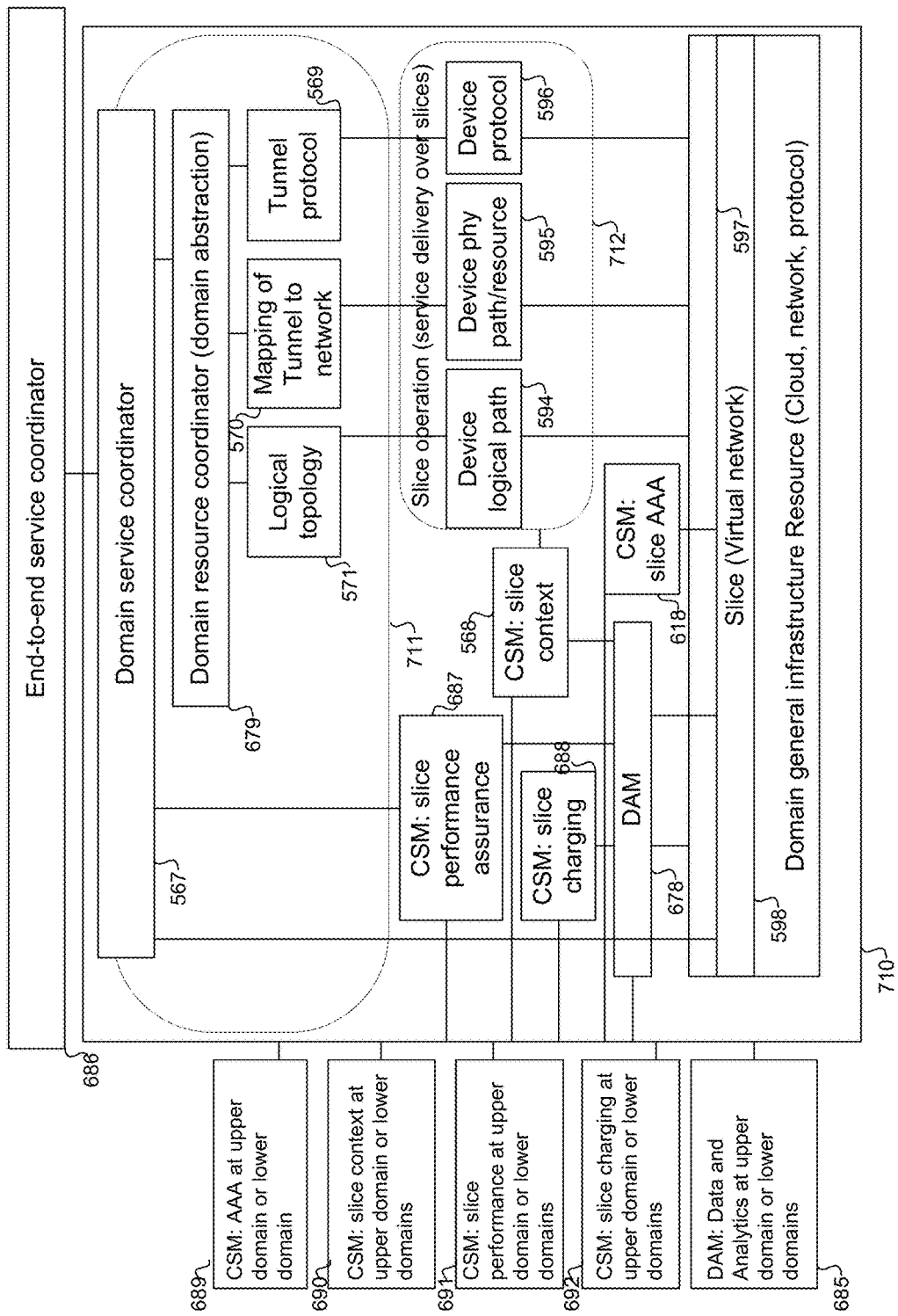
FIG. 29 illustrates CSM functions and interfaces, according to an embodiment.

FIG. 29 illustrates CSM functions and interfaces, according to an embodiment 710. FIG. 29 also illustrates, along with FIGS. 30 and 31, the SONAC-OP function 712 and its interfaces. The CSM slice 618 manages a deployed customer service slice 597 (which in turn is associated with Domain general infrastructure Resource (Cloud, network, protocol) 598). The end-to-end service coordinator 686 passes requests to 711 which includes the domain service coordinator 567, domain resource coordinator 679, logical topology 571, mapping 570, and protocol 569. The slice operation slice (e.g., SONAC-OP) 712 includes the device logical path 594, device physical path/resources 595, and protocol 596. The embodiment communicates with the CSM AAA 689, CSM slice context 690, CSM slice performance 691, CSM slice charging 692 and DAM data 685. The functions of CSM are categorized into a number of sub CSM function families: CSM-QoS 687, CSM-charging 688, CSM-AAA 618, CSM-context 568. The function and interfaces of each of these sub-functions is discussed below, according to embodiments. It should be appreciated that in this embodiment, "CSM: AAA at upper domain or lower domain" 689 communicates with "CSM: slice AAA" 618, "CSM: slice context at upper domain or lower domains" 690 communicates with "CSM: slice context" 568, "CSM: slice performance at upper domain or lower domains" 691 and "CSM: slice charging at upper domain or lower domains" 692 communicates with "CSM: slice performance assurance" 687, and "DAM: Data and Analytics at upper domain or lower domains" 685 communicates with DAM 678.

CSM-Charging function can be designed to address issues associated with business revenue assurance. The charging function can provide changing information in multiple granularities, at level of per application of a device/subscriber, level of a device/subscriber, level of slice customer (with multiple devices or subscribers), at a slice provider level, etc. The charging chains model is highlighted in the Figure.

CSM-charging functions utilize DAM functions to obtain the information for various charging purpose. The CSM-Charging function can be configured by SONAC-Com as a new customer service is deployed. Functions at subscriber level, service level, slice level, etc configure DAM 678 for log charging related data (where to log and what to log), and what information needs to be extracted from the logged data) and report charging information on demand. Interfaces to DAM for configuring log and analytics [location ID (where to log), information ID, reporting mode, log mode] and to CSM-charging functions in other domains.

The CSM-AAA function enables efficient and customized device AAA and key management. In future network, the device authentication and authorization scheme could be service/slice specific. Similarly, the key management of a service/slice can also differ from one slice to other slice. The functions manage the slice specific authentication and authorization of devices for using a slice, perform slice access key management and maintenance of profiles of devices. Interfaces to slice security function for configuring security key of slice (performing security related functions) [device ID, security materials] and to CSM-AAA functions of other domains [key management (crosses domain)].

CSM-Context utilizes DAM to log slice wise or per device/subscriber behavior to assist a customer to better describe slice service attributes and to assist SONAC-Op for better per device/subscriber traffic forwarding management. Functions at slice/service level collect slice service characteristics (distribution of application/service requested, etc). Functions at device level monitor device behavior context (commute pattern, application/service preference (frequency), and frequent communication parties/partners, etc). Interfaces to DAM for configuring log and analytics [location ID (where to log), information ID, reporting mode, log mode], to slice operation function for slice resource utilization optimization [device ID, context ID and data], and to slice customer for slice service behavior.

Figure 30:
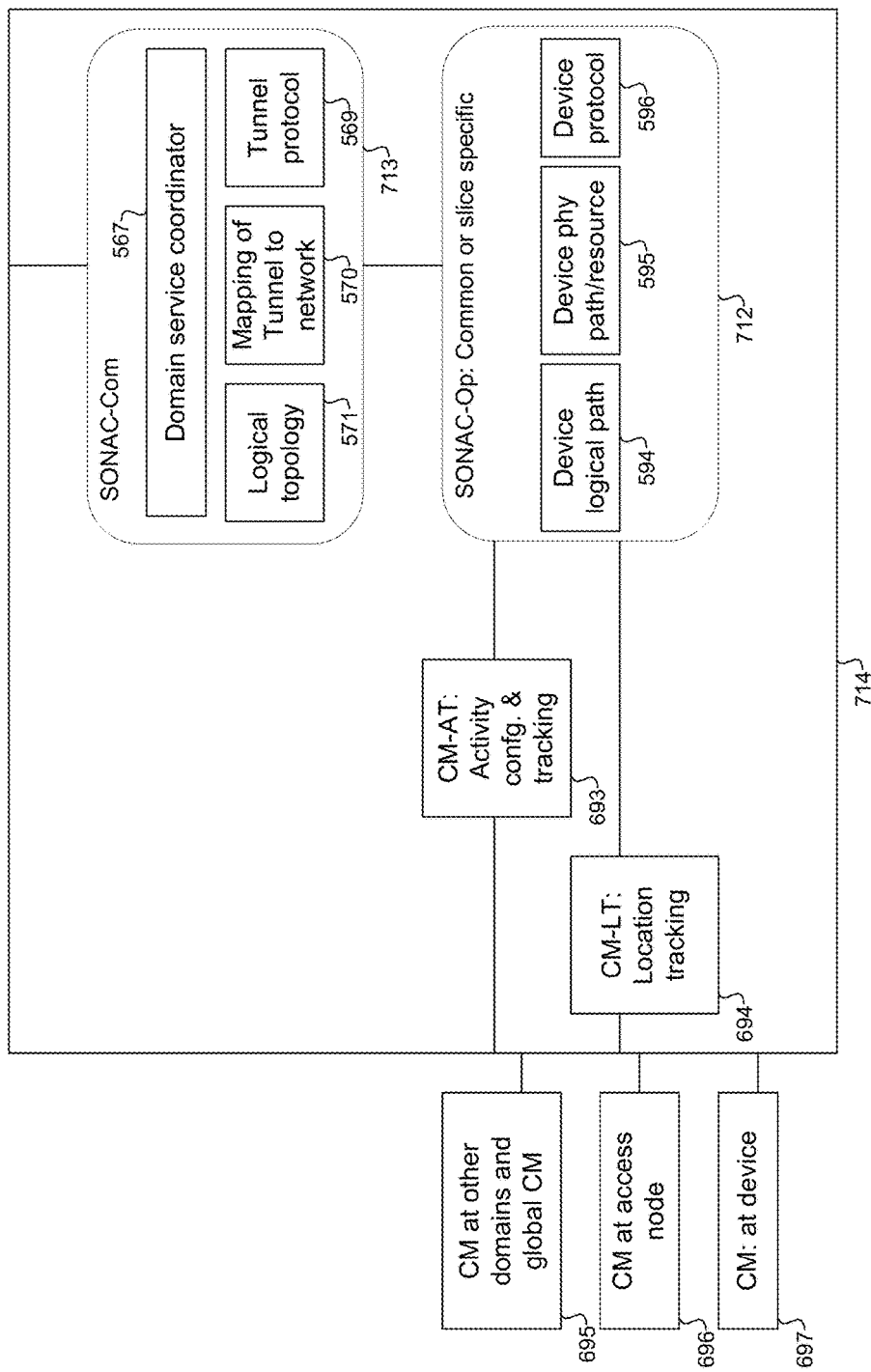
FIG. 30 illustrates CM functions and interfaces, according to an embodiment.

FIG. 30 illustrates CM functions and interfaces, according to an embodiment 714, which includes SONAC-Com 713 and SONAC-OP 712. SONAC-Com 713 includes Domain service coordinator 567, Logical topology 571, Mapping of Tunnel to network 570, and Tunnel protocol 569. SONAC-OP 712 includes Device logical path 594, Device phy path/resource 595, and Device protocol 596. SONAC-OP 712 includes an interface to CM-AT: Activity config and tracking 693 and CM-LT: Location tracking 694. The CM-AT 693 and CM-LT 694 communicate with CM at other domains and global CM 695, CM at access node 696, and CM: at device 697. CM provides reachability information of devices to SONAC-Op for the purpose of device traffic delivery over slices. Two function families are considered. Device location tracking (LT) tracks device location and provide the information to SONAC-op as to where to deliver packets directed to a device. Device activity tracking (AT) tracks the activity status of a device and provides the information to SONAC-Op to determine when to deliver packets to a device. In future network, due to the variety of types of services, the CM can be designed to customize the attributes of services and devices. Functions of CM-LT provide device location tracking and resolution (common or customized) for UL based LT, DL measurement based LT, LT with predictable DL packet delivery, UL transmission dependent DL packet delivery, service customer assistant scheme, Etc. Functions of CM-AT provide device activity configuration/tracking based on customer assistant activity status configuration and customer assistant activity status tracking. Interfaces to Slice operation functions (SDT-Op) provide device ID, location (domain ID, or cluster ID or access node ID and slice operation functions (SDRA-Op) provide device ID, activity schedule table.

MyNET platform and customer service slice development will now be discussed, according to embodiments. After MyNET platform development and deployment, the MyNET application is ready to develop customer service slices.

A slice provider can also pre-deploy one or more 'purpose-specific slices'. Each such slice can be customized to a type of representative service, prior to receiving service requests from customers.

Figure 31:
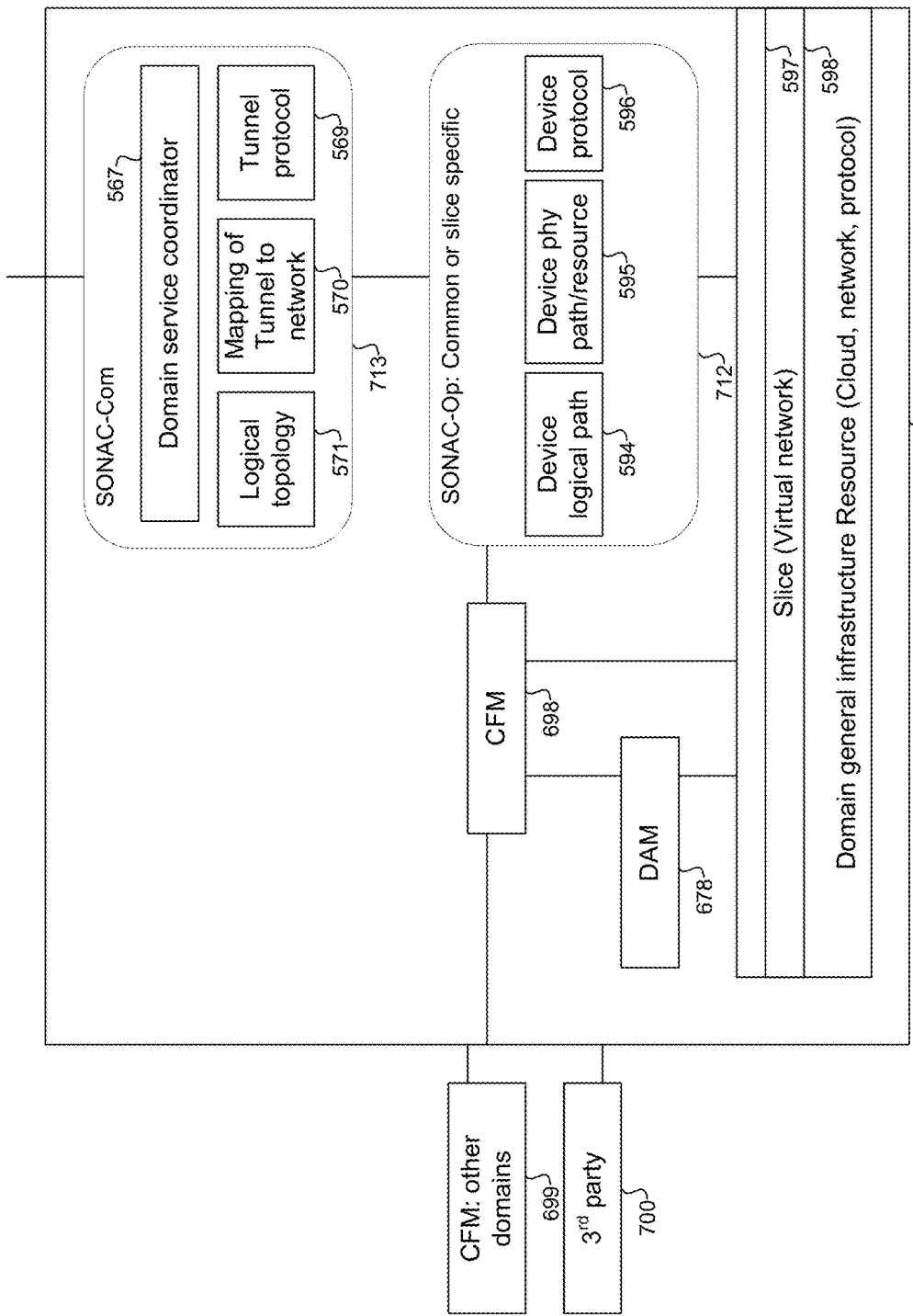
FIG. 31 illustrates CFM functions and interfaces, according to an embodiment.

FIG. 31 illustrates CFM functions (SONAC-Com 713 which is composed of Domain service coordinator 567, logical topology entity 571, Mapping of Tunnel to network 570, and Tunnel protocol 569 and SONAC-Op: Common or slice specific 712 which is composed of Device logical path 594, Device PHY path/resource 595, and Device protocol 596) and interfaces (CFM 698 and DAM 678 which communicate with CFM: other functions 699 and $3^{rd}$ party 700), according to an embodiment 754. CFM is defined for controlling and managing a content cache and forwarding (CF) slice from Slice (Virtual network) 597 using Domain general infrastructure Resource (Cloud, network, protocol) 598. A CFM slice can be created by a CF customer. Such a slice includes caches distributed in the infrastructure network. Selected contents are kept in selected caches.

Figure 32:
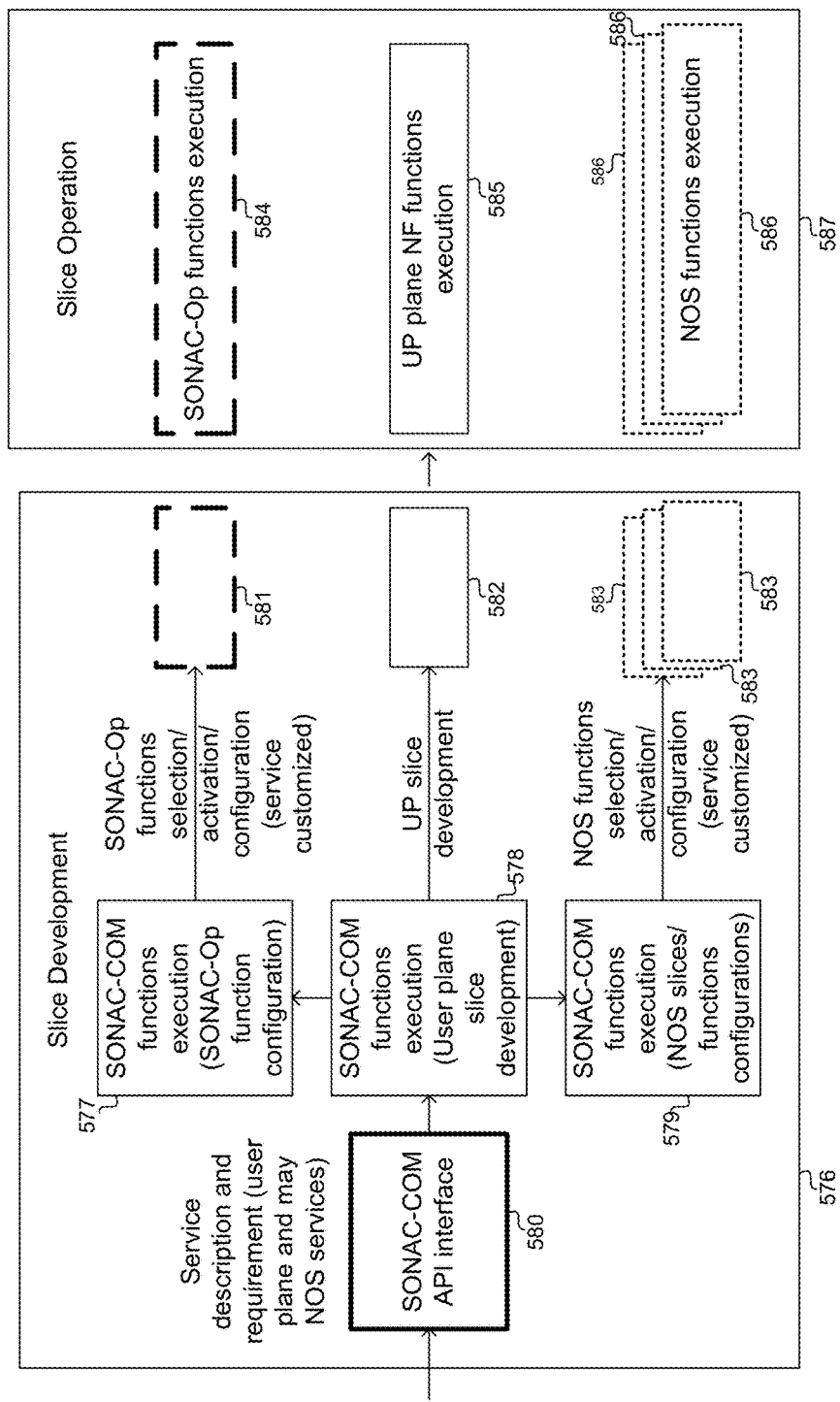
FIG. 32 illustrates a customer service slice development and operation, according to an embodiment.

FIG. 32 illustrates a customer service slice development and operation, according to an embodiment. The left half of FIG. 32 illustrates customer service slice development 576, including the execution of SONAC-Com functions 577 and 581, 578 and 582, 579 and 583. The slices are pre-configured and developed (updated) based on information in the slice request, received via the SONAC-Com API interface 580, as described above with reference to the bottom portions of FIGS. 23 (for the SONAC-Op function configuration) and FIGS. 26, 27, and 28 (for the NOS function/slice configuration). The right half of FIG. 32 illustrates customer service slice operation 587 including the execution of SONAC-Op 584 and NOS Functions 586 and UP plane NF execution 585, in which the slice is ready to deliver traffic packets.

Figure 33:
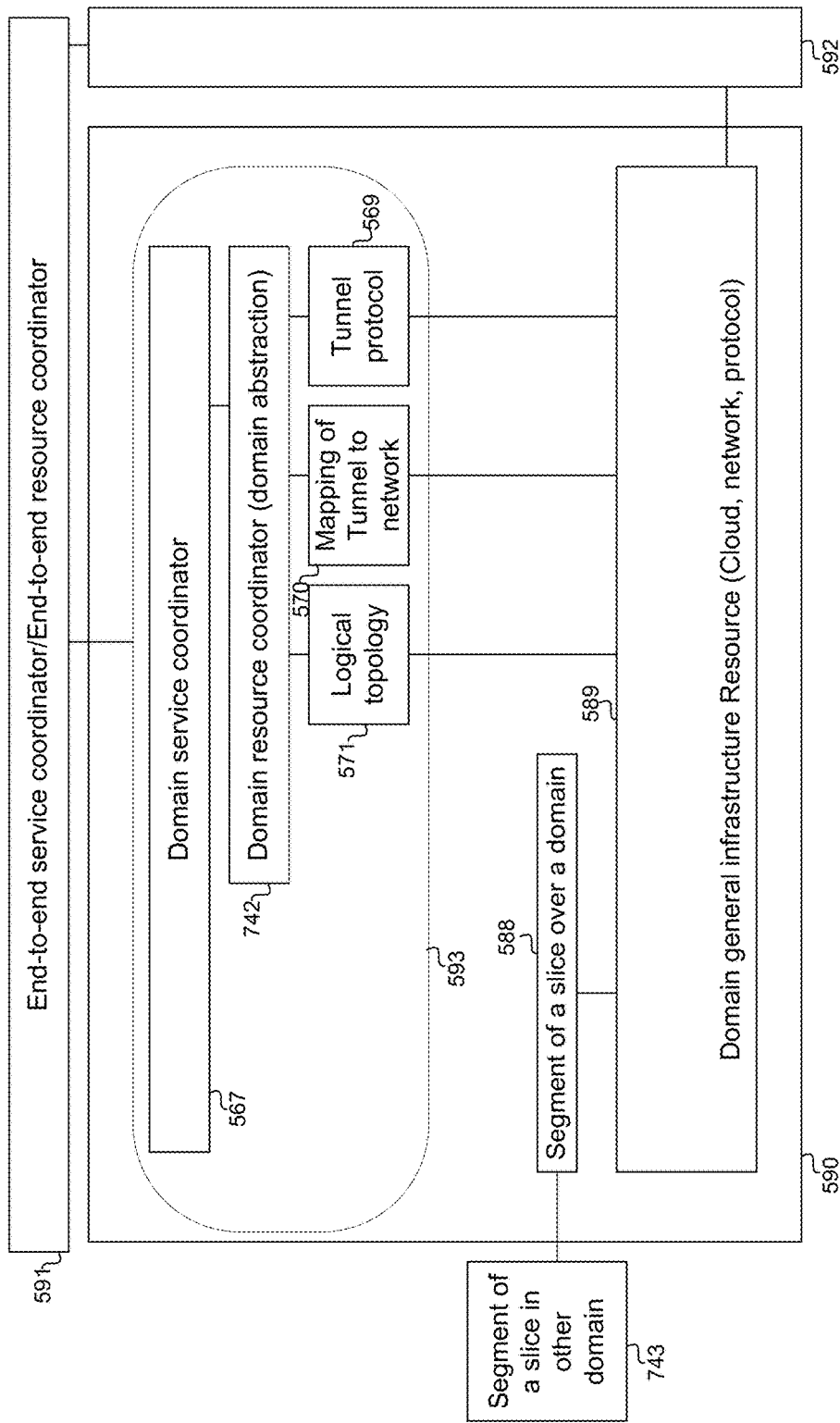
FIG. 33 illustrates Slice Deployment (Creation) according to an embodiment.

FIG. 33 illustrates Slice Deployment (Creation) according to an embodiment. After the development, a slice is embedded into the general infrastructure network. In this figure the domain slice resource coordinator performs the following functions, using generic infrastructure interfaces (DC, MEC, transport, RAN cluster, access nodes, etc) configure cloud (DCs, MECs) (using ETSI NFV techniques), configure the mapping between logical tunnels and infrastructure network, configure the tunnel protocol, and configure SONAC-Op.

The End-to-end service coordinator/end-to-end resource coordinator 591 interfaces with the domains 590 and 592. Domain 590 is shown in detail, while Domain 592 is shown to illustrate that end-to-end service coordinator 591 can interact with a plurality of different domains. The End-to-end service coordinator/end-to-end resource coordinator 591 communicates with the domain service coordinator 567 which interfaces with the domain resource coordinator (domain abstraction) 742, which in turn interfaces with logical topology 571, mapping of tunnel to network 570, and tunnel protocol 569. All of these functions are instantiated in Domain SONAC 593. The segment of a slice in other domain 743 interacts with the segment of a slice 588 over a domain 509 which utilizes the domain general infrastructure resources 589.

After slice execution, a slice can be modified/updated automatically using CSM-QoS (slice), CFM (cache and forwarding slice optimization), applications, InfM (generic infrastructure resources), domain slice coordinator, and domain resource coordinator functions. The CSM-QoS (slice) function is used for slice performance, resource, traffic load change and traffic load variation pattern dependency on time and geographic area. The CSM-QoS (slice) interfaces with domain service coordinator [slice ID, modification request]. The CFM (cache and forwarding slice optimization) is used for content cache slice change due to content popularity and has an interface with domain service coordinator [slice ID, modification request]. The customer application function may trigger slice adaptation by pre-configured policy by customer [slice ID, requirement]. InfM (generic infrastructure resource) function is used for generic infrastructure resource change and interfaces with the domain resource coordinator. The domain slice coordinator determines, based on a trigger, a slice modification and provides requirement to resource coordinator to determine on forwarding the request to upper domain or end-to-end service coordinator. The domain resource coordinator determines if the modification should be local or global. The service coordinator modifies the resource and corresponding configuration to domain infrastructure.

More details of these functions will be discussed below with reference to FIG. 34, which illustrates Slice Adaptation, according to an embodiment.

Figure 34:
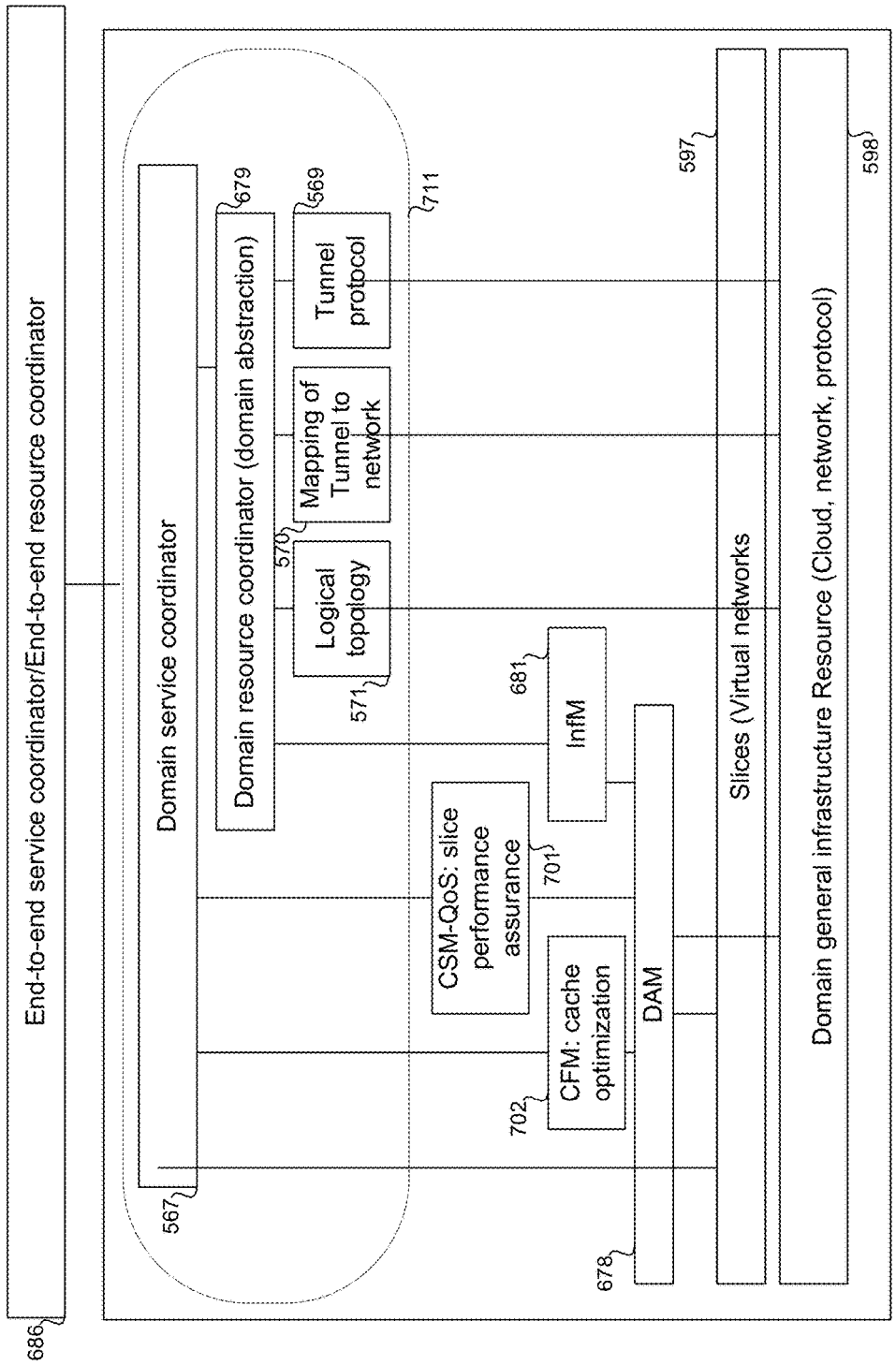
FIG. 34 illustrates Slice Adaptation, according to an embodiment.

FIG. 34 shows MyNET platform and interactions among MyNET functions to enable slice adaptation. The SOMAC-Com 711 (which is composed of Domain service coordinator 567, Domain resource coordinator (domain abstraction) 679, logical topology 571, mapping of tunnel to network 570, and tunnel protocol 569) needs to interface with CSM-QoS 701, InfM 681, CM, CFM 702 and customer service application functions as well as the End-to-end service coordinator/End-to-end resource coordinator 686.

The Scope of adaptation will now be discussed, according to an embodiment. The adaptation of a slice 597 and 598 may be end-to-end or only a local adaptation may be implemented. For local adaptation, i.e., intra-domain adaptation, the adaptation can be invisible to other domain if there is no impact to other domain. A domain SONAC-Com can make a decision on whether this adaptation impacts other domain or not after analyzing the information provided by any or all of the InfM, CSM, or an application function in the same domain. If the adaptation impacts more than one domain, the end-to-end SONAC-Com can implement the adaptation. The information from DAM 678 is used to make this decision.

Figure 35:
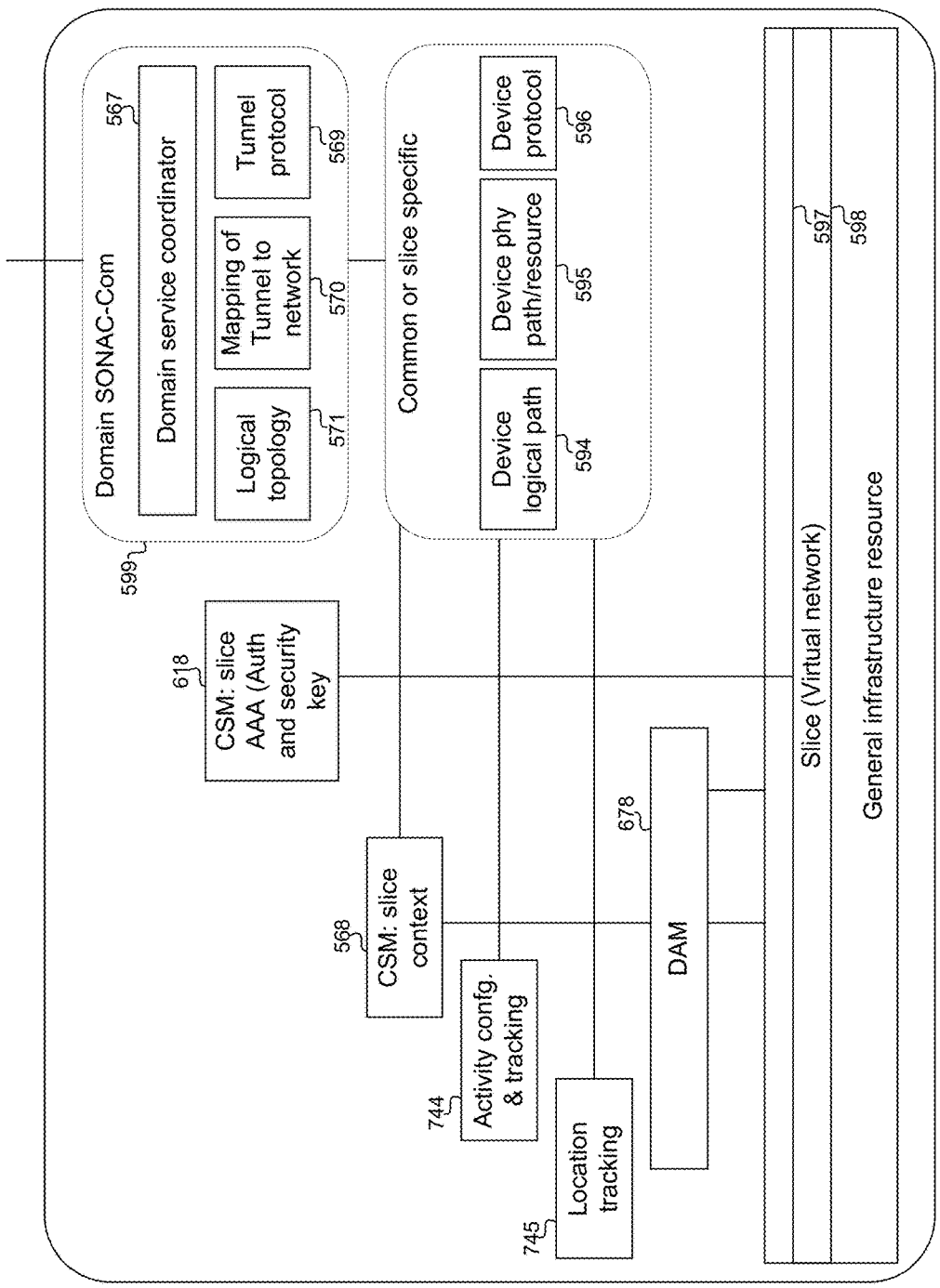
FIG. 35 illustrates Slice Operation according to an embodiment.

FIG. 35 illustrates Slice Operation according to an embodiment. In this case traffic is delivered over the slice 597 and general infrastructure resource 598 and DAM 678 using some or all of the SONAC-Op, CM (device reachability), and CSM-AAA. SONAC-Op uses traffic packet logical path 594 to determine the slice level path for traffic packet via an interface with domain CM to maintain endpoint (devices, servers) routing table, traffic packet physical path 595 to determine physical path given a logical tunnel for traffic packets via an interface with infrastructure network, the Traffic packet protocol 596 which determines the protocol given a logical tunnel for traffic packets via an interface with protocol stacks. CM (device reachability) provide device location to SONAC-Op 745 and provides device activity status to SONAC-Op CSM-context 568 (slice device context) and provides device context to SONAC-Op from domain SONAC-Com 599 which interfaces with the domain service coordinator 567, logical topology 571, mapping of the tunnel to the network 570, and the tunnel protocol 569. CSM-AAA 618 and also controls and manage authentication and authorization 744 of device to use a slice.

Figure 36:
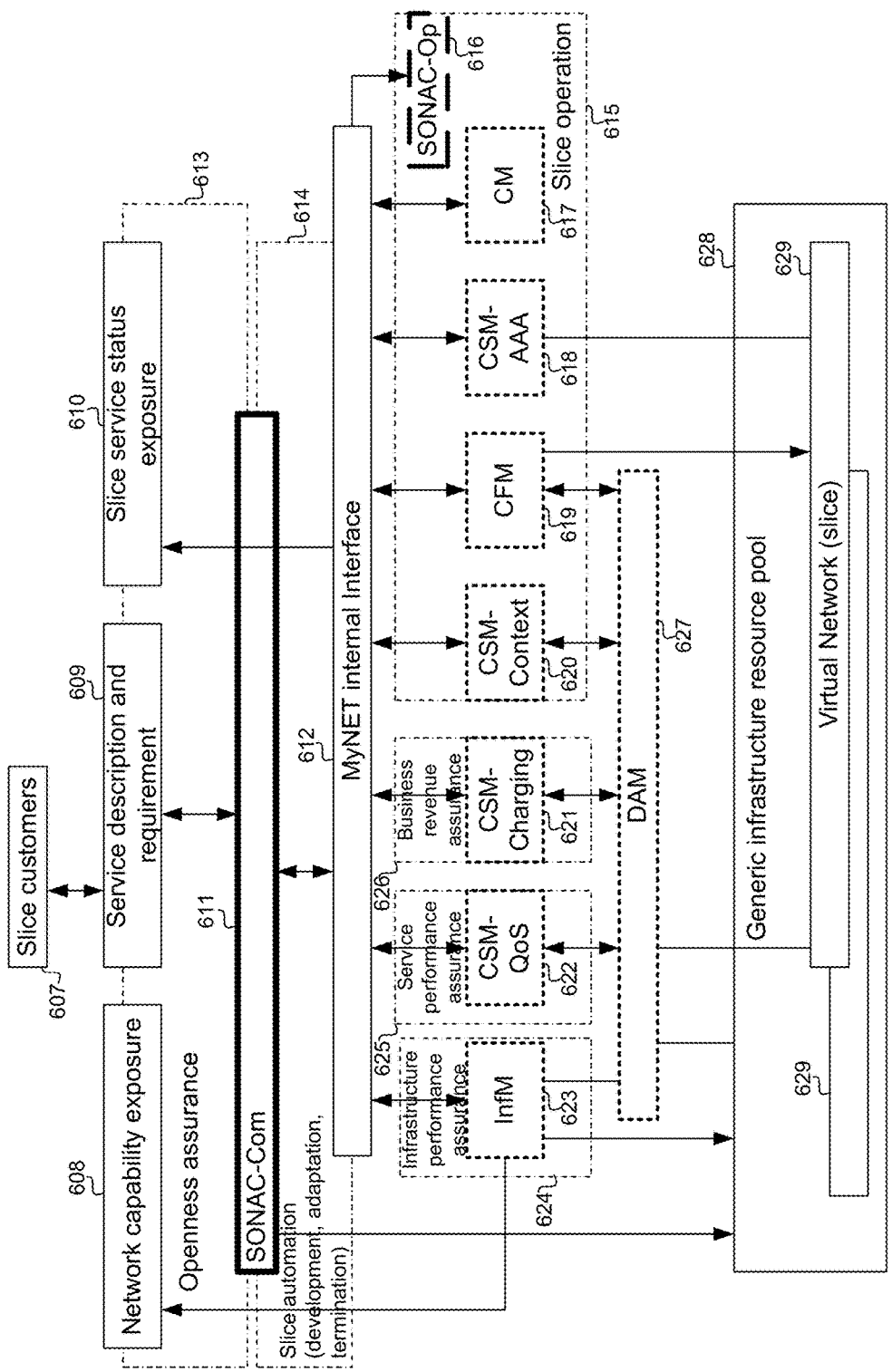
FIG. 36 illustrates various interactions between entities, according to an embodiment.

After the deployment of SONAC-Op slice and NOS slices, MyNET platform development is completed. FIG. 36 shows the high level view of MyNET platform. FIG. 36 illustrates various interactions between entities, according to an embodiment. In this embodiment, the SONAC-Com code is executed to create the SONAC-OP function and the NOS functions (InfM 623, CSM 618, 620, 621, 622, CFM 619, CM 617 and DAM 627 functions). Slice customers provide service descriptions and requirements, which are used to create the virtual network (UP) slices. FIG. 36 also illustrates the responsibility of the functional blocks as they interact with each other, according to an embodiment. Each outer box in the figure (shown in lines including dashes and dots) illustrates such an area of responsibility for the functional blocks. For example the SONAC-Com functional block is responsible for slice automation 614 (development, adaptation, termination via SONAC-Com 611, MyNET internal interface 612, infrastructure performance assurance 624, service performance assurance 625, business revenue assurance 626, SONAC-Op 616, slice operation 615, and the generic infrastructure resource pool 628 (which includes one or more virtual network slices 629), and the CSM-Charging functional block is responsible for business revenue assurance 613 via slice customers 607, network capability exposure 608, service description and requirement 609, and slice service status exposure 610.

Execution of SONAC-Com and MyNET platform Initialization and the various roles (or areas of responsibility) of the SONAC-Com function will now be discussed. In some cases, the short forms "SONAC-Com execution to develop . . . " or "SONAC-Com execution for . . . " refers to the execution of SONAC-Com functions as part of procedure for establishing or updating other functions or slices. In some embodiments, the SONAC-Com function can receive input, from a slice provide, possibly via a user interface for receiving input from a human operator. Further, it should be noted that in some embodiments, at least some of the functionality of the SONAC-Com and SONAC-Op functions can be combined.

Such a network can allow a service provider to provide end-to-end slices. A slice provider provides end-to-end slices using the integrated generic infrastructure resources. Such a slice provider can be a network operator, or another entity. A slice customer (owner) can request and obtain from a slice provider an end-to-end slice and effectively own the end-to-end slice to provide further services to its subscribers. An infrastructure provider owns/controls a set of GWNI and can provide, for example, any of a RAN, DC, transport network, and spectrum, etc. It should be noted that examples will be discussed, for the sake of simplicity, in which a slice is used for one service. However, it should be appreciated that embodiments can also allocate a slice which could be used by multiple services.

The configuring phase includes the development of the basic function library and basic graph library. This step defines basic functions and corresponding policy of intelligent functions. Intelligent functions make decisions based on real-time obtained conditions/criteria and take corresponding actions. These "intelligent" functions can be configured as an expert system to be able to make decisions based sets of "if . . . then" rules based on research and expertise based on large numbers of evaluations. The functions defined and configured include, SONAC-Com function families; SONAC-Op function family, InfM function family, DAM function family, CSM function family, CM function family, and CFM function family. The user plane network functions, such as mobile anchor point function, security functions, packet aggregation function, etc are also defined. In addition, the basic graph library is defined, which is used by SONAC-Com to determine the logical topology for slices, including NOS slices and customer service User Plane (UP) slices.

SONAC-Com uses information about the infrastructure to develop the network slices which are deployed using the infrastructure. More information about the infrastructure database includes the following, organized by sub-block. A description of entitled infrastructure network: provide information on network hardware equipment/element and physical connections among them, which are available for embedding virtual network/slices. In MyNET platform, a DC or a MEC can be abstracted into a single network node with certain process capability and performance. For infrastructure network integrated from multiple domains, the infrastructure description can provide the information of each domains and inter-domain connections. A description of interfaces of built-in log elements: provide information about interfaces which can be used to collect raw data from built-in log element developed by the infrastructure providers. These elements may be configurable by external entity to enable on-demand logging. For example, a RAN node may have a built-in logging element to log packet latency. This element may be configured to log latency of certain packets which only associate with an application, or a device or a customer or a slice, etc. Or a log element can be configured to provide the log information with corresponding packet header information to a data analytics entity for information filtering and extraction, etc. A description of interfaces of externally configurable infrastructure equipment/elements: provide the information about interfaces which can be used by an external entity to configure parameters for the operation. For example, a RAN node can be configured to power-down certain sub-systems (e.g., access subsystem, wireless backhaul subsystem, etc.), on an on-demand basis. A description of on-demand available infrastructure network: provide the information about on-demand infrastructure resources. A slice provider can establish collaboration with other infrastructure providers for on-demand infrastructure resource integration. This is different from the entitled infrastructure resource. The entitled infrastructure resource is the infrastructure resource pool which is available all the time for slice deployment. The infrastructure resource pool could be the integrated resource pool from multiple infrastructure providers. In some cases, the entitled resource pool may insufficient, at which point other resources may be obtained. The on-demand infrastructure resource is the resource which is integrated only if the entitled infrastructure resource pool cannot satisfy the requirements of new or existing slices, and at the same time, the infrastructure resource to be integrated is able to provide the required capacity. The corresponding information of interfaces as for the entitled infrastructure networks is also provided.

The deployment of a well-defined slice includes the instantiation, or activation or configuration of functions in the selected network nodes (e.g., data centers, mobile edge computing). This can be performed by ETSI VIM functions. The configuration of the inter-connections/interfaces among functions. The configuration of infrastructure equipment for slice logical tunnel mapping onto physical infrastructure network. The configuration of wireless network nodes (access nodes, wireless backhaul nodes) for slice logical tunnels (shared or non-shared) at the edge of a slice. Many standard bodies are actively defining these interfaces. E.g., ESTI NFV has done work in defining the processes of network virtualization and virtual functions instantiation, configuration and management. 3GPP is actively defining 5G network architecture.

A brief overview of the automation of network slicing is provided with reference to FIG. 36. SONAC-Com receives requests of slice customers for slice development. SONAC-Com interacts with the general wireless network to deploy customer service slices, which can include slices for carrying traffic associated with a UP, and may also deploy at least one of SONAC-Op and NOS slices if these slices need to be dedicated to the customer. If the non dedicated SONAC-Op and NOS slices are required, SONAC-Com configures existing sharable SONAC-Op and NOS slices to enable the operation of a customer UP slice. In some embodiments SONAC-Com is the component of MyNET platform which enables automation of network slicing.

SONAC-Op, based on the configuration by SONAC-Com, controls the operation of slices by interacting with infrastructure for handling of traffic data forwarding over slices. It interacts with some of NOS functions, e.g., CM, CSM and CFM for slice operation optimization assurance.

InfM interacts with SONAC-Com to provide infrastructure network resource pool information, etc. In some embodiments InfM is also responsible for infrastructure network monitoring, configuration to ensure the optimization of infrastructure network performance and resource utilization.

A CSM entity interacts with SONAC-Com for slice performance assurance. In some embodiments a CSM entity interacts with SONAC-Op to support the optimization of customer slice operation. In some embodiments the CSM entity can also manage the slice charging to enable the business revenue assurance.

CM functions interact with SONAC-Op to provide reachability information regarding devices to SONAC-Op for device traffic handling over slices.

CFM functions are responsible for the optimization of Cache and Forwarding (CF) slice operation. CFM functions can interact with SONAC-Op for this purpose.

A DAM interacts with other NOS functions to provide data log and analytic services. DAM can be instantiated within its own slice which directly interacts with infrastructure equipment and virtual functions for data logging and data analytics.

FIG. 36 shows the high level structure of a MyNET platform. More details of each of these function families are discussed below with respect to different figures.

The development of the basic function library (box 100 of FIG. 16) includes defining (configuring) functions which can be selected and be deployed as needed.

Figure 37:
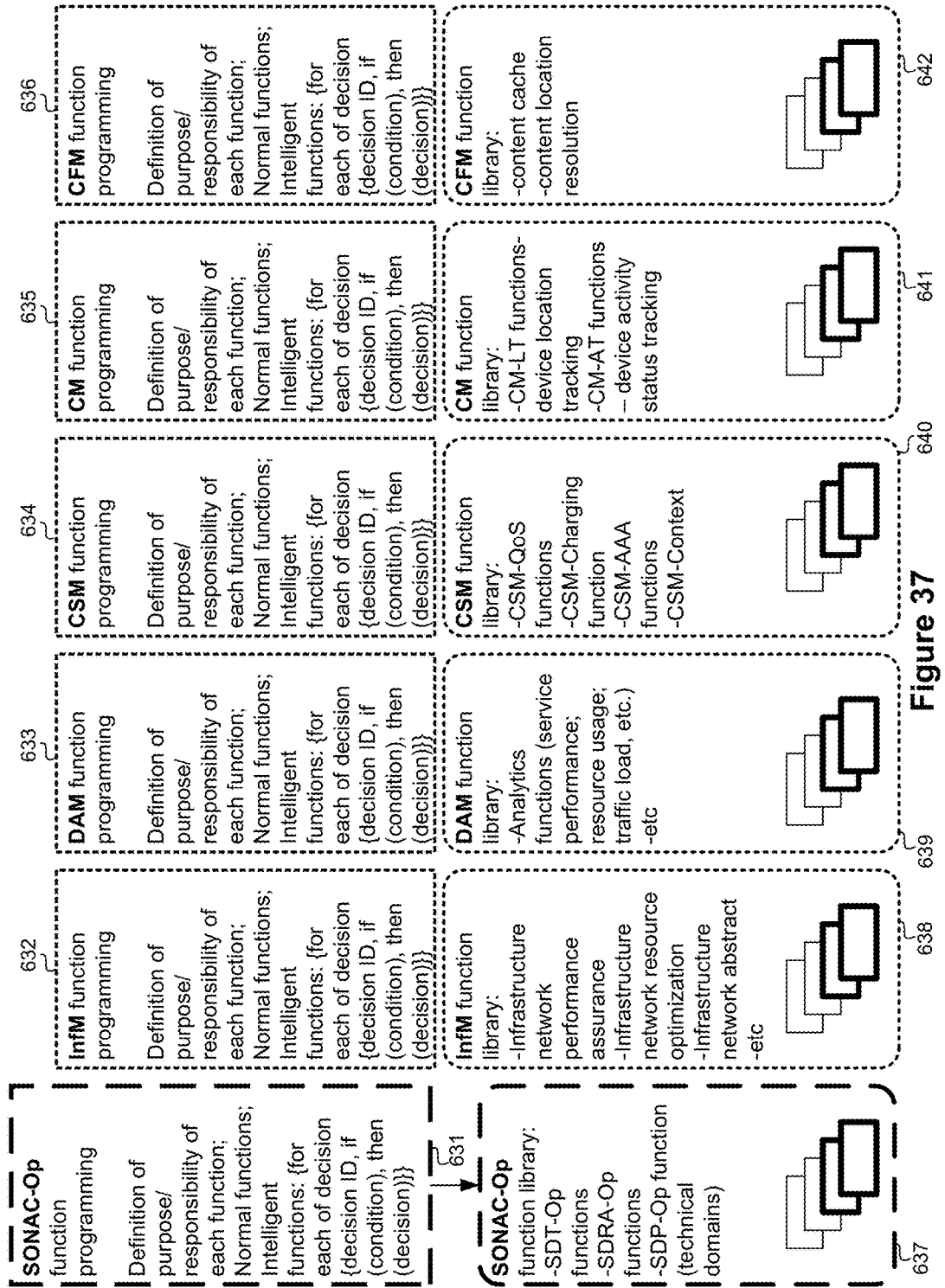
FIG. 37 illustrates an example of configuring the SONAC-OP and NOS functions, according to an embodiment.

FIG. 37 illustrates an abstract of a method of configuring SONAC-Op and NOS functions, according to an embodiment.

SONAC-Op functions are functions to control the traffic data delivery over deployed slices. For different types of services, different SONAC-Op functions can be defined. SONAC-Op performs different functions in different technical domains. As part of preparing the function library, SONAC-Op functions are defined. Among SONAC-Op functions, some functions need certain intelligence to make decision in order to react to certain real-time monitored conditions. For such intelligent functions, the rules or policies to govern the reaction of these functions are defined as part of the function definition. Similarly, NOS functions, for different technical domains and for different type of services, are defined. For intelligent NOS functions, the rules or policies to govern the reaction of these functions are also defined. The basic SONAC-Op functions and NOS functions will form SONAC-Op function library and libraries of each of these NOS services. SONAC-Com will select appropriate functions from each of these libraries when SONAC-Op slice and NOS slices are developed.

FIG. 37 illustrates an example of configuring the SONAC-OP and NOS functions, according to an embodiment. This phase includes configuring using a set of function 631/decision 637 ID and corresponding functions. In some embodiments this includes using a set of "if . . . then" (hereafter if-then) rules (or their equivalent) for selecting appropriate functions based on input received from the monitoring of real time conditions. In some embodiments, operator input may be used in non-real-time execution environments. This can include "normal" function and 'intelligent' functions which make decisions based on real-time conditions. In FIG. 37, it is assumed that for each decision ID, an intelligent function determines the decision based on 'conditions'. These rules (Policy), are pre-determined by slice providers. InfM function programming 632 and library 638, DAM function programming 633 and library 639, CSM function programming 634 and library 640, CM function programming 635 and library 641, and CFM function programming 636 and library 642 are also illustrated in this figure.

SONAC-Com is a component in MyNET platform which can include a degree of intelligence to control and manage the automation of slices, including SONAC-Op slice, NOS slices and customer service UP slices. In this context automation refers to the automatic slice development, deployment and adaptation to real-time conditions. From SONAC-Com perspective, both NOS services and customer services are viewed as the same. The main difference is that, for NOS slices, SONAC-Com selects the basic functions to build up a NOS slice from the corresponding NOS function libraries, while for customer service slices SONAC-Com selects the UP functions from UP NF function library.

Figure 38A:
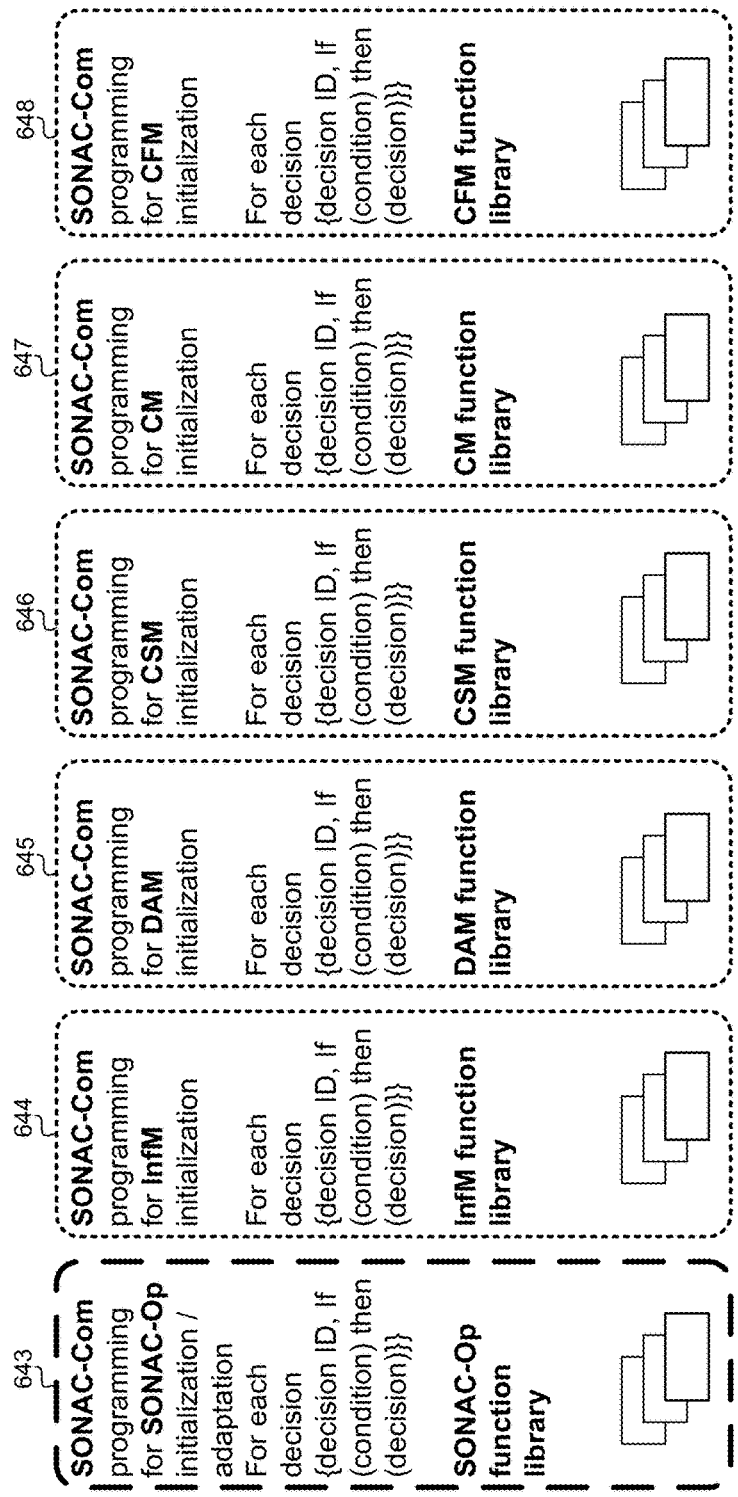
FIG. 38A, B, and C illustrate examples of configuring the SONAC-Com function, according to an embodiment.
Figure 38B:
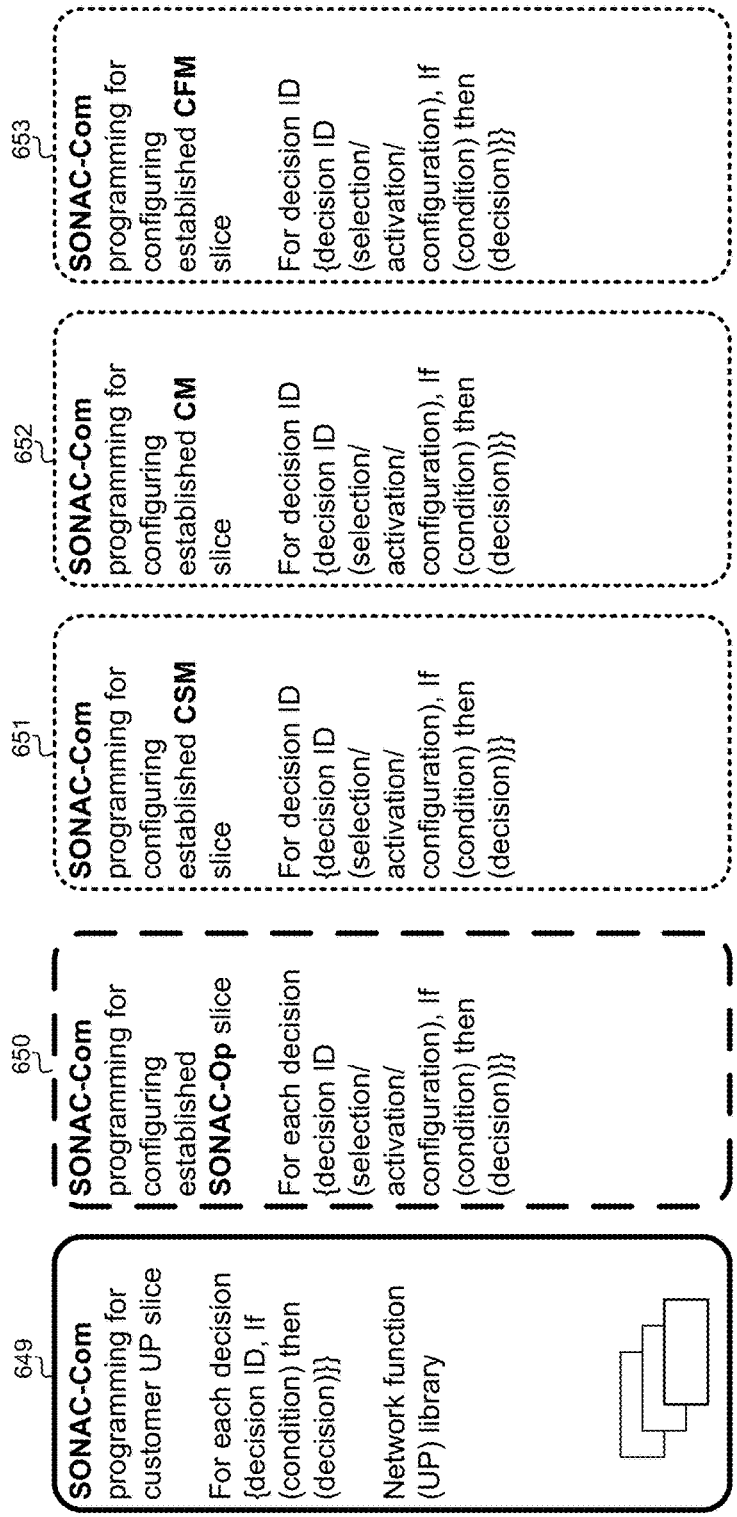
FIG. 38B illustrates configuring SONAC-Com for customer service UP slice development.
Figure 38C:
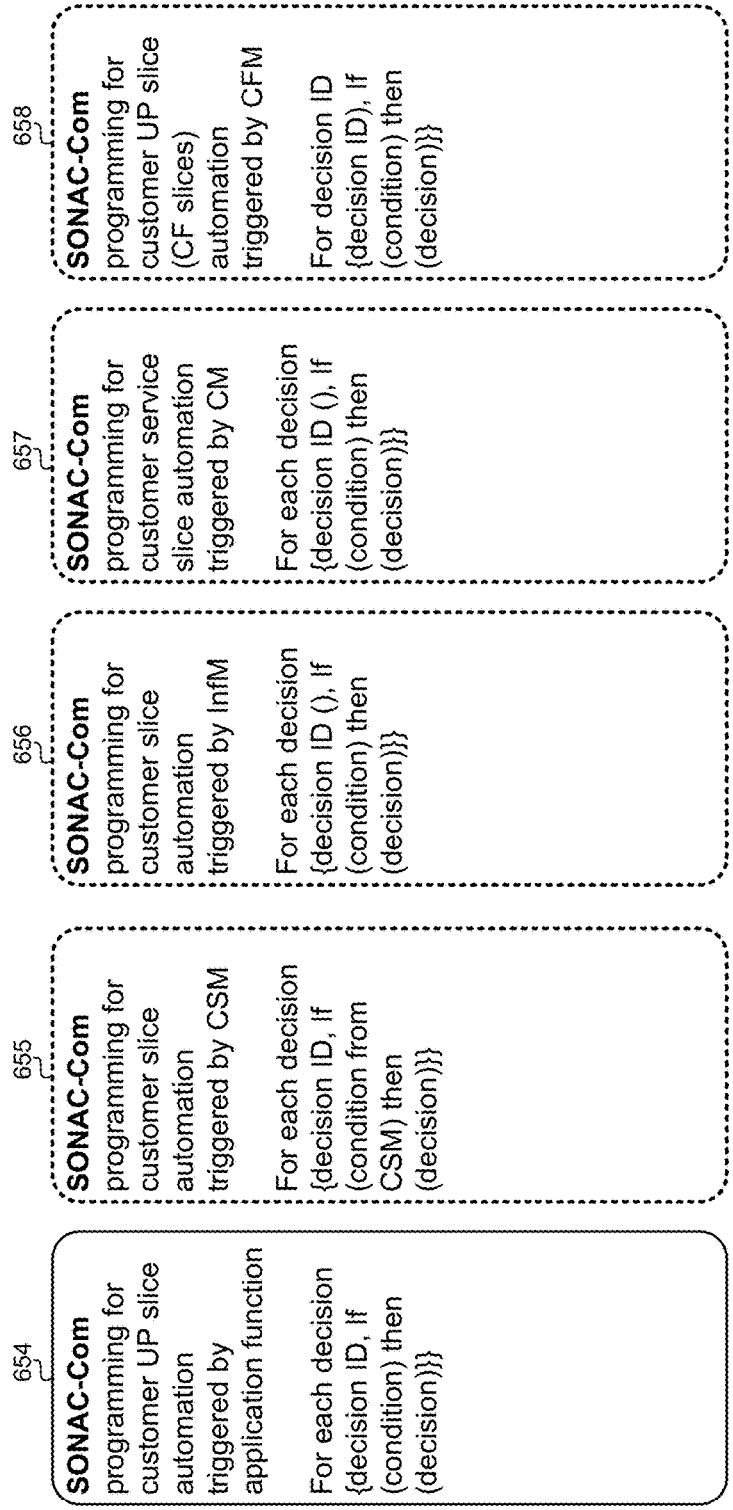
FIG. 38C illustrates configuring SONAC-Com for customer service UP slice automation/adaptation.

FIGS. 38A, B, and C illustrate examples of configuring the SONAC-Com function, according to an embodiment. FIG. 38A illustrates configuring SONAC-Com for MyNET platform initialization. FIG. 38B illustrates configuring SONAC-Com for customer service UP slice development. FIG. 38C illustrates configuring SONAC-Com for customer service UP slice automation/adaptation. In these figures, it is assumed that for an intelligent function, for each decision ID, the function needs to determine the decision based on 'conditions'. The 'decision' here is generic term.

For MyNET platform development by SONAC-Com, SONAC-Com can be configured for initialization (and adaptation) of a SONAC-Op slice and NOS slices as shown in FIG. 38A. This can include configuring the SONAC-Com for automation of SONAC-Op slice initialization and adaptation 643. SONAC-Com functions for SONAC-Op slice initialization and adaptation are defined and configured such that SONAC-Com is able to develop SONAC-Op slice when MyNET platform is developed. The functions include the selection of SONAC-Op functions for different technical domains and default parameter setting, definition of SONAC-Op slice topology, etc. The decisions may be determined in accordance with information about infrastructure topology and SONAC-Com topology. In some embodiments SONAC-Com is also configured to automatically adapt the SONAC-Op to infrastructure topology changes.

FIG. 38A also shows configuring SONAC-Com for NOS slices initialization and adaptation. Factors impacting decision of SONAC-Com for NOS slices initialization and adaptation include the topology, technologies, capacity of entitled infrastructure network. In some embodiments NOS slice initialization also includes making decisions regarding the selection of NOS basic functions for different infrastructure technical domains and logical topology definition, the definition of interfaces to infrastructure network equipment (e.g., InfM slice 644, DAM slice 645 CSM slice, 646, CM slice 647, and CFM slice 648). In some embodiments SONAC-Com is also configured to enable NOS slice adaptation in response to infrastructure topology changes. At the initialization of NOS slices, basic NOS functions are instantiated. Some functions can be activated upon initialization while others may be activated later as customer service UP slices are developed.

FIG. 38B illustrates configuring SONAC-Com for customer service UP slice development, according to an embodiment. As a new customer slice request is received, the SONAC-Com develops the UL slice for customer, as well as the developing the SONAC-Op and other NOS slices. In some embodiments, existing sharable SONAC-OP and NOS slices can be used to support the operation of such a new customer UP slice. In this case SONAC-Com configures the involved functions in the SONAC-OP slice and NOS slices. If the UP slice requires a dedicated SONAC-Op or some of NOS slices, SONAC-Com can determine the selection and activation of these functions during the initialization of MyNET platform. FIG. 38B shows example configuring of SONAC-Com for this purpose, according to an embodiment. This includes a SONAC-Com configuring for the customer UP slice block. This includes configuring SONAC-Com for automation of customer service development 649. For example, a customer service (UP) slice (UP) can be automatically developed by SONAC-Com based on the infrastructure network topology and resources, and the service description and requirements supplied in a request. SONAC-Com can determine the required network functions (NFs) 650. The inter-connections among these NFs, and customer defined in-network application layer functions, can also be defined. The end-to-and protocol, slice logical tunnel protocol, access link protocol are also defined.

FIG. 38B also illustrates configuring SONAC-Com for automation of SONAC-Op configuration for a new customer service slice. For example, SONAC-Com is configured to automatically perform at least one of selecting, activating, and configuring SONAC-Op functions (which have been deployed as part of the MyNET platform development) as a new customer service slice is developed. The decisions depend on customer service description, requirement and the customer service slice developed. SONAC-Com can also decide the required threshold(s) and parameters for functions if applicable.

FIG. 38B also illustrates configuring SONAC-Com for automation of NOS configurations for new customer slice. For example, SONAC-Com is configured to make decisions for at least one of selecting activating configuring NOS slices (e.g., CSM slice 651, CM slice 652, CFM slice 653), as a new customer slice is developed. The factors impacting decisions include the description and requirement of customer services, and, in some cases, explicit requirement of NOS services.

FIG. 38C illustrates configuring SONAC-Com for Customer UP slice adaptation, according to an embodiment 654. This illustrates an example of how SONAC-Com is configured to modify a customer service UP slice during the slice operation. In this example, any of the CSM-QoS functions 655, InfM functions 656, CFM functions 658, CM functions 657 and application functions within a customer service slice can trigger an existing slice adaptation. Accordingly, SONAC-Com is configured with interfaces to these functions at the development phase. This allows SONAC-Com to determine the slice adaptation based on the information provided by these functions. In some embodiments decisions can be made based received signaling messages, e.g., receiving a slice adaptation request from one (or more) of these functions. It should be appreciated that the decisions made by (or the actions taken by) SONAC-Com could be different depending on which function sends the request.

In addition to defining SONAC-Com, SONAC-Op, and NOS functions, a slice provider can also define other network functions for a user plane. Such user plane functions could include a mobile anchor, packet aggregator, packet dispenser, protocol translator, etc. Basic functions of transport stacks can also be defined. For example, basic functions such as reliability assurance functions, in-ordered delivery of packets, security functions, etc. As a customer service UP slice is developed, SONAC-Com can decide the selection and configuration of NF (for example by a SDT function and protocols (for example by a SDP function).

Another part of the development phase includes the pre-definition of basic graphs. A graph library can be defined by a slice provider. As part of the development of a slice, SONAC-Com can determine the selection of required functions and then decide the graph (interconnection among the functions) of the slice. There are multiple ways to define the graphs. For example, for relative simple and small scale infrastructure network, an end-to-end graph may be defined for each type of representative service. As the service request comes, SONAC-Com can decide the graph based on the service description and requirement.

For a larger scale infrastructure network, the infrastructure network may be divided into multiple domains. Referring to FIG. 3A, the graph can be defined for each domain for each type of service. For example, the graphs can be defined for the global network domains for each type of services. In this case, low domains (e.g., RAN clusters) can provide abstracts to the SONAC-Com in global domain. Similarly, graphs can also be defined for RAN clusters for different types of services. An end-to-end slice graph can then be defined as the combination of all these sub-graphs.

In some embodiments, a slice provider can also define basic graphs (a small number of graphs). The slice logical topology, functions and end-to-end graph, can be obtained by running appropriate algorithms.

As part of the slice development, SONAC-Com can select functions, and graphs, as well as determine the location of functions within the general infrastructure networks.

Figure 39:
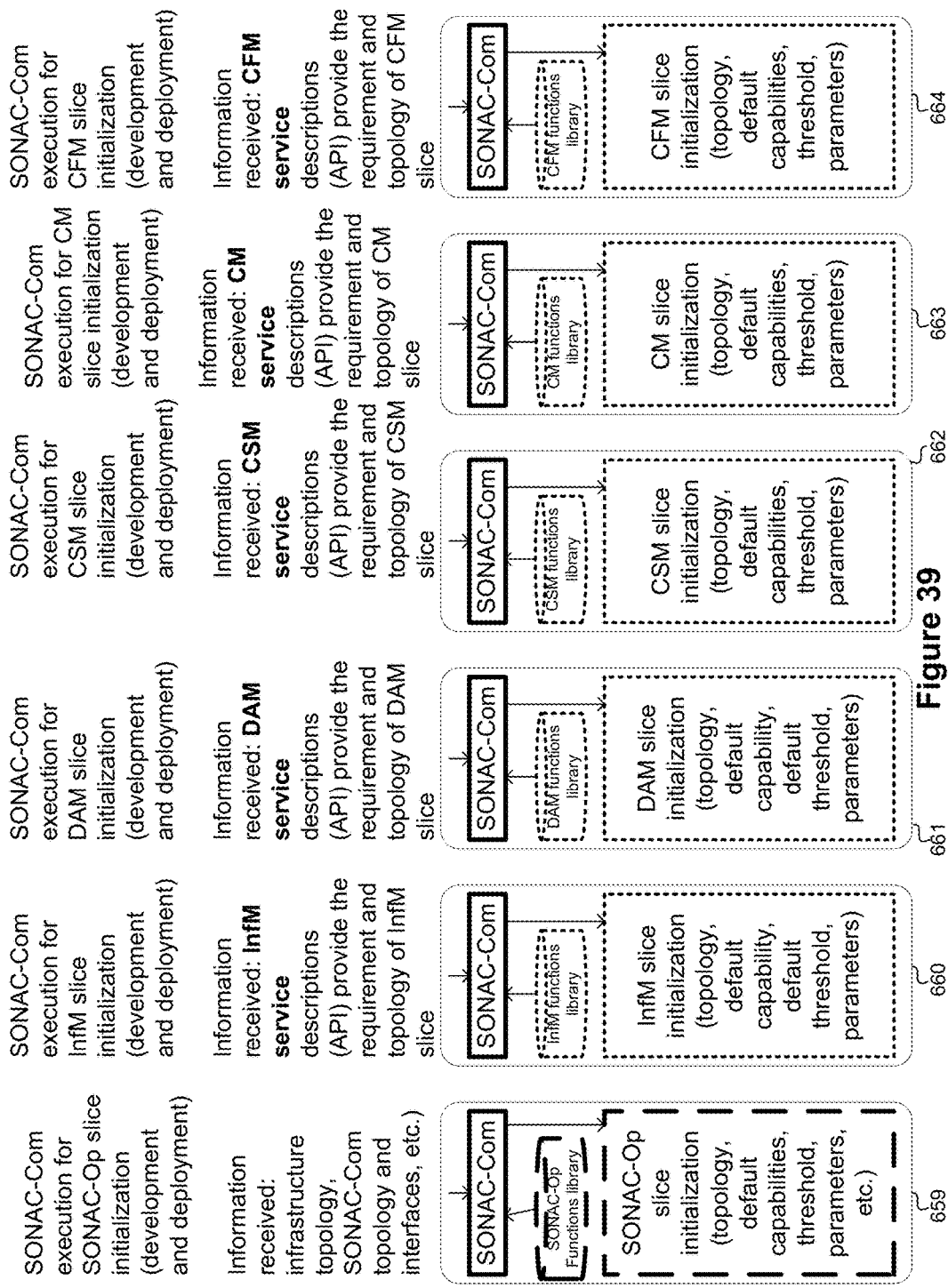
FIG. 39 illustrates the SONAC-Com function execution for initialization of SONAC-Op and NOS slices, according to an embodiment.

After SONAC-Com is deployed at step 300 of FIG. 16, SONAC-Op and NOS slices are developed and deployed by execution of SONAC-Com functions. FIG. 39 shows the MyNET platform development by execution of SONAC-Com functions following the deployment of SONAC-Com, according to an embodiment.

FIG. 39 illustrates the execution of SONAC-Com function to develop SONAC-Op slice (initialization of SONAC-Op slice). SONAC-Com is configured to develop and deploy a SONAC-Op slice by the execution of the configured SONAC-Com functions. This procedure includes decision making on which SONAC-Op functions are selected for different technical domains, placements of SONAC-Op functions, interconnection among these functions, configuration of default threshold/parameters of functions, etc. In some embodiments the interconnection between SONAC-Com and SONAC-Op is also determined.

After the development of the SONAC-Op slice, the slice can be deployed in the general infrastructure network. For example, an ESTI NFV defined VIM can be used for the instantiation of functions in the selected locations (DCs, MECs, etc). SONAC-Com can also configure network nodes, e.g., access network nodes, and configure logical tunnels of a slice, etc. At initialization, some SONAC-Op functions may be activated whereas other functions can be activated when needed. Once initialized the SONAC-Op slice is ready to be on-demand selected, activated, and configured as new customer slices are developed.

FIG. 39 also illustrates the execution of SONAC-Com functions to develop NOS slices (NOS slice initialization). NOS service slices are deployed by the execution of corresponding SONAC-Com functions based on the slice provider's instructions (for example via the API interface shown in FIG. 2). As part of NOS slice development, for each of these NOS services, NOS functions for different domains are selected and the interconnections are defined. Similar to the procedure for the SONAC-Op slice, functions are instantiated at selected locations, and the inter-connections among functions of a NOS slice are established 659. The order of NOS slice deployment can be as, InfM slice 660, DAM slice 661, CSM slice 662, CM slice 663 and CFM slice 664. After the deployment of a NOS slice, the SONAC-Op is provided with the slice description so that SONAC-Op can operate the slice. For each newly deployed NOS slice, the inter-connection between this NOS slice and previous deployed NOS slice can be established if needed.

Figure 40:
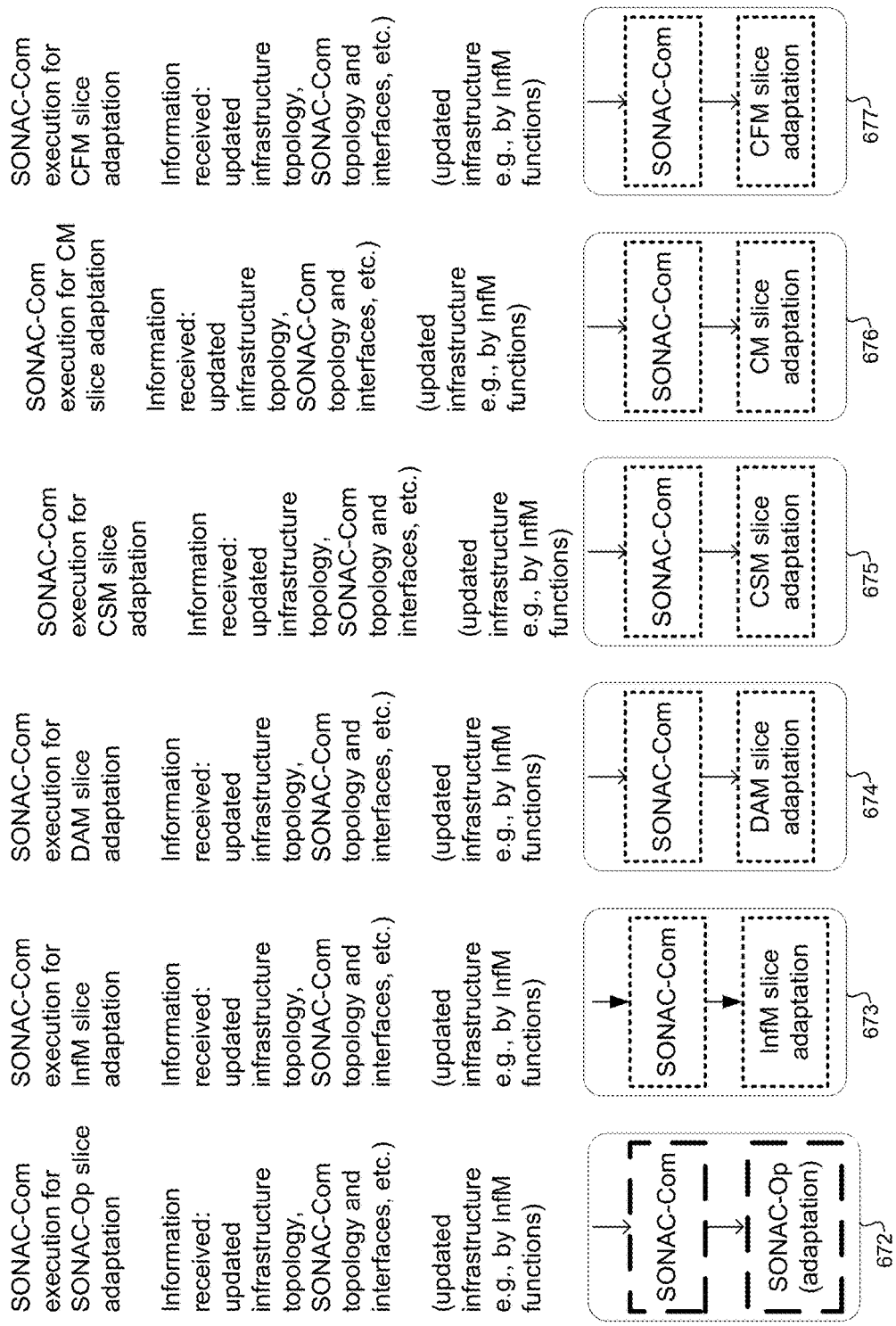
FIG. 40 illustrates the SONAC-Com execution to develop the SONAC-OP and NOS slices, according to an embodiment.

FIG. 40 highlights the execution of SONAC-Com functions for the purpose of MyNET platform adaptation, according to an embodiment. For example, a change in current infrastructure network can be communicated to SONAC-Com. SONAC-Com can then make corresponding actions, such as, remove current MyNET functions in the impacted domains 672. In some embodiments, SONAC-Com can be informed of an impending change so that it can proactively change (or be ready to change) the slices to accommodate the change in an infrastructure network. In other embodiments, after the change has been realized in an infrastructure network, SONAC-Com is informed and decides whether additional MyNET functions (InfM 673, DAM 674, CSM 675, CM 676, and CFM 677) need to be deployed or whether existing functions need to be altered.

In some embodiments the system can evaluate the quality of the services being delivered and the quality of MyNET platform self-check may also trigger the platform modification.

A high level view of MyNET platform components and relationships among them will now be discussed, according to embodiments. However, it should be appreciated that the functions described are not a complete set of functions of MyNET platform.

End-to-end service coordinator 560 takes the responsibility of customer service slice provisioning over multiple domains. According to an embodiment, the end-to-end service coordinator 560 performs the following functions. The service coordinator 560 receives requests (QoS and service attributes) from slice requester via API. The service coordinator 560 analyzes the request and determines which domains involve the slice composition. The service coordinator 560 allocates slice ID/service ID to the to-be developed slice. The service coordinator 560 analyzes the request and provide service requirement to each domain service coordinator. The end-to-end service requirement needs to be translated into per domain service requirement. The determination of service slice quality of each domain needs tight collaboration with resource coordinator and may need multiple iterations. The service coordinator 560 assigns the slice ID/service ID to end-points of a slice after slice is developed and deployed.

According to an embodiment, the end-to-end service coordinator 560 includes the following interfaces. An API for service slice requirement and attribute description (NOS services or customer services), end-to-end resource coordinator [service requirement, service description], domain service coordinators [service requirement, topology graph, NFs], and end-to-end CSM-QoS [slice performance].

The end-to-end resource coordination/management function can be an independent function to coordinate the resource allocations among domains. There may be multiple schemes for resource coordination. For example, for a top-down scheme, top domain may determine the topology and resource allocation. However given this constraint, the lower (neighbor) domain may not be able to provide the required resource to the slice. In this case, the upper domain may modify its previous topology. A similar strategy is applicable to other schemes, such as bottom-up scheme.

According to an embodiment, end-to-end resource coordination/management function includes two major functions: an end-to-end resource coordinator and an end-to-end resource manager. According to an embodiment, the end-to-end resource coordinator performs resource allocation coordination and includes interfaces to Domain resource managers and the End-to-end service coordinator.

The end-to-end resource manager provides slice resource allocation, based on the service description and requirement, and available infrastructure network resource.

According to an embodiment, the end-to-end resource manager (which can also be called a global resource manager) performs the following functions. The SDT-Com determines the needed NFs (or NOS functions for NOS services), logical topology (slice level logical tunnels) across top domain or multiple domains or entire infrastructure network, depending on the infrastructure topology. The SDRA-Com determines the mapping scheme for logical tunnels to infrastructure based on information from the SDRA-Com for RAN cluster and the SDRA-Com for transport network. SDP-Com determines UP protocols based on information from the SDP-Com for end-to-end protocol, SDP-Com for RAN cluster protocol, access link protocol, and SDP-Com for transport network protocol. The end-to-end resource manager also configures SONAC-Op and other NOS as new customer service UP slice is developed. SONAC-Op configures SDT-Op's slice level routing table for routing traffic data over a slice. Configures SDRA-Op's rule on resource assignment management for traffic forwarding over a slice. Configures SDP-Op's rule on protocol optimization for traffic flows under certain conditions. These functions are basic functions which are utilized for the development of customer service slice, the SONAC-Op and NOS services.

According to an embodiment, the end-to-end resource manager includes an end-to-end service coordinator interface [service requirement], [domain ID, committed service delivery performance], an end-to-end InfM [infrastructure resource map, available infrastructure resource map], and other domain resource coordinator/manager.

According to an embodiment, the domain service coordinator performs the following functions and includes the following interfaces. The functions receive service slice requests from end-to-end service coordinator or upper layer service coordinator. They also Receive domain CSM-QoS for performance report and determine on end-to-end slice resource modification. The interfaces are to end-to-end service coordinator or upper layer service coordinator, domain resource coordinator, and end-to-end CSM-QoS (slice performance).

According to an embodiment, the Domain resource coordinator and slice development performs the following functions and includes the following interfaces. The functions include functions to receive decisions made by end-to-end resource coordinator, provide infrastructure resource map to SDT, SDRA, SDP, coordination of domain resource (among SDT, SDRA, SDP), SDT-Com to determines the logical topology of a slice on this domain, SDRA-Com to determine the mapping between logical tunnels to physical network, SDP-Com to determine the logical tunnel protocols, and a function to configure SONAC-Op. The function that configures SONAC-Op uses SDT-Op to configure slice logical topology (slice tunnel definitions), slice level routing table, rule on end-point routing table establishment, and rule on interaction with CM for location resolution of communication destination. This function also uses SDRA-Op to configure rule on packets delivery over logical tunnels of a slice and rule on access link scheduler. This function also uses SDP-Op to configure the rule on protocol adaptation of traffic packet delivery under certain condition within the scope of per slice protocol set. Interfaces include end-to-end resource coordinator (determined and recommended by end-to-end resource coordinator], SONAC-Op [configurations], domain InfM [infrastructure resource map, available infrastructure resource map], and other domain resource coordinator.

SONAC-OP functions and interfaces are also illustrated in FIGS. 29-31. SONAC-Com manages resources at the slice level, i.e., SONAC-Com develop slices using the general infrastructure resource pools, while SONAC-Op manages the delivery of slice traffic packets over deployed slices. SONAC-Op functions 712 can be designed for different technical domains, e.g., RAN domains and transport domains, etc. In some embodiments SONAC-Op 712 communicates with CSM-QoS 752 function to ensure per device/application performance. In some embodiments SONAC-Op 712 communicates with CSM-Context 568 for device traffic delivery optimization. According to an embodiment, the SONAC-OP 712 performs the following functions and includes the following interfaces. The SONAC-OP functions 712 includes an SDT controller (referred to as SDT-Op), an SDRA controller (referred to as SDRA-OP), and an SDP controller (referred to as SDP-Op). SDT-Op is used to determine path for traffic packet at slice (virtual network) level and create and maintain end-point routing tables. SDRA-Op is used to determine physical path given a logical tunnel for traffic packets, access link resource access control across slices which have not dedicated access link resources, and access link resource access control for slices with dedicated access link resource allocated by SONAC-Com. Accordingly, in some embodiments SONAC-OP includes SDRA-OP configured to implement physical path optimization given a logical tunnel. SDP-Op is used to determine the protocol given a logical tunnel (links of the tunnel) for traffic packets if default slice protocol is not optimal. Accordingly, in some embodiments SONAC-OP includes SDP-OP which implements the Core and RAN protocol stacks. The interfaces are to SONAC-Com [configurations], 711 CM 693, 694 to maintain end-point routing table [device ID, current anchor, etc.], DAM 678 (e.g., via CFM-Op) 698 [log ID, information ID, etc.], CSM-QoS [device ID, performance, etc.] 752, and CSM-Context [device ID, behavior ID, etc.] 568, as well as infrastructure 598 and slice 597.

Figure 41A:
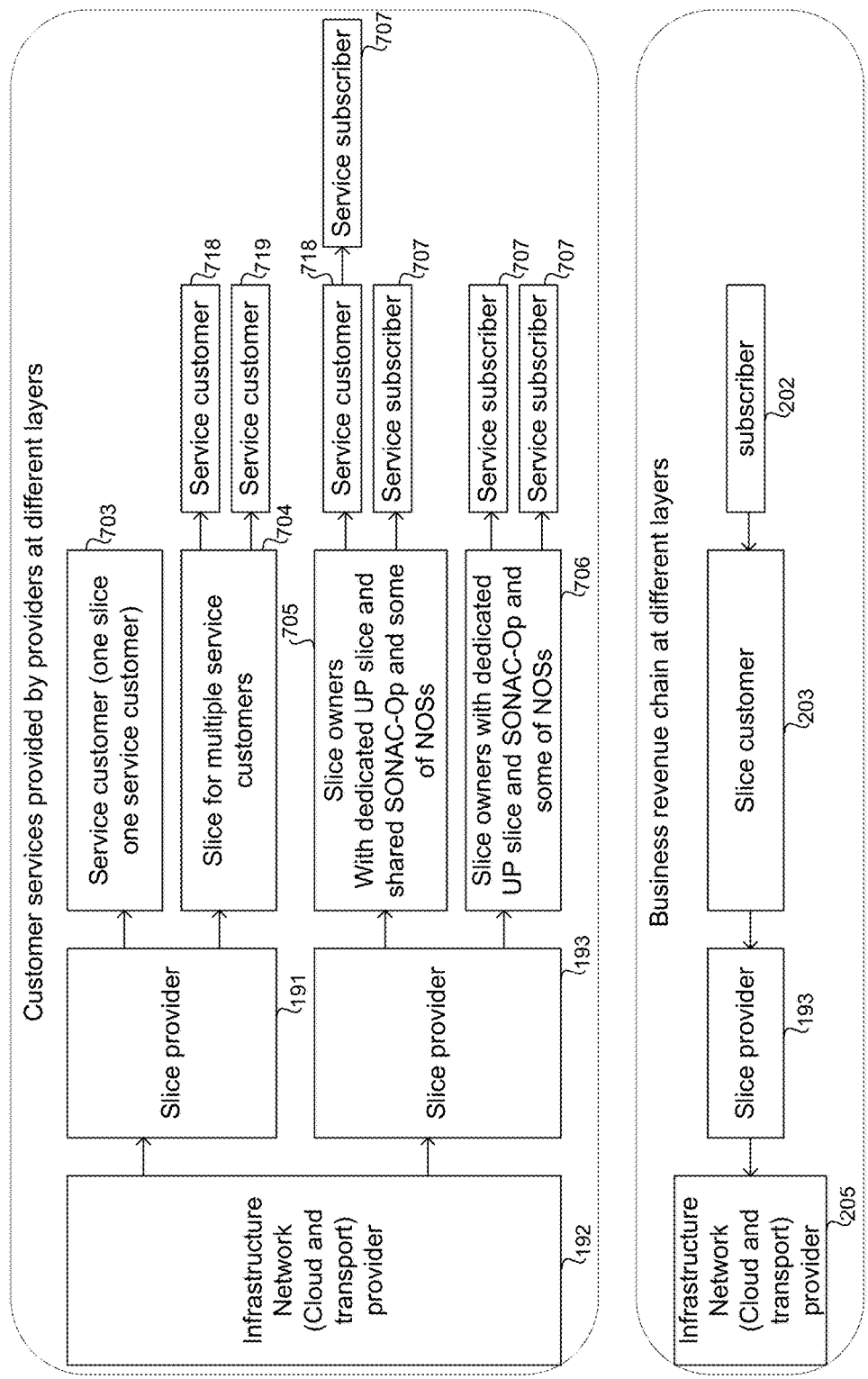
FIGS. 41A and B illustrate future network service provisioning models according to embodiments.
Figure 41B:
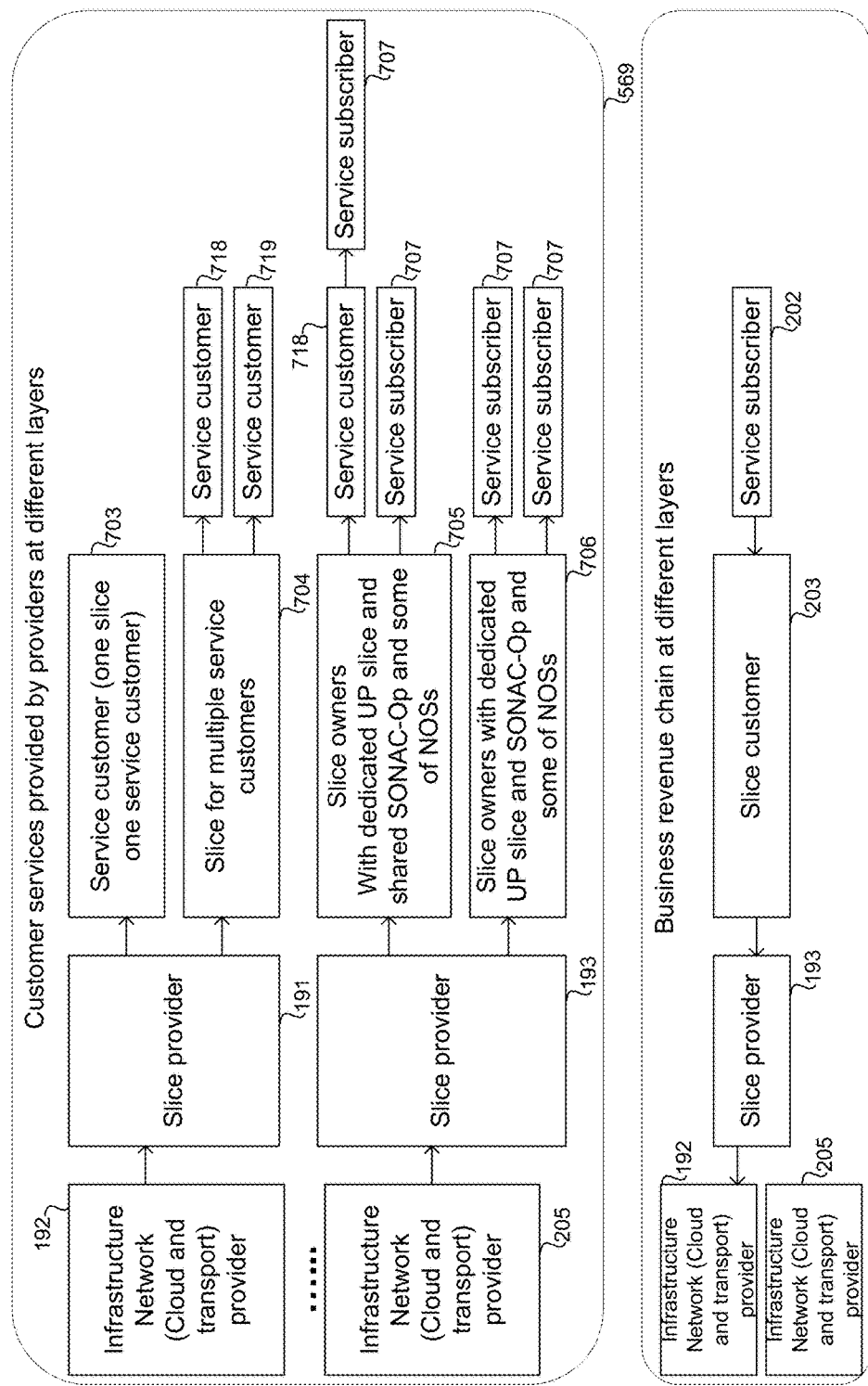
FIG. 41B illustrates an example of multiple infrastructure network providers and one end-to-end slice provider.

MyNET platform and business revenue assurance will now be discussed, according to embodiments. In future networks, multiple types of network entities (providers) can be expected, including service providers, slice providers, infrastructure providers etc. Some examples of future network service provisioning models are shown in FIGS. 41A and 41B. These figures only capture certain example models and a lot of different models can be accommodated.

FIG. 41A illustrates customer services provided by providers at different layers involving a single infrastructure network 192 but multiple slice providers 191,193 Further, different slice models can be provided. For example a single slice for a service customer 703, or a slice can be shared by multiple service customers 704. Further slice owners (customers provided with a dedicated UP slice) can have a shared SONAC-Op 705 or slice owners can have a dedicated UP slice and dedicated SONAC-Op 706. Either model of these examples can provide service to service customers 718, 719 or service subscribers 707. This figure also illustrates the business revenue chain at different layers when a request originates at service subscriber 202 and is passed to the infrastructure network 205 via slice customer 203 via slice provider 193. FIG. 41B illustrates another example wherein each slice provider 191, 193 has a separate infrastructure provider 192, 205. In other words infrastructure provider 192 provides infrastructure resources to slice provider to slice provider 191 and infrastructure provider 205 provides infrastructure resources to slice provider to slice provider 193. While examples of slices 703, 704, 705 and 706 are illustrated as assigned to particular slice providers, it should be noted that any slice model can be provided by either slice provider.

For some cases, one infrastructure provider can provide its infrastructure network resource to multiple slice providers. One slice provider can provide multiple slices using the infrastructure network resource. One slice can provide services to one or multiple customer. One slice customer can associate with one or multiple end-points of a slice (devices, servers) which consume slice resource for communication purpose. For example, a smart reading customer can use a slice to collect reading messages from devices/sensors to a central server. Some other slice customer could be a slice owner who can further provide service to its subscribers that actively consume the slice resource for the purpose of communications. For example, a virtual operator can use a slice to provide best effort service to its subscribers. This is shown in FIG. 41A, according to an embodiment.

For some other cases, one slice provider can integrate infrastructure network resources from multiple infrastructure network providers.

From these example models, it can be predicted that the business chain model in future network industry could be significantly different from that in 3G/4G network. New business revenue assurance scheme needs to be designed to meet the new business chain model. The traditional charging scheme found in 3G/4G needs to be enhanced to adapt to new business model.

The following requirements can be considered for business revenue assurance, according to an embodiment. The requirement to enable service customized charging per subscriber level; enable service customized charging per service customer level; and enable customized charging per slice provider level. Flexible charging schemes are also required and must provide UP slice charging, UP slice charging and SONAC-Op charging if it is dedicated for one customer, and UP slice charging, SONAC-Op changing, and NOS slice charging (e.g., CM, CSM) if they are dedicated for one customer.

The flexible and customized charging is enabled by MyNET platform—CSM-charging functions. CSM-charging function is configured at a customer slice is deployed. Customer can explicitly indicate the preferred charging rule. During the operation, CSM-charging function configures DAM to obtain information needed to charging purpose.

The charging information obtained for each individual slices and services can be used for deriving the charging data at slice provider level.

MyNET platform and Openness will now be discussed according to embodiments. In future wireless network industry, highly efficient collaboration among multiple operators at different layers (refer to FIGS. 41A and B) are expected. In addition, the traditional network control, management and operation modes are facing challenges.

A first aspect to discuss is a Slice or service customer aspect. From customer perspective, platform design can consider the following aspects. The ability to enable slice/service customer be aware of available infrastructure network information (topology, topology, capacity, performance, etc.) such that customer can actively involve slice development under the control of slice providers. The platform must also provide the ability to enable slice/service customer be aware of status (slice level) of its slice/service (slice service performance, slice resource, slice resource utilization, slice traffic load, etc.) and enable slice/service customer/owner be aware of status of its device or subscriber behavior (applications, activity, commonly communicated partners, etc.).

In MyNET platform, InfM service provides infrastructure network status to SONAC for the purpose of slice development. The status information can also be accessed by $3^{rd}$ party, e.g., slice customers, under the control of slice providers and infrastructure providers.

The status of a slice or a service, provided by CSM, is used by SONAC for the purpose of slice adaptation and slice resource utilization optimization. However this status information can also be accessed by $3^{rd}$ party, e.g., customer of a slice.

The status of a device or a subscriber of a slice, provided by CSM and CM, is used for the optimization of slice resource allocation to devices or subscribers of a slice. This status information can be accessed by $3^{rd}$ party under the control of slice provider.

From future network control, management and operation perspective, platform design can enable 3rd party to control, manage and operate network under control of slice provider. In MyNet platform design, the basic functions of network control, management, and operation are identified and categorized. The methodology of MyNET design makes MyNET become a flexible open platform.

Due to the function classification of MyNET platform, each of function families in MyNET platform are relatively independent and, at the same time, inter-dependent. This enables the openness of network control, management and operation.

For example, DAM service could be provided by a 3rd party which is dedicated to data log and information extraction and provide on-demand service to other MyNET functions. CM service can also be provided by a 3rd party, which dedicated to provide the device location tracking and resolution, etc.

A variety of openness schemes can be expected. For example, end-to-end openness where 3rd party DAM provides the service over entire infrastructure network; domain-wise openness where 3rd party DAM may only provide DAM service over a limited part (e.g., a domain) of the entire infrastructure network.

Multiple formats of 'purpose specific slices' and customer service slices can be developed and deployed, depending on the resources configured, as listed in the table of FIG. 42. In FIG. 42 format A describes an end-to-end slice with the definition of NFs, slice logical topology, capacity and performance requirement of all logical tunnels of this slice, mapping rule between logical topology to infrastructure network resource, end-to-end/tunnel/link protocols. In FIG. 42 format B describes an end-to-end slice with the definition of NFs, slice logical topology, but without the definition of capacity and performance requirement of all logical tunnels of this slice. In FIG. 42 format C describes a slice with only the definition of NFs and placement of NFs in the infrastructure network, but without the logical topology defined. It should be appreciated that these are just three examples, and variations of these formats are also possible.

In the examples discussed a customer slice is a UP slice. However other embodiments can accommodate a future slice customer which could be a virtual service provider who may request a UP slice and dedicated NOS slices SONAC-Com receives the service description and requirement from slice requester (customer) via API interface. This information can be used by SONAC-Com to develop the UP slice by execution of SONAC-Com functions as described herein. This procedure can be used for slice providers to develop 'purpose-specific slices'. The design of the purpose-specific slices can make use of appropriate VNFs that reside within the infrastructure network. The responsibility of SONAC-Com is summarized in the table of FIG. 42.

After a UP slice is developed, the SONAC-Com can perform any or all of selecting, activating and configuring the SONAC-Op functions by execution of SONAC-Com functions as discussed. If shared SONAC-Op functions are used for this UP slice, SONAC-Com can configure the existing SONAC-Op for supporting the operation of the newly developed slice. Or SONAC-Com can select service specific SONAC-Op functions and activate them and set corresponding parameters.

NOS functions, e.g., CSM function, can be configured to enable the management of the newly created slice. Similarly, CM functions can be configured to provide reachability information of devices to be associated with the newly created slice.

After these steps, the end-point of the slice (at least one of devices and servers) can be admitted to these slices and service traffic data can be forwarded over the UP slice and NOS messages can be forwarded over NOS slices.

Although a customer service UP slice can be dedicated to a service customer, some embodiments provide for scenarios where multiple services share a UP slice if these services share common service attributes and requirements. For example, a plurality of smart reading services can share a UP slice designed for this purposes, it the service traffic of these services can be treated in the same way (QoS) by the network.

Considering this scenario, a customer service UP slice can be pre-initialized even before any customer service request is received. In this case, a slice provider can pre develop such a UP slice (purpose-specific UP slice) partially, i.e., determines the NFs, and logical topology, and protocols. However real resource need not be allocated until needed.

At a service request is received, SONAC-Com determines which domains (segments of a purpose-specific UP slice) will involve the support of this service, and configure the corresponding SONAC-Op and NOS functions, as the scenarios where one slice is for one customer service.

In some cases, a customer of a slice wishes to provide service to its subscribers. A Slice owner may also explicitly require at least one of customized SONAC-Op functions and customized NOS functions. Interface APIs can be used for this purpose. SONAC-Com develop at least one of corresponding UP slices and dedicated SONAC-OP and NOS slices based on the description of the slice operation.

Some slice customers require a set of infrastructure resources, consisting UP plane and functions in SONAC-Op and NOS functions, e.g., CM and CSM, and also want to operate the virtual network at the "Virtual Network level". SONAC-Com design enables the development of such self-operational virtual network/slice. In this case the virtual network operator can access only the virtual network resource, without accessing the physical infrastructure resource.

Some embodiments allow for the development of a virtual network with dedicated end-to-end infrastructure resources. In this case, SONAC allocates end-to-end infrastructure resources based on the requirement of customers. Within the virtual network, all MyNET platform function can be deployed, assuming that the allocated end-to-end infrastructure is entitled infrastructure resource (ie., infrastructure which can be provided by the slice provider).

MyNET platform and slice operation according to embodiments will now be discussed.

SONAC, SONAC-Com and SONAC-Op, are designed for automation of slice creation and slice operation. The resources defined for a slice by SONAC-Com could present multiple formats, as discussed above. SONAC-Op is responsible for slice operation. The responsibilities of SONAC-Op for example slice formats are listed in the Table of FIG. 43.

The Responsibility of SONAC-Op for operation using the format A slice will now be discussed. After a slice is completely configured and developed, the slice can be used or operated for forwarding traffic between end-points (device, servers, etc) of a slice. SONAC-Op is responsible for slice operation. The SONAC-Op could be common for more than one slice or dedicated for one particular slice, e.g., cache and forwarding (CF) slice. At the development of a customer service slice, SONAC-Com also configures the SONAC-Op to control and manage the traffic handling of a slice. With end-to-end slice deployment, logical slice level tunnels are configured.

In some embodiments the operation of such a slice can be simplified. In 3G/4G systems, for some types of services, per device/session end-to-end tunnel/bearer establishment is needed which incurs singling overhead and latency. For some other types of services, the packet transmission is bursty. The conventional solution is not optimized for such type services (e.g., MTC). With a well-defined end-to-end slice, the per device/session end-to-end tunnel/bearer establishment can be simplified or avoided. An end-point of a slice can transmit data on to the slice with no or only lightweight AL signaling. This feature is called as Hop-On (a Slice) and will significantly reduce the complexity (signaling overhead and latency) of data traffic handling.

As discussed in previous sections, after a customer UP slice is configured and all related NOS functions and SONAC-Op (SDT-Op, SDRA-Op, SDP-Op) are configured for supporting the operation of this customer UP slice, the network is ready to provide service to the customer and its devices or subscribers. A well developed and deployed slice can be viewed as virtual network and is composed of slice level tunnels.

In order to use a slice, an end-point can register to the slice. After the registration, an end-point device can obtain and maintain an identification (slice ID, service ID, etc) for network to associate packets to the appropriate slice.

After a packet is received by network, SDT-Op routes the packet to the destination over a slice. For routing packets over a slice (slice tunnels), SONAC-Op determines the location information of the destination of the packets. This information can be obtained from CM service, which is responsible for device location tracking/resolution. After SDT-Op determines the forwarding tunnel, SDRA-Op will instruct the physical node to physically move packet from the ingress to the egress of the logical tunnels. SDP-Op manages the protocol stack selection for packet if the default stack of a slice is not optimized for some end-point is needed (e.g., a high speed mobile device downloads video in area with ultra-dense deployed network).

During the slice operation, SDT-Op can interact with CM to maintain end-point (devices, servers) routing tables. SDRA-op can interact with CSM-context for resource multiplexing of end-points to optimize the slice resource usage.

CSM-AAA controls and manages authentication and authorization of device to use a slice.

The Responsibility of SONAC-Op for operation using the format B slice will now be discussed. The responsibility of SONAC-Op for format B slice is similar to that for format A slice. However, since there is no slice level capacity defined, the slice level QoS control may be difficult. For example, scheduler at access link has no way to ensure the resource multiplexing 'fairness' among multiple slices. Accordingly Format B may be best suited for services in which QoS control is not required, or when other forms of QoS control can be implemented.

For format C slice, during the operation, SONAC-Op can perform per device end-to-end session establishment. This incurs signaling between SONAC-Op and UP plane, i.e., involved UP NFs. This utilizes some local intelligence of SONAC-Op (slice level routing based on load) functionality. Unlike SONAC-Op for format A slice, the slice topology and the capacity requirement can be modified to adapt to long term statistics of load, performance, etc., by SONAC-Com.

Accordingly it is noted that the operation of a slice could be different, depending on the format of the slice. Accordingly, embodiments provide explicit description of slice resource assignment and corresponding configuration of SONAC-Op. The format of a slice can be determined by slice providers based on considerations, such as the purpose of a slice, the complexity balance between SONAC-Com and SONAC-Op, etc.

The virtualization of network functions is considered to be a foundational technology for the architecture of flexible 5G networks. Function virtualization is a technology that allows for the creation of virtual functions on a base of compute, memory (which may include both executable memory and general storage) and connectivity or network resources. In many cases, these resources will exist within a data center. It should be understood that this discussion refers to resources instead of actual hardware because it is possible for virtualized resources to serve as the underlying resources for a next level of virtualization.

Virtualization may take the form of instantiating a virtual machine (VM) that, to another entity on a network and to software executed on the VM, is no different than a physical node in the network. A VM has its own set of compute, memory and network resources, upon which an operating system can be executed. The VM can have a virtual network interface that can be assigned a network address. Between the underlying resources and the VM, there is typically a hypervisor that manages the resource isolation and network interactions. One of the purposes of a VM is to provide isolation from other processes run on the system. When initially developed, a VM was a mechanism to allow different network processers to operate without concern that a single errant process would be able to cause a complete system crash. Instead, an errant process would be contained to its own VM. This isolation allows for each VM to have its own set of network interfaces. Typically, a single underlying resource can support a plurality of virtualized entities.

A more recent development has been the use of containers in place of VMs. Each VM typically includes its own operating system which typically increases redundant resource usage. Containers allow a single OS kernel to support a number of isolated virtual functions. In place of a hypervisor that allows each VM to run its own OS, a single OS hosts containers that are responsible for enforcing the resource isolation that would otherwise be provided by the VM. Each virtualized function within its own container can be provided a virtualized network interface so that it appears as its own network entity.

Figure 44:
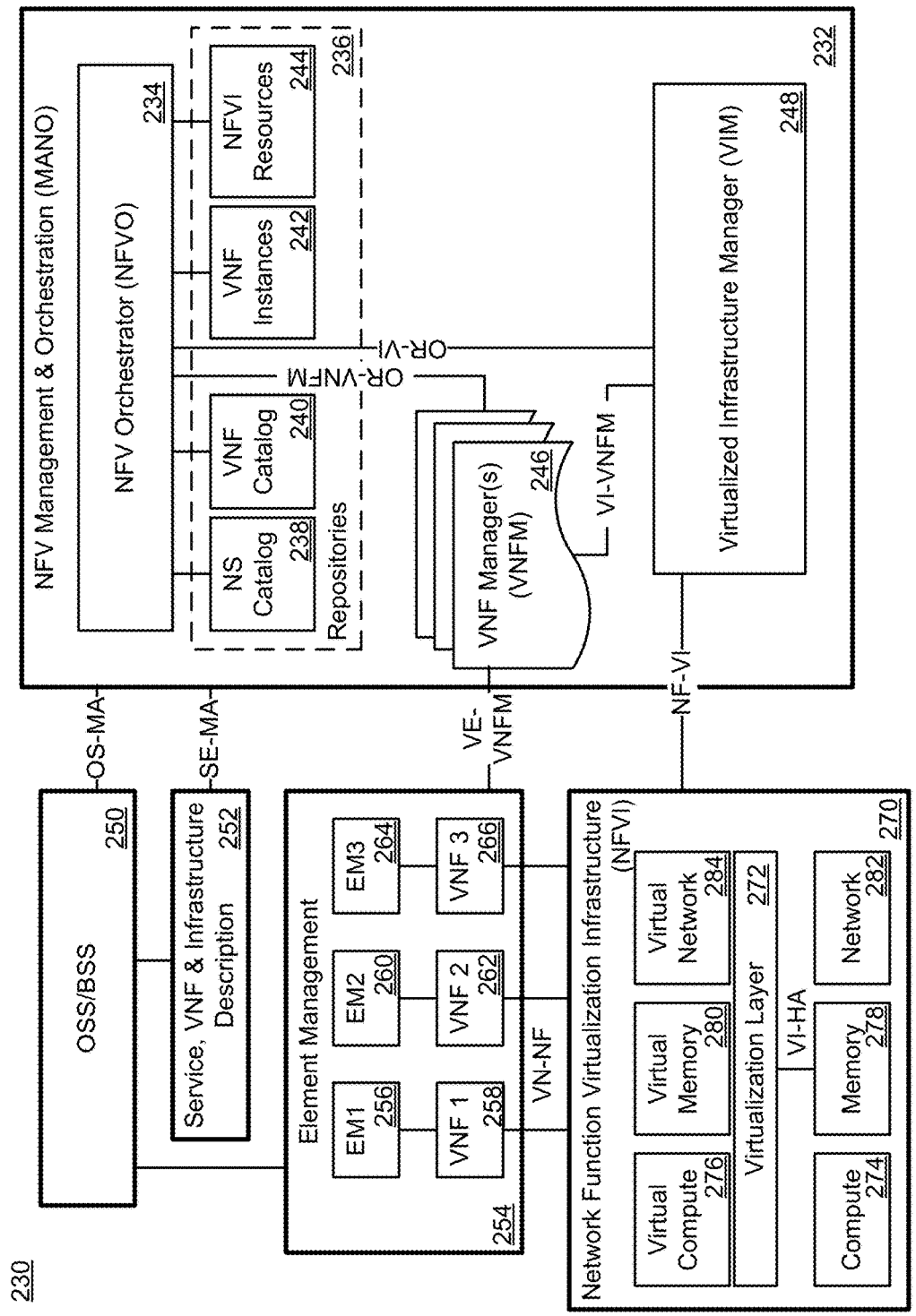
FIG. 44 is a block diagram illustrating an ETSI NFV MANO compliant management and orchestration service, according to an embodiment.

With virtualization used in a networked environment, a question arises as to how the management of the instantiation, modification, and tear-down of virtualized functions is managed or orchestrated. To address this concern, the European Telecommunications Standards Institute (ETSI) has developed a set of standards for Network Function Virtualization (NFV) MANagement and Orchestration (MANO). As illustrated in FIG. 44, the NFV-MANO system allows for the management of NFV instantiation and modification. As illustrated, there can be interfaces to existing systems such as the OSS/BSS. An NFV-MANO system 232 includes an orchestrator 234 which can access libraries 236 such as Network Service catalog 238, VNF Catalog 240, VNF Instances repository 242 and NFVI resources repository 244. The NS Catalog 238 may include templates which can be used as the basis for supporting network services. VNF catalog 240 may contain templates for the instantiation of different classes of VNFs. A particular VNF, after being instantiated, may be referred to as a VNF instance, and its attributes may be stored in VNF instances respository 242. NFVI resources 244 may be used to track the availability of resources, including both virtual resources and the physical infrastructure upon which they are instantiated. The NFVO 234 can be connected to a number of VNF Managers 246 through an OR-VNFM interface, and to a Virtualized Infrastructure Manager (VIM) 248 through a OR-VI interface. The VNFM 246 and VIM 248 can be connected to each other through a Vi-VNFM interface.

The NFV MANO 232 can communicate with an OSS/BSS system 250 through OS-MA interface, and to a Service, VNF & Infrastructure description database 252 though an SE-MA interface. The Service, VNF & Infrastructure description database 252 can contain operator information about the services, VNFs and infrastructure deployed in the network. Service, VNF & Infrastructure description database 252 and OSS/BSS 250 can be connected to each other so that the OSS/BSS 250 can update and maintain the Service, VNF & Infrastructure description database 252 as needed.

NFVI 270 interacts with the VIM 248 through the NF-VI interface. Underlying resources can often be classified as compute resources 274, memory resources 278 and network resources 282. Memory resources 278 may also be referred to as storage resources, while network resources 282 may also be referred to as connectivity resources. A virtualization layer 272 allows for the abstraction of the underlying resources which it is connected to through a Vi-HA interface. It should be understood that the underlying resources may be either physical or virtual resources. The Virtualization layer 272 allows for the abstraction of the underlying resources into virtual compute resources 276, virtual memory resources 280 and virtual network resources 284. These virtualized resources can be provided to the element management system 254 through the VN-NF interface so that they can be used as the resources upon which the VNFs (shown as VNF1 258, VNF2 262 and VNF 3 266) can be instantiated. EM 254 can be connected to the VNFM 246 within NFV MANO 232 through interface VE-VNFM, and to the OSS/BSS 250 through another interface. Each VNF instantiated upon the virtual resources provided by NFVI 270 can be associated with an element manager (EM1 256, EM2 260 and EM3 264). The use of an element manager allows the OSS/BSS to have two paths through which the VNFs can be managed. A VNF can be managed through the VNFM 246, or through the element manager associated with the VNF. Each element manager can provide the same management controls that it would otherwise provide for a physical network element. Thus, the OSS/BSS 250 can treat each VNF as a conventional network function. Modification to the resource allocation associated with a VNF can be requested by an element manager through the VNFM 246, or through a request from the OSS/BSS 250 over the OS-MA interface.

The virtualization of network functions allows functions to be deployed with the resources that are required and not with an intentional over provisioning. In conjunction with the above described slicing and data center utilization, flexible networks can be deployed in a manner that allows an operator to dynamically modify the connectivity between functions (thus changing the logical topology of the network) and to dynamically modify the resources and location of the network functions (thus changing the physical topology of the underlying network). Additional resources can be allocated to existing function to allow for scaling up of an existing function, and resources can be removed from an allocation to allow for a scaling down of a function. Resources from more than one resource pool or data center can be allocated to a function so that it can be scaled out, and resources from different pools can be removed to allow a function to be scaled in. Functions can be moved by transferring their state information to another network function, and in some instances, a function can be moved through a combination of scaling out and scaling in functions.

Accordingly, it should be appreciated that the composition functions (e.g., SONAC-Com) described above receives requests, and formulates the design of user plane, NOS and operating (e.g., SONAC-OP) functions and slices. The composition function can then transmit instructions to the MANO 232 for the instantiation, configuration, activation and modification of the various network functions.

Figure 45:
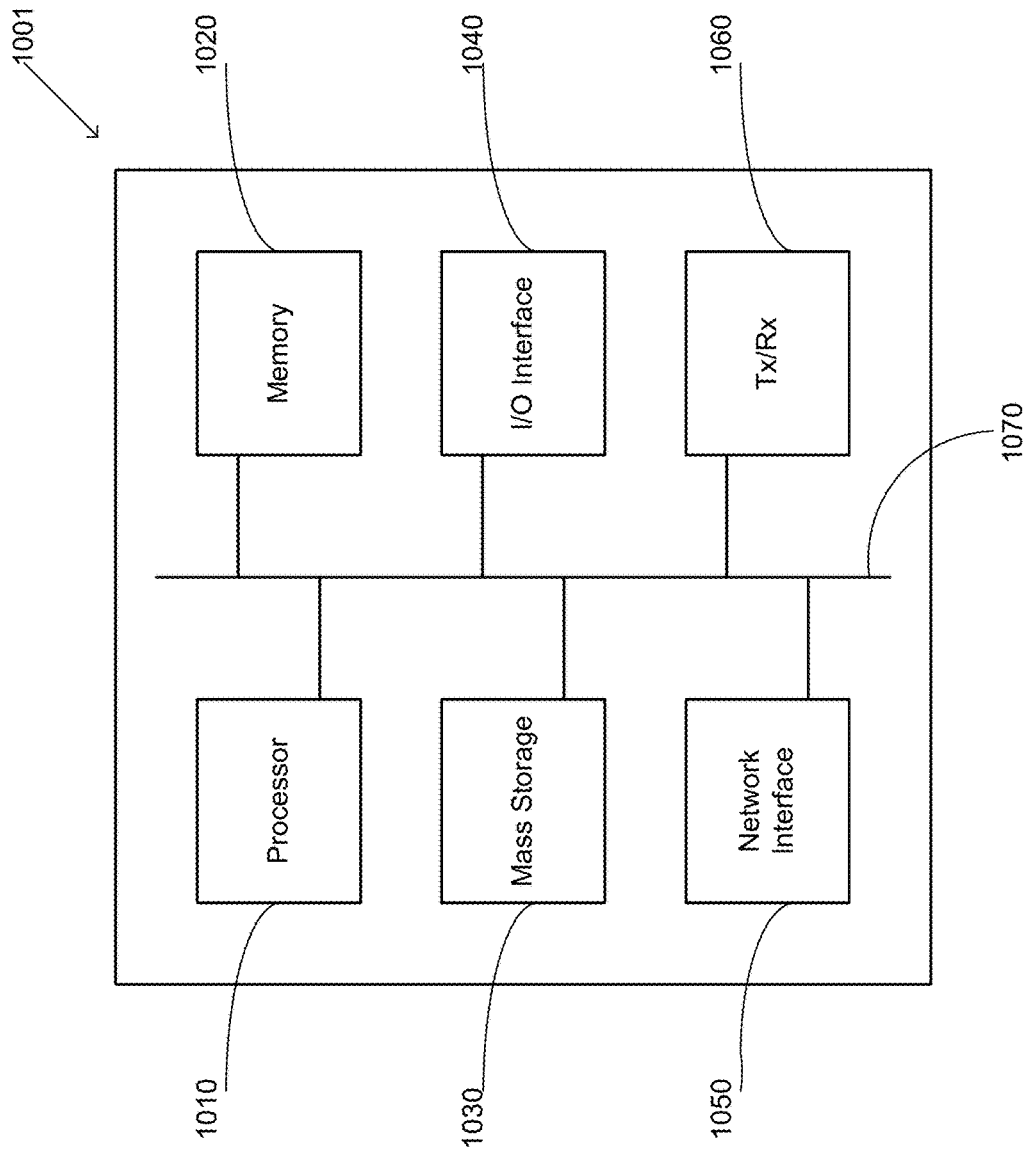
FIG. 45 illustrates a processing system that may be used for implementing any of the functions discussed herein.

FIG. 45 is an exemplary block diagram of a processing system 1001 that may be used for deploying or instantiating components of the wireless communication network, such as the SONAC, NOS, MyNET, MANO, DAM, CSM and InfM and other entities. As shown in FIG. 45, processing system 1001 includes a processor 1010, memory 1020, non-transitory mass storage 1030, network interface 1050, I/O interface 1040, and transceiver 1060, all of which are communicatively coupled via bi-directional bus 1070. The processing system 1001 further includes input terminals and output terminals, for receiving inputs and outputs, respectively, from other network components (not shown). Accordingly a network controller implementing the composition function, such as SONAC-Com described above can include processor 1010, a machine readable memory 1020 which stores executable instructions, which when executed by the processor 1010, cause the system 1001 to carry out the methods described herein.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring a digital logic apparatus in accordance with embodiments of the present invention.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A method of creating a network slice comprising:
receiving a request providing requirements for the slice;
transmitting a first configuration message to a network controller to establish at least one operating function for managing the operation of the slice;
transmitting a second configuration message to the network controller to establish a plurality of Network Operation Support (NOS) functions for operating the slice; and
transmitting a third configuration message to the network controller to establish a plurality of user plane functions of the slice, the plurality of user plane functions including a mobile anchor point function.

2. The method of claim 1 further comprising transmitting a request to, an infrastructure manager network controller for an identification of resources capable of providing resources to satisfy the requirements.

3. The method of claim 1 wherein the request is for an end-to-end slice which spans more than one domain, and wherein transmitting a request to an infrastructure manager network controller further comprises:
transmitting a request to an infrastructure manager network controller in each domain; and
receiving a reply from an infrastructure manager network controller in each domain.

4. The method of claim 3 wherein the reply from the infrastructure manager network controller in each domain includes an indication of the resources available.

5. The method of claim 1 wherein transmitting the first configuration message to the network controller to establish at least one operating function for managing the operation of the slice comprises transmitting an identification of preconfigured library functions selected to establish the at least one operating function.

6. The method of claim 5 wherein the transmitting comprises at least one of establishing an operating function slice and configuring an operation function in a previously established operating function slice.

7. The method of claim 1 wherein transmitting the second configuration message to the network controller to establish at least one NOS function comprises at least one of:
transmitting an identification of preconfigured library functions selected to establish the at least one NOS function;
transmitting an identification of preconfigured library functions selected to establish a plurality of NOS functions;
configuring at least one NOS function in a previously established NOS slice; and
transmitting an identification of preconfigured library functions selected to establish a plurality of NOS slices.

8. The method of claim 7 wherein the plurality of NOS slices are selected from the group consisting of: Connectivity Management (CM), Infrastructure Management (InfM), Customer Service Management (CSM), Content & Forwarding Management (CFM) and data analytics management (DAM) functions.

9. The method of claim 1 further comprising transmitting a domain request to a plurality of domain network controllers to establish slice components in each domain to provide an end-to-end slice.

10. The method of claim 9 wherein slice components comprises the NOS services, operating functions and user plane functions.

11. The method of claim 9 wherein transmitting a domain request to a plurality of domain network controllers comprises transmitting the domain requirements for each domain to each domain network controller.

12. The method of claim 1, wherein the method is performed by a domain network controller, and wherein the request is received from a global network controller.

13. The method of claim 1 further comprising transmitting instructions for establishing a Software Defined Topology (SDT) Controller, a Software Defined Resource Allocation (SDRA) controller, and a Software Defined Protocol (SDP) controller.

14. A network controller comprising:
a network interface;
a processor; and
a non-transient computer readable memory for storing instructions that when executed by the processor cause the network controller to be configured to:
receive, over the network interface, a request providing requirements for the slice;
transmit, through the network interface, a first configuration message to the network controller to establish at least one operating function for managing the operation of the slice;
transmit, through the network interface, a second configuration message to the network controller to establish a plurality of Network Operation Support (NOS) functions for operating the slice; and
transmit, through the network interface, a third configuration message to the network controller to establish a plurality of user plane functions of the slice, the plurality of user plane functions including a mobile anchor point function.

15. The controller of claim 14 wherein the instructions, when executed, cause the controller to be further configured to transmit a request to an infrastructure manager network controller, for an identification of resources capable of providing resources to satisfy the requirements.

16. The controller of claim 14 wherein the request is for an end-to-end slice which spans more than one domain, and wherein transmitting a request to an infrastructure manager network controller further comprises:
transmitting a request to an infrastructure manager network controller in each domain; and
receiving a reply from an infrastructure manager network controller in each domain.

17. The controller of claim 14 wherein transmitting the first configuration message to the network controller to establish at least one operating function for managing the operation of the slice comprises transmitting an identification of preconfigured library functions selected to establish the at least one operating function and further comprises at least one of establishing an operating function slice and configuring an operation function in a previously established operating function slice.

18. The controller of claim 14 wherein transmitting the second configuration message to network controller to establish at least one NOS function comprises at least one of:

transmitting an identification of preconfigured library functions selected to establish the at least one NOS function;

transmitting an identification of preconfigured library functions selected to establish a plurality of NOS functions;

configuring at least one NOS function in a previously established NOS slice; and transmitting an identification of preconfigured library functions selected to establish a plurality of NOS slices.

19. The method of claim 18 wherein the plurality of NOS slices are selected from the group consisting of: Connectivity Management (CM), Infrastructure Management (InfM), Customer Service Management (CSM), Content & Forwarding Management (CFM) and data analytics management (DAM) functions.

20. The controller of claim 14 wherein the instructions, when executed, cause the controller to be further configured to transmit a domain request to a plurality of domain network controllers to establish slice components in each domain to provide an end-to-end slice.

21. The controller of claim 14 wherein the network controller is a domain network controller, and wherein the request is received from a global network controller.

22. The controller of claim 14 wherein the instructions, when executed, cause the controller to be further configured to transmit instructions for establishing a Software Defined Topology (SDT) Controller, a Software Defined Resource Allocation (SDRA) controller, and a Software Defined Protocol (SDP) controller.

* * * * *